(12) United States Patent
Williams

(10) Patent No.: US 7,786,712 B2
(45) Date of Patent: *Aug. 31, 2010

(54) HIGH-EFFICIENCY DC/DC VOLTAGE CONVERTER INCLUDING UP INDUCTIVE SWITCHING PRE-REGULATOR AND CAPACITIVE SWITCHING POST-CONVERTER

(75) Inventor: Richard K. Williams, Cupertino, CA (US)

(73) Assignee: Advanced Analogic Technologies, Inc., Santa Clara, CA (US)

( * ) Notice: Subject to any disclaimer, the term of this patent is extended or adjusted under 35 U.S.C. 154(b) by 185 days.

This patent is subject to a terminal disclaimer.

(21) Appl. No.: 11/890,956

(22) Filed: Aug. 8, 2007

(65) Prior Publication Data

US 2008/0157733 A1    Jul. 3, 2008

Related U.S. Application Data

(60) Provisional application No. 60/877,952, filed on Dec. 30, 2006, provisional application No. 60/877,720, filed on Dec. 30, 2006.

(51) Int. Cl.
*G05F 1/563* (2006.01)
(52) U.S. Cl. .......................... 323/266; 323/222; 363/60
(58) Field of Classification Search ................. 323/222, 323/266, 282; 363/59, 60
See application file for complete search history.

(56) References Cited

U.S. PATENT DOCUMENTS

| | | | |
|---|---|---|---|
| 3,943,428 A | 3/1976 | Whidden | 363/60 |
| 4,553,986 A * | 11/1985 | Ciliberti et al. | 95/116 |
| 4,743,835 A * | 5/1988 | Bosse et al. | 323/266 |
| 4,761,722 A * | 8/1988 | Pruitt | 363/17 |
| 4,974,141 A | 11/1990 | Severinsky et al. | 363/81 |
| 5,066,900 A | 11/1991 | Bassett | 323/224 |
| 5,235,504 A | 8/1993 | Sood | 363/53 |
| 5,446,367 A * | 8/1995 | Pinney | 323/266 |
| 5,557,193 A * | 9/1996 | Kajimoto | 323/282 |
| 5,773,966 A | 6/1998 | Steigerwald | 323/284 |
| 5,886,512 A | 3/1999 | Becerra | 323/282 |
| 6,023,418 A | 2/2000 | Engira | 363/63 |
| 6,272,025 B1 | 8/2001 | Riggio et al. | 363/24 |
| 6,400,579 B2 | 6/2002 | Cuk | 363/16 |
| 6,428,918 B1 | 8/2002 | Fuglevand et al. | 429/13 |
| 6,504,423 B2 | 1/2003 | Riggio et al. | 327/560 |
| 6,580,258 B2 | 6/2003 | Wilcox et al. | 323/282 |
| 6,617,832 B1 * | 9/2003 | Kobayashi | 323/266 |

(Continued)

FOREIGN PATENT DOCUMENTS

KR    10-2006-0084075    7/2006

*Primary Examiner*—Jeffrey L Sterrett
(74) *Attorney, Agent, or Firm*—Patentability Associates

(57) ABSTRACT

A DC/DC converter includes a pre-regulator stage, which may include a boost converter, and a post-converter stage, which may include a charge pump. The duty factor of the pre-regulator stage is controlled by a feedback path that extends from the output terminal of the pre-regulator stage or the post-converter stage. The pre-regulator steps the input DC voltage up by a variable amount depending on the duty factor, and the post-converter steps the voltage at the output of the pre-regulator up or down by an positive or negative integral or fractional value. The converter overcomes the problems of noise glitches, poor regulation, and instability, even near unity input-to-output voltage conversion ratios.

20 Claims, 61 Drawing Sheets

U.S. PATENT DOCUMENTS

| | | | |
|---|---|---|---|
| 6,650,552 B2 * | 11/2003 | Takagi et al. | 363/17 |
| 6,798,177 B1 * | 9/2004 | Liu et al. | 323/222 |
| 6,937,487 B1 | 8/2005 | Bron | 363/60 |
| 7,071,660 B2 | 7/2006 | Xu et al. | 323/266 |
| 7,078,882 B2 | 7/2006 | Weng et al. | 323/224 |
| 7,161,335 B2 | 1/2007 | Wei et al. | 323/266 |
| 7,317,302 B1 | 1/2008 | Collins | 323/222 |
| 7,336,059 B2 * | 2/2008 | Steigerwald et al. | 323/288 |
| 7,359,219 B2 * | 4/2008 | Erdl et al. | 363/16 |
| 7,408,330 B2 | 8/2008 | Zhao | 323/266 |
| 7,466,111 B2 | 12/2008 | Komaki | 323/224 |
| 7,560,915 B2 * | 7/2009 | Ito et al. | 323/282 |
| 2005/0099164 A1 * | 5/2005 | Yang | 323/266 |
| 2008/0157732 A1 | 7/2008 | Williams | 323/282 |
| 2008/0158915 A1 | 7/2008 | Williams | 323/266 |
| 2009/0059630 A1 | 3/2009 | Williams | 323/282 |

\* cited by examiner

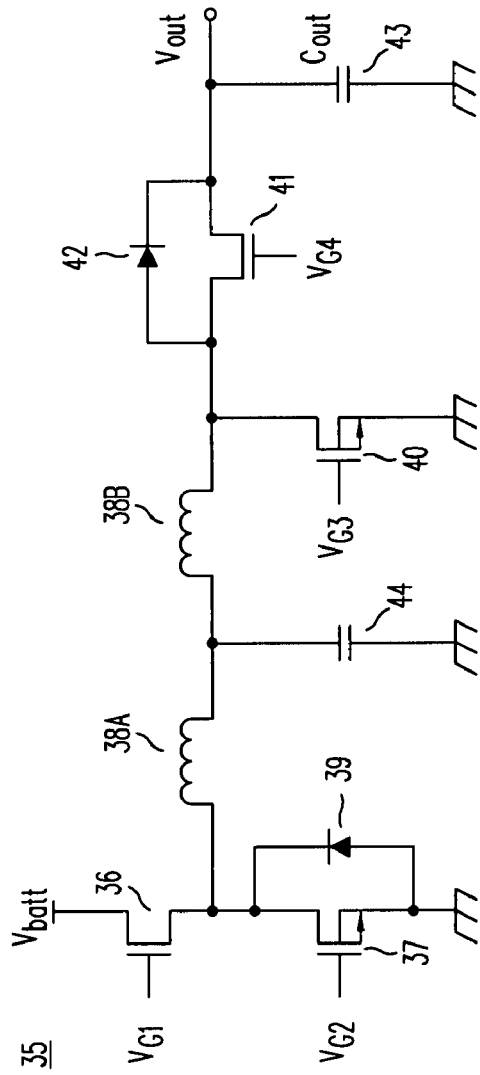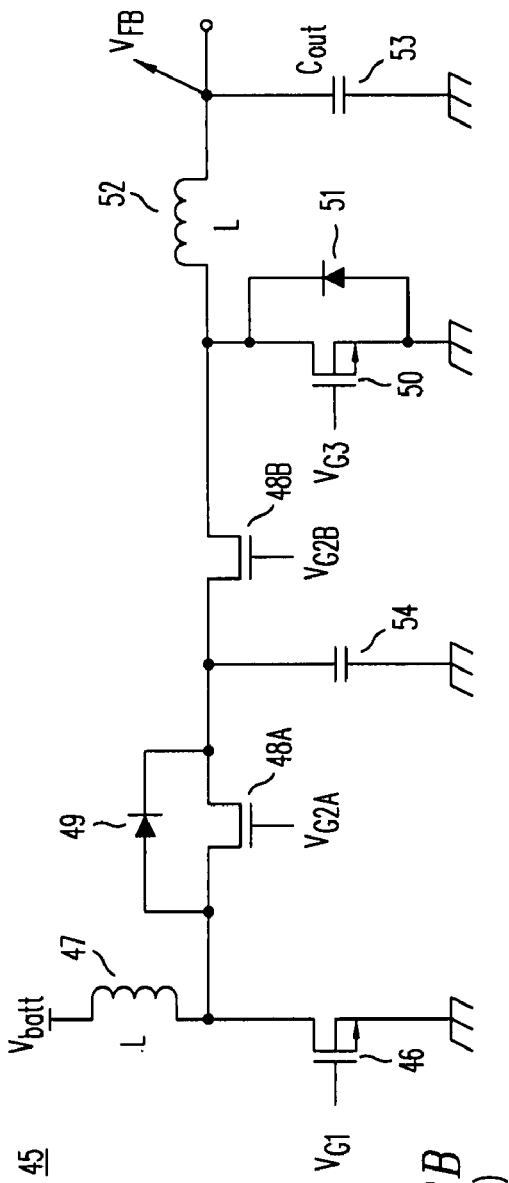
FIG. 3A (Prior Art)
FIG. 3B (Prior Art)

$V_{out} = 2V_{batt}$

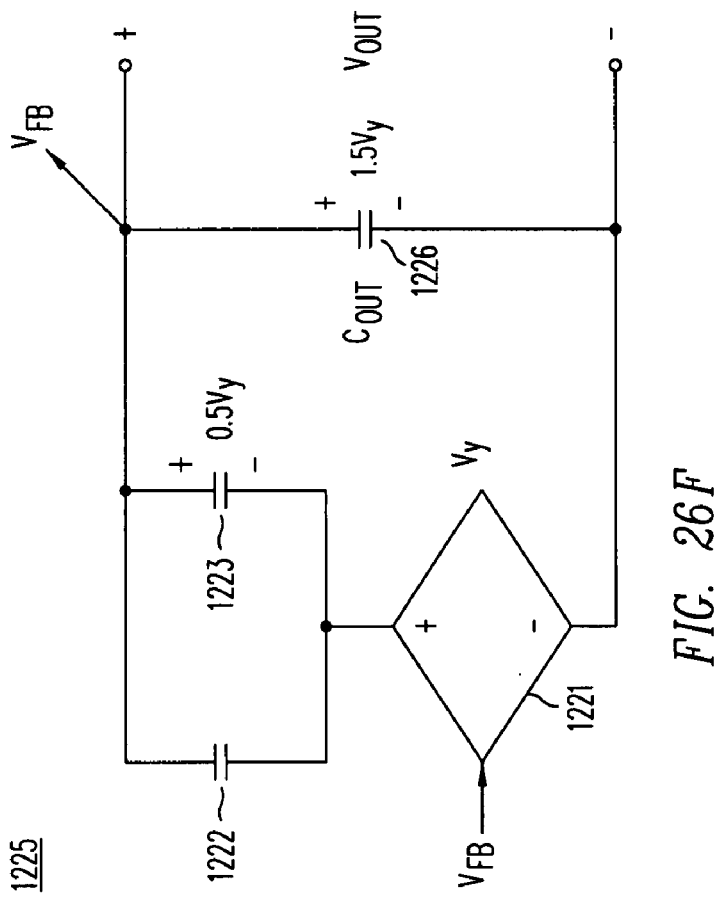

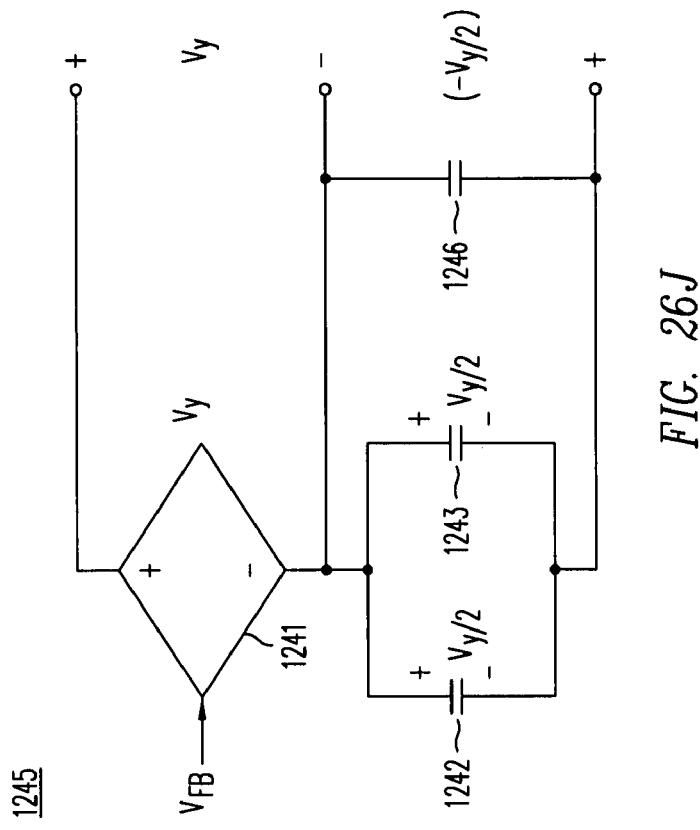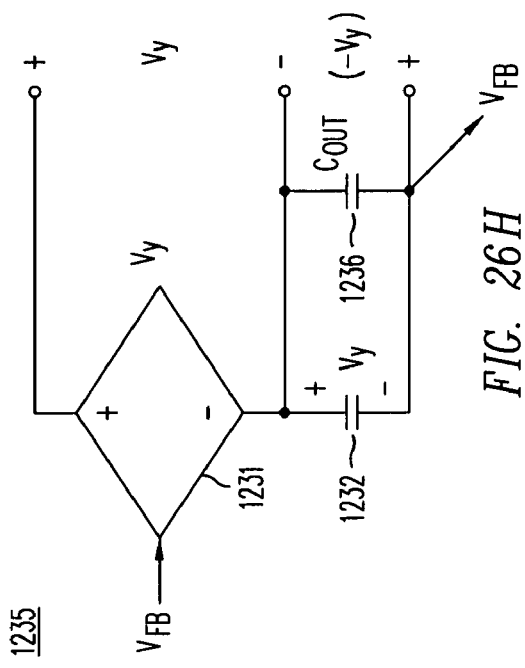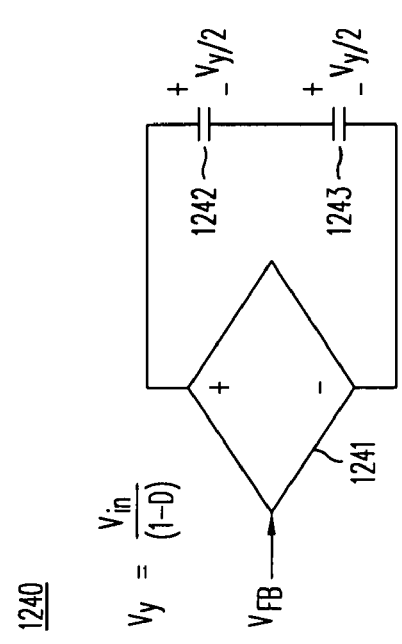

HIGH-EFFICIENCY DC/DC VOLTAGE CONVERTER INCLUDING UP INDUCTIVE SWITCHING PRE-REGULATOR AND CAPACITIVE SWITCHING POST-CONVERTER

CROSS-REFERENCE TO RELATED APPLICATIONS

This application claims the priority of Provisional Application Nos. 60/877,952 and 60/877,720, both filed on Dec. 30, 2006, each of which is incorporated herein by reference in its entirety.

FIELD OF THE INVENTION

This invention pertains to the design, operation and performance of switching power supplies for use in DC/DC conversion and voltage regulation, and to the semiconductor components used in such converters.

BACKGROUND OF THE INVENTION

Voltage regulation is commonly required to prevent variation in the supply voltage powering various microelectronic components such as digital ICs, semiconductor memories, display modules, hard disk drives, RF circuitry, microprocessors, digital signal processors and analog ICs, especially in battery powered applications such as cell phones, notebook computers and consumer products.

Since the battery or DC input voltage of a product often must be stepped-up to a higher DC voltage, or stepped-down to a lower DC voltage, such regulators are referred to as DC-to-DC converters. Step-down converters, commonly referred to as "Buck converters," are used whenever a battery's voltage is greater than the desired load voltage. Step-down converters may comprise inductive switching regulators, capacitive charge pumps, and linear regulators. Conversely, step-up converters, commonly referred to as "boost converters," are needed whenever a battery's voltage is lower than the voltage needed to power its load. Step-up converters may comprise inductive switching regulators or capacitive charge pumps.

Another type of converter may operate as either a step-up or a step-down converter depending on whether the power input to the converter has a voltage above or below its output voltage. Commonly referred to Buck-boost converters, such circuitry is needed whenever a regulator's input and output are similar in voltage, where variations in the input voltage preclude the use of a simple boost or Buck converter.

One example of such an application requiring both step-up and step-down conversion is supplying a regulated 3.3V output from a lithium ion (LiIon) battery. A LiIon battery exhibits a terminal voltage which decays from 4.2V when fully charged to below 3V when discharged. Since the initial battery voltage is above 3.3V and the final battery voltage is below 3.3V, the converter must be able to step-down initially and step-up later.

Inductive Switching Converters

Of the aforementioned voltage regulators, the inductive switching converter can achieve superior performance over the widest range of currents, input voltages and output voltages. The principles of inductive switching regulator operation are described in detail in application Ser. No. 11/890,818, titled "High-Efficiency DC/DC Voltage Converter Including Down Inductive Switching Pre-Regulator And Capacitive Switching Post-Converter," which is incorporated herein by reference in its entirety.

Two examples of non-isolated inductive switching regulators, a synchronous Buck step-down converter and synchronous boost step-up converter, are shown in FIGS. 1A and 1B, respectively.

An example of a synchronous Buck converter 1 is shown in FIG. 1A. Converter 1 comprises a power MOSFET 3, an inductor 5, a synchronous rectifier power MOSFET 4 with an intrinsic rectifier diode 8, and a capacitor 6. Operation of MOSFET 3 is controlled by a pulse-width modulation (PWM) controller 2, driving the gate of MOSFET 3. The gate drive may vary in polarity and voltage depending on whether MOSFET 3 is an N-channel or a P-channel MOSFET. Synchronous rectifier MOSFET 4, generally an N-channel MOSFET, is driven out of phase with MOSFET 3, but is not necessarily turned on the entire time when MOSFET 3 is off. In general, MOSFET 4 conducts only during times when diode 8 is conducting.

While the control circuit controlling the converter's operation is referred to as a PWM controller, implying fixed-frequency variable-pulse-width operation, it may alternatively operate in a variable frequency mode where the clock period is allowed to vary, or alternatively alternating between varying and fixed frequency modes depending on load and input conditions.

The energy input from the power source, battery or power input into the DC/DC converter is switched or gated through MOSFET 3. With its positive terminal connected to the battery or input, MOSFET 3 acts like a "high-side" switch controlling the current in inductor 5. Diode 7 is a P-N junction parasitic to MOSFET 3, in parallel to the transistor's drain and source, which remains reverse-biased under normal Buck converter operation. Since diode 7 does not carry current under normal operation, it is illustrated by dotted lines.

By controlling the current in the inductor 5 by controlling the switching and on-time of MOSFET 3, the energy stored in the magnetizing field of inductor 5 can be adjusted dynamically to control the voltage on output filter capacitor 6. The output voltage $V_{out}$ is therefore fed back to the input of PWM controller 2, which controls the current $I_L$ in inductor 5 through the repeated switching of MOSFET 3. The electrical load connected to the converter's output is not shown.

Driven out of phase with MOSFET 3, synchronous rectifier MOSFET 4 conducts some portion of the time when MOSFET 3 is off. With its positive terminal connected to the inductor 5, i.e. to node $V_x$, and its negative terminal connected the circuit ground, MOSFET 4 acts like a "low-side" switch shunting the current in diode 8. Diode 8 is a P-N junction parasitic to synchronous rectifier MOSFET 4, in parallel to the transistor's drain and source. Diode 8 conducts substantial inductor current only during intervals when both MOSFETs are off.

Both MOSFETs are simultaneously off during every switching transition to prevent shorting the input power source to ground. This so-called "break-before-make" (BBM) interval prevents shoot through conduction by guaranteeing both transistors do not conduct simultaneously and short or "crow-bar" the converter's input and power source.

During this brief BBM interval, diode 8 in parallel to synchronous rectifier MOSFET 4 must, along with any parasitic capacitance associated with diode 8, carry the load current through inductor 5. Unwanted noise can occur during the transitions associated with BBM operation.

If we define the converter's duty factor D as the time that energy flows from the battery or other power source into the DC/DC converter, i.e. during the time that MOSFET switch 3 is on, then the ratio of output to input voltage ratio in a Buck converter 1 is proportionate to its duty factor, i.e.

$$\frac{V_{out}}{V_{in}} = D \equiv \frac{t_{sw}}{T}$$

where $t_{sw}$ is the time period that MOSFET 3 is turned on during each clock period T.

This relationship for a Buck or synchronous Buck converter is illustrated by curve 17 in FIG. 2A in graph 15. Notice that the Buck converter cannot smoothly reach a zero or unity transfer characteristic without exhibiting some discontinuities 19 and 21 at the extremes of D. This phenomenon occurs due to switching delays in the power MOSFET switch and its control and gate drive circuitry.

As long as the Buck converter's power MOSFET 3 is still switching, $t_{sw}$ is limited to some portion of the clock period T, e.g. 5%<D<95%, essentially due to turn-on and turn-off delay within the MOSFET switch and its control loop. For example, at a 95% duty factor and a 3 MHz clock, the off-time for the high-side MOSFET 3 is only 5% of the 333 nsec period, or just 16 nsec. This means the high side MOSFET 3 must turn off and back in only 16 nsec—too rapidly to regulate over a 95% output-to-input conversion ratio. This minimum off-time problem impacts both synchronous or non-synchronous Buck converters. This problem is further exacerbated in a synchronous DC/DC converter, since no time remains for the synchronous rectifier MOSFET 4 to turn on and then off again and still exhibit BBM operation.

Referring again to graph 15 in FIG. 2A, above some maximum duty factor $D_{max}$, there is not adequate time to maintain switching operation and the converter jumps from $D_{max}$ to a 100% duty factor, as shown by discontinuity 21. Above $D_{max}$, the converter turns on MOSFET 3 and leaves it on for the entire period T. The abrupt transition 21 causes a glitch in the output voltage. Thus, at a 100% duty factor, $V_{out}=V_{in}$ as shown by line 16 and all regulation is lost as long as the switching is halted.

Synchronous boost converter 10, shown in FIG. 1B includes a low-side power MOSFET 12, a battery-connected inductor 13, a filter capacitor 15, and a "floating" synchronous rectifier MOSFET 14 with a parallel rectifier diode 16. The gates of the MOSFETs 12 and 14 are driven by break-before-make circuitry (not shown) and controlled by a PWM controller 11 in response to voltage feedback $V_{FB}$ from the output voltage $V_{out}$ across filter capacitor 15. BBM operation is needed to prevent shorting out filter capacitor 15.

The synchronous rectifier MOSFET 14, which may be an N-channel or P-channel MOSFET, is considered to be floating in the sense that neither its source nor drain terminal is permanently connected to any supply rail, i.e. ground or $V_{batt}$. Diode 16 is a P-N diode intrinsic to synchronous rectifier MOSFET 14, regardless whether synchronous rectifier MOSFET 14 is a P-channel or an N-channel device. A Schottky diode may be included in parallel with MOSFET 16, but with series inductance may not operate fast enough to divert current from forward biasing intrinsic diode 16. Diode 17 represents a P-N junction diode intrinsic to N-channel low-side MOSFET 12 and remains reverse biased under normal boost converter operation. Since diode 17 does not conduct under normal operation, it is shown as dotted lines.

If we again define the converter's duty factor D as the time that energy flows from the battery or power source into the DC/DC converter, i.e. during the time that low-side MOSFET switch 12 is on and inductor 13 is being magnetized, then the output to input voltage ratio of a boost converter is proportionate to the inverse of 1 minus its duty factor, i.e.

$$\frac{V_{out}}{V_{in}} = \frac{1}{1-D} \equiv \frac{1}{1-t_{sw}/T}$$

This relationship for a boost or synchronous boost converter is illustrated by curve 18 in FIG. 2A in graph 15. Notice that the boost converter cannot smoothly reach a unity transfer characteristic without exhibiting some discontinuity at the extremes of D. This phenomenon occurs due to switching delays in the power MOSFET switch and its control and gate drive circuitry.

As long as the boost converter's power MOSFET 12 is still switching, $t_{sw}$ is limited to some portion of the clock period T, e.g. 5%<D<95%, essentially due to turn-on and turn-off delay within the MOSFET 12 and its control loop. For example, at a 5% duty factor and a 3 MHz clock, the on-time for the low-side MOSFET 12 is only 5% of the 333 nsec period, or just 16 nsec. This means the low side MOSFET 12 must turn on and back off in only 16 nsec—too rapidly to regulate below a 5% output-to-input conversion ratio. This minimum on time problem impacts either synchronous or non-synchronous boost converters.

Referring again to graph 15 in FIG. 2A, below some minimum duty factor $D_{min}$, there is not adequate time to maintain switching operation and the converter must jump from $D_{min}$ to 0% duty factor as shown by discontinuity 20. Below $D_{min}$, the converter turns on the synchronous rectifier MOSFET 14 and leaves it on for the entire period T. The abrupt transition 20 causes a glitch in the boost converter's output voltage. Moreover, at a 100% duty factor, $V_{out}=V_{in}$ as shown by line 16, all regulation is lost as long as the switching is halted.

So in both synchronous Buck converter 1 and synchronous boost converter 10, operation near a unity transfer characteristic, i.e. when $V_{out} \approx V_{in}$ shown by line 16, is problematic for either the Buck or the boost converter.

The efficiency η of a voltage converter can be given by $$\eta = \frac{P_{out}}{P_{in}} = \frac{I_{out} \cdot V_{out}}{I_{in} \cdot V_{in}}$$

An analysis of inductive switching regulator efficiencies is described in detail the above-referenced application Ser. No. 11/890,818.

Graph 25 of FIG. 2B illustrates examples of typical conversion efficiencies for synchronous Buck and synchronous boost converters as a function of the converter's voltage conversion ratio $V_{out}/V_{in}$. As shown, line 26 represents the unity conversion condition, where $V_{out}=V_{in}$. Conversion ratios less than unity, on the left side of line 26 in graph 25, represent step-down conversion. Efficiency curve 27 represents an example of a Buck converter performing a step-down voltage conversion. Conversion ratios greater than unity, on the right side of line 26, represent step-up conversion. Efficiency curve 28 represents an example of a boost converter performing step-up voltage conversion.

In general, boost regulators exhibit lower efficiencies than Buck regulators for comparable load currents, as illustrated by curves 27 and 28. This is primarily due to the fact that boost regulators exhibit higher peak currents than Buck regulators. This problem is further accentuated for high $V_{out}/V_{in}$ voltage conversion ratios, especially for output voltages approaching ten times the input voltage, as illustrated by the decline of curve 28 at higher conversion ratios.

In graph 25, the efficiency of a Buck converter (curve 27) is not shown for conversion ratios below 0.1 or above 0.9 and likewise the efficiency of a boost converter (curve 28) is not shown for conversion ratios below 1.1 or above 10, because these conversion ratios require the converter to operate below a 10% or above a 90% duty factor, an operating condition difficult to achieve, especially at high switching frequencies.

Buck-Boost Switching Converter

The problem of non-isolated DC/DC switching converter operation near unity transfer is especially difficult in applications when the input voltage may vary above or below the desired output voltage. Examples of this application include the output of noisy AC adapters or circuitry which must operate by battery back-up during emergency conditions when a main source of power has failed.

Another scenario where a unity conversion ratio is required occurs when a battery's operating voltage range extends above and below the desired output voltage. For example, the discharge characteristic of a LiIon battery starts at 4.2V at full charge, initially decays rapidly to around 3.6V, then decays slowly from to 3.4V, and finally drops quickly to its cutoff at or below 3V. In the event that a DC/DC converter is needed to produce a well-regulated 3.3V output during this entire period, a sub-unity conversion ratio of (3.3V/4.2V), i.e. a ratio of 0.79, is needed at the outset, indicating a Buck converter is required. At the battery's end-of-life, the required conversion ratio exceeds unity, becoming 3.3V/3V, i.e. a conversion ratio of 1.1, and requires a boost converter. Such an application demanding both step-up and step-down conversion requires a Buck-boost, or up-down converter.

In the case where the user wants to avoid the complexities of up-down conversion, one possible approach is to use only a Buck converter and give up some battery life by cutting of the battery early, e.g. at 3.3V. In practice, however considering battery manufacturing variations and regulator drop-out and duty factor limitations, too much battery life is sacrificed to rely on a Buck-only regulator solution.

If up-down conversion cannot be avoided, a Buck-boost converter can easily be derived from combining synchronous Buck and boost converters into a merged circuit. In FIG. 3A, for example, a cascade Buck-boost converter 35 contains a synchronous Buck converter comprising a P-channel or N-channel MOSFET 36, an inductor 38A, an N-channel synchronous rectifier MOSFET 37 with an intrinsic rectifier diode 39, and a capacitor 44, which is used to power a synchronous boost converter comprising a low-side N-channel MOSFET 40, an inductor 38B, a synchronous rectifier MOSFET 41 with an intrinsic rectifier diode 42, and a filter capacitor 43. Buck-boost converter 35 first steps down the input voltage $V_{batt}$ to an intermediate voltage lower than the desired output, then steps the intermediate voltage up to produce $V_{out}$.

FIG. 3B conversely illustrates a cascade boost-Buck converter 45 that contains a synchronous boost converter comprising a low-side N-channel MOSFET 46, an inductor 47, an N-channel or P-channel synchronous rectifier MOSFET 48A with an intrinsic diode 49, and a capacitor 54, which is used to power a synchronous Buck converter comprising a MOSFET 48B, an inductor 52, an N-channel synchronous rectifier MOSFET 50 with an intrinsic rectifier diode 51, and a filter capacitor 53. Buck-boost converter 45 drives a load (not shown). In this approach, the input voltage $V_{batt}$ is first stepped-up to an intermediate voltage higher than the desired output, then back down to produce $V_{out}$.

The overall efficiency of either Buck-boost regulator 35 or boost-Buck regulator 45 is given by the product of the boost converter's efficiency $\eta_{boost}$ multiplied by the Buck converter's efficiency $\eta_{Buck}$. Mathematically this can be represented as $\eta_{cascade} = \eta_{Buck} \cdot \eta_{boost}$. Even if both converters are 85% efficient, the efficiency of the cascade Buck-boost or boost-Buck converter reaches an overall efficiency of only about 70%, significantly lower than the typical efficiency of either a Buck converter or a boost converter alone. The overall power loss in a cascaded Buck-boost or boost-Buck cascade is greater than the power loss in either a synchronous Buck or synchronous boost converter alone, because there are more transistors in series between input and output terminals, and because all the transistors are switching all the time.

As shown in FIG. 3B, boost-Buck converter 45 includes series-connected MOSFETs 48A and 48B with an intermediate capacitor 54. Since in steady-state, the current in series connected MOSFETs must be equal, MOSFET 48B is redundant and can be eliminated without impacting circuit operation. Even so, boost-Buck converter 45 requires two inductors 47 and 52, a characteristic highly undesirable from a user's point-of-view.

Similarly, as shown in FIG. 3A, Buck-boost converter 35 includes inductors 38A and 38B with intermediate capacitor 44. Since in steady state the current in inductors 38A and 38B is the same, inductor 38B is redundant and may be eliminated without changing the function of the circuit. In fact, capacitor 44 may also be eliminated without significantly altering the operation of Buck-boost converter.

The resulting simplified prior-art Buck-boost converter 55 is illustrated in FIG. 3C. Buck-boost converter 55 comprises a single-inductor 59; four MOSFETs 57, 56, 60, and 61; diodes 58 and 62 and a filter capacitor 63. The PWM controller and break-before-make and gate buffer circuits are not shown. Depending on its terminal conditions, such a converter can operate in three distinct modes, Buck, boost, and Buck-boost.

In FIG. 3D, equivalent circuit diagram 65 represents the operation of Buck-boost converter 55 as a Buck converter where MOSFETs 57 and 56 are switched out-of-phase under PWM control while MOSFET 61 remains turned-on, represented as a resistance 67, and MOSFET 60 is biased off, shown as an open circuit 66. The overall power loss in Buck-boost converter 55 operated as a Buck converter is greater than that in an equivalent synchronous Buck converter because of the conduction loss in MOSFET 61, i.e. power lost continuously in resistance 67. As a result of this increased power loss, Buck-boost converter 55 operating in its Buck mode has a lower efficiency than conventional Buck converter 1 shown in FIG. 1A.

In FIG. 3E, equivalent circuit diagram 70 represents the operation of Buck-boost converter 55 as a boost converter where MOSFETs 60 and 61 are switched out-of-phase under PWM control while MOSFET 57 remains turned-on, represented as a resistance 71, and MOSFET 56 is biased off, shown as an open circuit 72. The overall power loss in Buck-boost converter 55 operated as a boost converter is greater than that in an equivalent synchronous boost converter because of the conduction loss in MOSFET 57, i.e. power lost continuously in resistance 71. As a result of this increased power loss, Buck-boost converter 55 operating in its boost mode has a lower efficiency than conventional boost converter 10 shown in FIG. 1B.

The loss of efficiency using Buck-boost converter 55 is illustrated in FIG. 4 in the plot of efficiency $\eta$ for various output-to-input voltage conversion ratios $V_{out}/V_{in}$. For convenience, the efficiency of conventional Buck and boost converters (similar to curves 27 and 28 in FIG. 2B) is illustrated by curves 81 and 82, respectively.

Curve 83 illustrates the efficiency of Buck-boost converter 55 operating in Buck-only mode, as shown in equivalent circuit diagram 65 (FIG. 3D). Because of series resistance 67 associated with on-state MOSFET 61, the efficiency of a Buck-boost converter in the Buck mode (curve 83) is lower than that of the efficiency of a simple Buck (curve 81). This loss of efficiency can range from a few percent to over 10%, depending on operating conditions. Curve 85 illustrates the efficiency of Buck-boost converter 55 operating in full Buck-boost mode where all four switches are switching constantly, and as a result exhibits even greater losses and poorer efficiency than the same Buck-boost converter operating in Buck mode (curve 83).

Curve 84 illustrates the efficiency of Buck-boost converter 55 operating in boost-only mode, shown in equivalent circuit diagram 70 (FIG. 3E). Because of series resistance 71 associated with on-state MOSFET 57, the efficiency of a Buck-boost converter in the boost-only mode (curve 84) is lower than the efficiency of a simple boost converter (curve 82). This loss of efficiency can range from a few percent to over 10%, depending on operating conditions. Curve 86 illustrates the efficiency of Buck-boost converter 55 operating in full Buck-boost mode where all four switches are switching constantly, and as a result exhibits even greater losses and poorer efficiency than the same Buck-boost converter operating in boost mode (curve 84).

Near a unity conversion ratio, where the output voltage is slightly above or below its input (i.e. where $V_{out} \approx V_{in}$) Buck-boost converter 55 must operate in the Buck-boost mode with all four MOSFETs switching constantly. The resulting efficiency (curve 87) can be 10% to 20% lower than the efficiency of a conventional Buck or boost converter (curves 81 and 82).

Thus, the efficiency penalty of using a Buck-boost converter in order to operate over a wide range of voltage conversion ratios is substantial. Moreover, the converter must change its operating mode whenever operating near unity voltage conversion ratios.

Charge Pump Converters

An alternative to the switched-inductor converter is a charge pump, a voltage conversion circuit using only switches and capacitors to perform voltage translation through repeated charge redistribution, i.e. the continuous charging and discharging of a capacitor network driven by a clock or oscillator.

The advantage of a charge pump is that at specific voltage conversion ratios, it can exhibit extremely high conversion efficiencies approaching 100%. The disadvantage is that it can only efficiently generate an output voltage that is a pre-determined multiple of the input voltage, based on the number of flying capacitors used in its converter circuit. When used to generate voltages other than a select multiple of the input voltage, charge pumps exhibit low efficiencies.

An example of a common charge pump is illustrated by charge pump 90 in FIG. 5A where a single flying capacitor 93 is employed as a "doubler", i.e. to double the battery's input voltage. Charge pump 90 comprises MOSFETs 92, 91, 94 and 95, configured in an arrangement similar to an H-bridge except that one terminal of the H-bridge, the source of MOSFET 95, is connected to the output terminal of charge pump 90 and to reservoir capacitor 96 rather than to ground.

Operation of charge pump 90 involves repeatedly charging and discharging flying capacitor 93. During the charging phase, diagonal MOSFETs 94 and 91 are closed, charging capacitor 93 to the voltage $V_{batt}$ while MOSFETs 92 and 95 remain open. Thereafter, in the charge transfer phase, MOSFETs 94 and 91 are opened, MOSFETs 92 and 95 are closed, and energy is transferred from the flying capacitor 93 to the output reservoir capacitor 96, pumping the output voltage $V_{CP}$ to a value twice the battery voltage $V_{batt}$.

The purpose of the switch network is essentially to place the flying capacitor in parallel with the battery during the charging phase and in series, i.e. stacked on top of the battery's positive terminal, during the discharging phase, as illustrated by equivalent circuit 100 in FIG. 5B, where voltage source 101 represents the battery input and capacitor 102 charged to $V_{batt}$ represents the flying capacitor 93. By "stacking" the charged flying capacitor 93 atop the battery, the output voltage of the charge pump is the sum of the voltages, hence doubling the voltage input. The cycle then repeats with another charging phase.

FIG. 5C illustrates a charge pump 110 utilizing two flying capacitors 114 and 115 and a network of seven MOSFETs 111, 112, 113, 116, 117, 118 and 119. The purpose of the network initially is to charge the capacitors 114 and 115 in series, with each of capacitors charged to half the battery voltage, i.e. $V_{batt}/2$. During charging, MOSFETs 111, 112 and 113 are on and MOSFETs 116, 117, 118 and 119 are off. After charging, the charged capacitors 114 and 115 are connected in parallel, and connected to the positive terminal of the battery. This connection is accomplished by turning on MOSFETs 116, 117, 118 and 119. The resulting output voltage, as shown in the equivalent circuit 121 of FIG. 5D is equal $V_{batt}+V_{batt}/2$, for an output voltage of $1.5V_{batt}$. As shown, battery voltage source 124 and the parallel combination of capacitors 122 and 123 are stacked atop one another. Because the output voltage is 1.5 times the input voltage this type of charge pump is sometimes referred to as a "fractional" charge pump.

Actually, many charge pump topologies are possible, but most use only one or two flying capacitors. A single flying capacitor charge pump is only capable of efficiently delivering power at twice its input, or alternatively if the capacitor is connected to the negative terminal of the battery to produce a mirror-image negative voltage of the battery, i.e. $-V_{batt}$, also known as an inverter. The inverting case is illustrated in equivalent circuit 130 of FIG. 5E, where battery 131 is used to charge capacitor 132 to a voltage below ground, i.e. referenced to the negative terminal of battery 131. Two-transistor fractional charge pumps may be used to produce an output voltage equal to one-half the input voltage, as shown in equivalent circuit 135 of FIG. 5F where capacitors 137 and 138, after being charged to one-half of the battery voltage 136, are then referenced to the negative battery potential (ground) to generate a positive potential equal to $+0.5V_{batt}$. Alternatively, the positive sides of capacitors could be connected to ground to generate an inverted potential equal to $-0.5V_{batt}$.

The problem with charge pump converters is they operate efficiently only at specific conversion multiples determined by the number of flying capacitors. In other words, they are not voltage regulators. Specifically, as a desired load voltage $V_{out}$ deviates from the voltage $V_{CP}$ that the capacitor network produces, the charge pump cannot adapt. To bridge the voltage-differential between the charge pump's output voltage $V_{CP}$ and the desired output voltage $V_{out}$ requires a resistor or current source, and the voltage across that lossy element results in lost power and reduced efficiency. An analysis of charge pump efficiencies is provided in the above-referenced application Ser. No. 11/890,818.

The efficiency equation for single-mode charge pumps is illustrated graphically in FIG. 6A for various multipliers, including a doubler (curve 151), an inverter (curve 152), and fractional charge pumps (curves 153, 154 and 155). Curve 156 represents the efficiency of a charge pump designed to generate an output voltage equal to its input voltage, identical to a linear regulator's maximum theoretical efficiency, i.e. assuming no quiescent operating current. In each case, the efficiency of the charge pump increases as the ratio of the output voltage to the input voltage approaches an integral multiple of $\pm \frac{1}{2}V_{batt}$. Above that voltage ratio, the charge pump is not capable of operating, and a different capacitor multiplier, i.e. a different operating mode, must be employed.

Each curve shown in graph 150 represents a specific charge pump circuit, e.g. including those shown in FIGS. 5A-5F. Unless a load operates at an exact half-volt integral multiple of the input voltage, however, the efficiency of a charge pump converter using one or two capacitors will suffer. This behavior is especially problematic for battery-powered products, since the battery voltage may change markedly as the cell discharges. In the case of LiIon batteries, for example, the voltage can decay more than 1V during discharge, representing a 25% change. Even if the peak efficiency may be high at one specific operating condition and battery voltage, the overall efficiency of the converter averaged over the battery discharge curve is poor. Weighted average efficiencies can be lower than 60% using a single-mode charge pump.

One way to improve the average efficiency of the converter is to switch modes between conversion ratios of 1X, 1.5X and 2X automatically within one circuit. This feature is particularly useful to supply a fixed voltage over a wide input range. The efficiency of a mode-changing charge pump is illustrated in FIG. 6B, where as the battery decays the tri-mode converter circuit switches from a 1X-battery-direct mode having an efficiency shown by curve 163, to a 1.5X-fractional-mode having an efficiency shown by curve 162, and then to 2X-doubler-mode having an efficiency shown by curve 161. By switching modes in this zigzag pattern, the efficiency of the charge pump converter is improved because the output is not pumped to an excessively high value compared to the load.

Unfortunately, conditions still exist where the efficiency suffers substantially. The mode transitions exhibit dramatic shifts in efficiency at a conversion ratio of one (curve 163), and again at a conversion ratio of 1.5 (curve 162). The mode transitions may also result in sudden current and voltage discontinuities, or produce instability or noise. To determine what conversion ratio, is required graph 160 also includes curves 166, 165, and 164, relating the input voltage range and conversion ratios required to produce output voltages of 3V, 3.5V and 4V, respectively.

Specifically, the charge pump converter in 1.5X mode does not perform well for conditions slightly above a unity conversion ratio, unfortunately manifesting efficiencies that are even lower than the efficiency of an inductive Buck-boost converter.

Dropout in Prior Art Regulators

Whenever the input and the output voltages of a voltage converter approach a range of several hundred milli-volts of each other, e.g. $V_{out} \approx V_{in} \pm 200$ mV, the quality of the converter's regulating ability suffers. Loss of regulation quality may be manifest in several ways, either by a one-time or repeated glitch or discontinuity in output voltage, by increased ripple, or by complete loss of regulation within some narrow voltage band. The phenomenon of degraded regulation whenever $V_{out}$ approaches $V_{in}$ is referred to as "dropout", meaning the converter "drops out" of regulation.

The Buck converter 1 of FIG. 1A and the boost converter 10 of FIG. 1B both momentarily lose regulation as their switching duty factor jumps from $D_{max}$ or $D_{min}$ to 100% and they completely lose regulation while D=100% since the input is essentially resistively connected to the output during the dropout condition.

While the Buck-boost converter doesn't really exhibit permanent dropout, it can easily suffer a voltage glitch during mode transitions whenever the converter mode switches from a Buck converter into its Buck mode into its Buck-boost mode, or when switching from Buck-boost mode to boost mode. Mode transitions occur whenever the converter changes from a circuit having two power devices switching into one where four devices are switching, or vice versa.

To avoid the mode-switching problem, a Buck boost converter can be run continuously in Buck-boost mode, with all four power MOSFETs switching continuously, but then its efficiency is degraded under all input-output conditions and conversion ratios.

As stated previously, the charge pump is incapable of regulating voltage without the use of a series connected linear regulator to provide the regulation function. Unfortunately, it is well known phenomenon that all linear regulators exhibit loss of regulation, i.e. dropout, whenever the $\Delta V$ across the linear regulator's input and output terminals becomes too small. In essence, dropout occurs in a linear regulator because the loop gain of the amplifier performing regulation drops precipitously as its transistor pass element changes from behaving as a current source to behaving as a variable resistor. If the pass element is a bipolar transistor, the loss of gain occurs at small values of $V_{CE}$ as the device transitions from its active operating region into saturation. In many bipolar linear regulators, this dropout condition occurs at more than 400 mV.

In so-called "low dropout" linear regulators, or "LDOs", a MOSFET capable of operating as a current source at a lower $\Delta V$ is substituted for the bipolar pass element, but the linear regulator still drops out at 200 to 300 mV as the power MOSFET pass element transitions from its saturation, i.e. constant current, region, into its linear, i.e. resistive, region of operation.

In conclusion, all prior-art non-isolated high-efficiency converters exhibit dropout at voltage conversion ratios approaching unity. Mode switching, loss of regulation and dropout can be avoided, but only by sacrificing efficiency. Isolated converters such as the flyback and forward converter are able to operate at high efficiencies near unity conversion without the need to switch modes, but their use of physically-large tapped inductors, coupled inductors, and transformers precludes their application in most portable products.

Summary of Prior-Art Down-Up Converters

In conclusion, no existing charge pump converter, Buck-boost switching regulator or other inductive switching regulator is able to both step-up and step-down DC voltages efficiently, especially for conversion ratios near unity where $V_{in} \approx V_{out}$. What is needed is an up-down converter that is efficient over a wide range of input and output voltages, and that does not need to change its operating mode as it approaches or operates near unity voltage conversion ratios. Furthermore the converter should be free from dropout problems, maintaining high-quality regulation even while biased with an output voltage within 200 mV of its input voltage, i.e. where $V_{out} \approx V_{in} \pm 200$ mV.

SUMMARY OF THE INVENTION

In accordance with this invention, a non-isolated DC/DC converter comprises a step-up, switched inductor pre-regulator and a switched-capacitor post-converter. The output terminal of the step-up, switched inductor pre-regulator is connected to the input terminal of the switched-capacitor post-converter. The switched-capacitor post-converter may comprise a charge pump that multiplies the voltage at its input terminal by an integral or fractional value, or it may be an inverter that multiplies the voltage at its input terminal by a negative integral or fractional value. The step-up, switched inductor pre-regulator may comprise a boost converter with an inductor connected in a series path with a low-side switch and a floating switch connected to a point in the series path between the inductor and the low-side switch. In some embodiments, each of the floating switch and the low-side switch comprises a MOSFET.

The pre-regulator steps the input voltage up and the post-converter may either step the voltage up or down by an integral or fractional value or the post-converter may multiply the input voltage by a negative integral or fractional value. Preferably the output voltage is controlled by a feedback path that may extend from the output of the pre-regulator or the post-converter to a pulse width modulation unit that controls the duty factor of the pre-regulator. In some embodiments, the feedback path includes a level shift unit or other circuitry that modifies the feedback signal.

The non-isolated DC/DC converter of this invention is capable of operating over a wide range of voltage conversion ratios ranging from step-up to step-down conversion without the need for mode switching. Free from mode switching and dropout problems when $V_{out} \approx V_{in}$, the converter does not suffer from noise glitches, poor regulation, and instability, even near unity input-to-output voltage conversion ratios. While the converter includes switched inductor operation, it avoids the minimum pulse width problem plaguing conventional switching regulators at very high and very low duty factors, including regulator dropout, narrow pulses and associated high-current spikes, variable frequency operation, inadequate time to perform break-before-make transitions.

Another aspect of this invention comprises a method of converting a first DC voltage to a second DC voltage. The method comprises: providing at least one inductor and at least one capacitor; during a first time interval coupling a first terminal of the at least one inductor to the first DC voltage; during a second time interval allowing the first terminal of the at least one inductor to float, thereby producing an intermediate voltage at the first terminal of the at least one inductor; during a third time interval coupling a first terminal of the at least one capacitor to the intermediate voltage and coupling a second terminal of the at least one capacitor to a third voltage; and during a fourth time interval coupling the second terminal of the at least one capacitor to the intermediate voltage and coupling the first terminal of the at least one capacitor to an output terminal, thereby providing the second DC voltage at the output terminal. Variations of the method comprise, during the fourth time interval, coupling the second terminal of the at least one capacitor to a fourth voltage and coupling the first terminal of the at least one capacitor to an output terminal or coupling the first terminal of the at least one capacitor to ground and coupling the second terminal of the at least one capacitor to an output terminal.

BRIEF DESCRIPTION OF THE DRAWINGS

FIG. 3A is a circuit diagram of a cascaded Buck-boost converter.

FIG. 3B is a circuit diagram of a cascaded boost-Buck converter.

FIG. 19C is an equivalent circuit diagram of the 1.5X LCUU converter during the charging stage.

FIG. 23B is an equivalent circuit diagram of the −1X LCUI converter during the magnetizing and discharging stage.

FIG. 23C is an equivalent circuit diagram of the −1X LCUI converter during the charging stage.

FIG. 26E is a functional representation of a 1.5X LCUU converter during the charging stage.

FIG. 26F is a functional representation of a 1.5X LCUU converter during the discharging stage.

FIG. 26G is a functional representation of a −1X LCUI converter during the charging stage.

FIG. 26H is a functional representation of a −1X LCUI converter during the discharging stage.

FIG. 26I is a functional representation of a −0.5X LCUI converter during the charging stage.

FIG. 26J is a functional representation of a −0.5X LCUI converter during the discharging stage.

DESCRIPTION OF THE INVENTION

Figure 7:
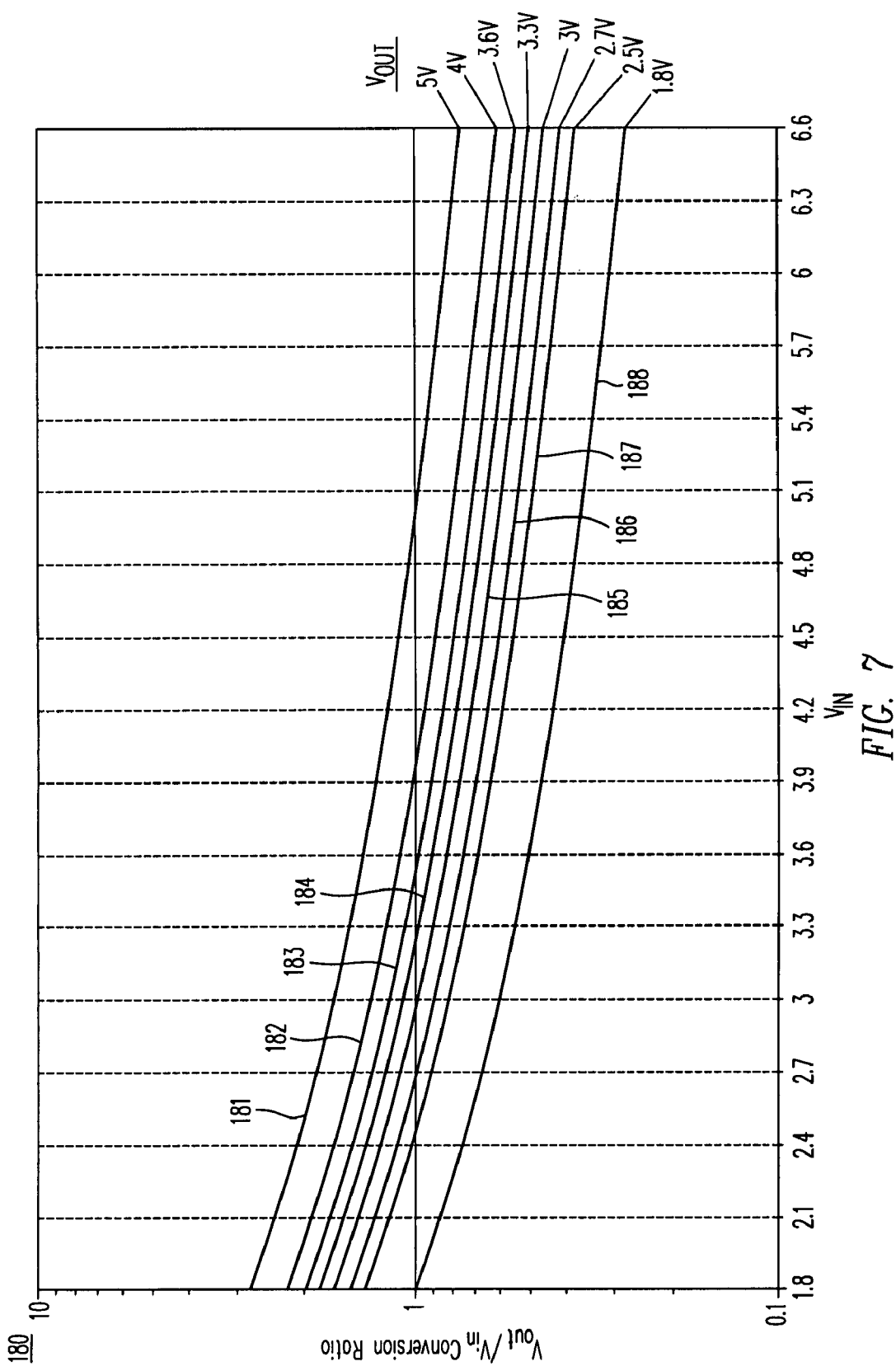
FIG. 7 is a graph of the voltage conversion ratio versus the input voltage for various output voltages.

FIG. 7 graphically illustrates the requisite voltage conversion ratio $V_{out}/V_{in}$ of a DC/DC converter operating at a variety of voltage outputs and for inputs ranging from 1.8V to 6.6V. Curve 181 illustrates that for a 4.5V to 5.5V input range, regulating a 5V output to ±1% accuracy requires operation above and below a unity conversion ratio, meaning an up-down regulating converter is required to hold a tighter tolerance than the ±5% or ±10% accuracy commonly guaranteed by AC/DC wall adapters.

Another need for up-down conversion occurs when using a lithium ion battery to produce a voltage intermediate to its wide voltage range. As examples, curves 182, 183, 184 in FIG. 7 illustrate outputs at 4V, 3.6V, and 3.3V, respectively. Since these load voltages fall within the LiIon battery's normal discharge voltage range of 4.2V to 3V, the converter must regulate in step-down mode with a voltage conversion ratio below unity at the beginning of the cell's discharge cycle, and in step-up mode with a conversion ratio above unity later as the cell voltage decays.

Curve 185 illustrates a 3V output which theoretically should require only step down conversion, but because of the aforementioned problem of dropout, a LiIon battery supplying a 3V output must cutoff above 3.2V, thereby wasting useful battery life. New generation LiIon cells under development may allow operation down to 2.7V, requiring the utilization of up-down conversion for 2.7V outputs, as shown by curve 186. At a 2.5V battery condition, dropout issues may also require the use of an up-down converter even to supply a regulated 2.5V output, as shown by curve 187. If, however, up-down conversion results in a loss of efficiency exceeding the extra operating time gained by the extended battery range, then the user lifetime benefit of using a battery capable of lower voltage operation is lost entirely.

Similarly, dropout concerns make it difficult to guarantee a 1.8V regulated output, shown by curve 188, from 2-cell-connected nickel-metal-hydride (NIMH) or nickel-cadmium (NiCd) batteries, since their outputs range from 2.4V down to 1.8V. Stopping usage at a 2V battery condition unacceptably wastes more than half the battery's charge life.

Other examples of the need for an efficient low dropout up-down converter are power supplies designed to work off of either two NiMH dry-cells, two alkaline cells, or a single cell LiIon battery. Since the output voltage of 2-series-cell NiMH battery packs ranges from 1.8V to 2.4V, the output voltage of 2-series-cell alkaline batteries ranges from 1.8V up to 3.4V during charging, and the output voltage of single-cell LiIon batteries ranges from 4.2V down to 3V or even 2.7V, then any output voltage from these sources between 4.2V and 1.8V needs an up-down converter to maximize efficiency and battery life, including the output voltages represented by curves 182 through 188.

If we also consider that some systems allow the DC output from a AC/DC wall adapter to be connected to a system's DC/DC converter without a battery present, the input voltage supplied to the converter can be considerably higher than if the battery were present, and may reach as high as 6.5V. When the battery is present and the charger disconnected, the input voltage may be as low as 1.8V. In such cases, every output voltage represented by curves 181 to 188, i.e. from 5V down to a 1.8V output, requires an up-down converter.

Today most electrical loads are supplied by an up-only or down-only converter, and the battery is cut off prematurely to avoid requiring up-down conversion, even at the expense of wasting usable stored charge in a battery. Up-down conversion is therefore avoided at any cost except in extreme situations. With the poor efficiency, mode switching, noise glitches, regulation dropout, and poor regulation found in existing up-down converters, be they DC/DC converters, charge pumps, or linear regulators; a requirement for up-down conversion in so many situations is extremely problematic and conflicts with the needs of today's efficiency-focused consumer marketplace.

A New DC/DC Converter Topology

This invention introduces a new non-isolated DC/DC converter and voltage regulation topology capable of operating over a wide range of voltage conversion ratios ranging from step-up to step-down conversion without the need for mode switching. Free from mode switching and dropout problems when $V_{out} \approx V_{in}$, the converter does not suffer from noise glitches, poor regulation, and instability, even near unity input-to-output voltage conversion ratios. While the converter includes switched inductor operation, it avoids the minimum pulse width problems plaguing conventional switching regulators at very high and very low duty factors, including regulator dropout, narrow pulses and associated high-current spikes, variable frequency operation, and inadequate time to perform break-before-make sequences. In contrast, prior-art non-isolated DC/DC converters suffer from one or more of the above problems at extreme duty factors and near unity voltage conversion ratios.

The disclosed method and apparatus can be used in applications requiring up-down conversion, and avoids the problems of existing Buck-boost and flyback converters. While some embodiments of this invention provide for the implementation of up-down converters, variants include improved down-only regulating converters and DC/DC inverters capable of producing negative, i.e. below ground, supply voltages.

Collectively, the DC/DC converters of this invention comprise three new converter topologies and variants thereof, referred to by the following acronyms:

LCUD—switched inductor-capacitor up-down converter
LCUU—switched inductor-capacitor up-up converter
LCUI—switched inductor-capacitor up-inverting converter (inverter)

Specifically, this invention concerns switched inductor-capacitor converters comprising (a) an inductively implemented step-up pre-regulator feeding (b) a switched-capacitor step-up, step-down, or inverting post-converter. As a matter of nomenclature, the initial "L" in the acronym represents the energy storage element, i.e. the coil or inductor, in the converter's first, or pre-regulator, stage and the "C" in the acronym represents the capacitive energy storage element in the second, or post-converter, stage.

The third character "U" in the acronym describes the pre-regulator as a step-up converter, meaning the magnitude of the positive input voltage is increased before it is supplied as an intermediate voltage to the input terminal of the post converter. The fourth character in the acronym—"D", "U" or "I"—describes whether the post-converter is stepping the output of the pre-regulator down or up, or inverting it. For example, "up" for a positive voltage means generating a larger positive voltage, "down" means generating a lower positive voltage, and inverting means generating a voltage having an opposite polarity.

These topologies, described by the acronyms LCUD, LCUU, and LCUI, vary in their utility for differing applications, and can be collectively described as LCUX regulating converters, the X referring to a variable U for up, D for down, and I for inverting, respectively.

The above-referenced application Ser. No. 11/890,818 describes switched inductor-capacitor converters comprising a switched inductor step-down type pre-regulator followed by a switched capacitor step-down, step-up, or inverting post-converter. Collectively these LCDX type regulating converters include the following:

LCDU—switched inductor-capacitor down-up converter
LCDD—switched inductor-capacitor down-down converter
LCDI—switched inductor-capacitor inverting-down converter (inverter)

Related application Ser. No. 11/890,941 titled "High-Efficiency DC/DC Voltage Converter Including Capacitive Switching Pre-Converter And Up Inductive Switching Post-Regulator," and Ser. No. 11/890,994, titled "High-Efficiency DC/DC Voltage Converter Including Capacitive Switching Pre-Converter And Down Inductive Switching Post-Regulator," each of which is filed contemporaneously with this application and each of which is incorporated herein by reference in its entirety, describe switched capacitor-inductor regulating converters with a pre-converter that includes a switched capacitor stage and a post-regulator that includes a switched inductor stage.

Switched Capacitor-inductor (LCUX) Regulating Converters

Figure 8:
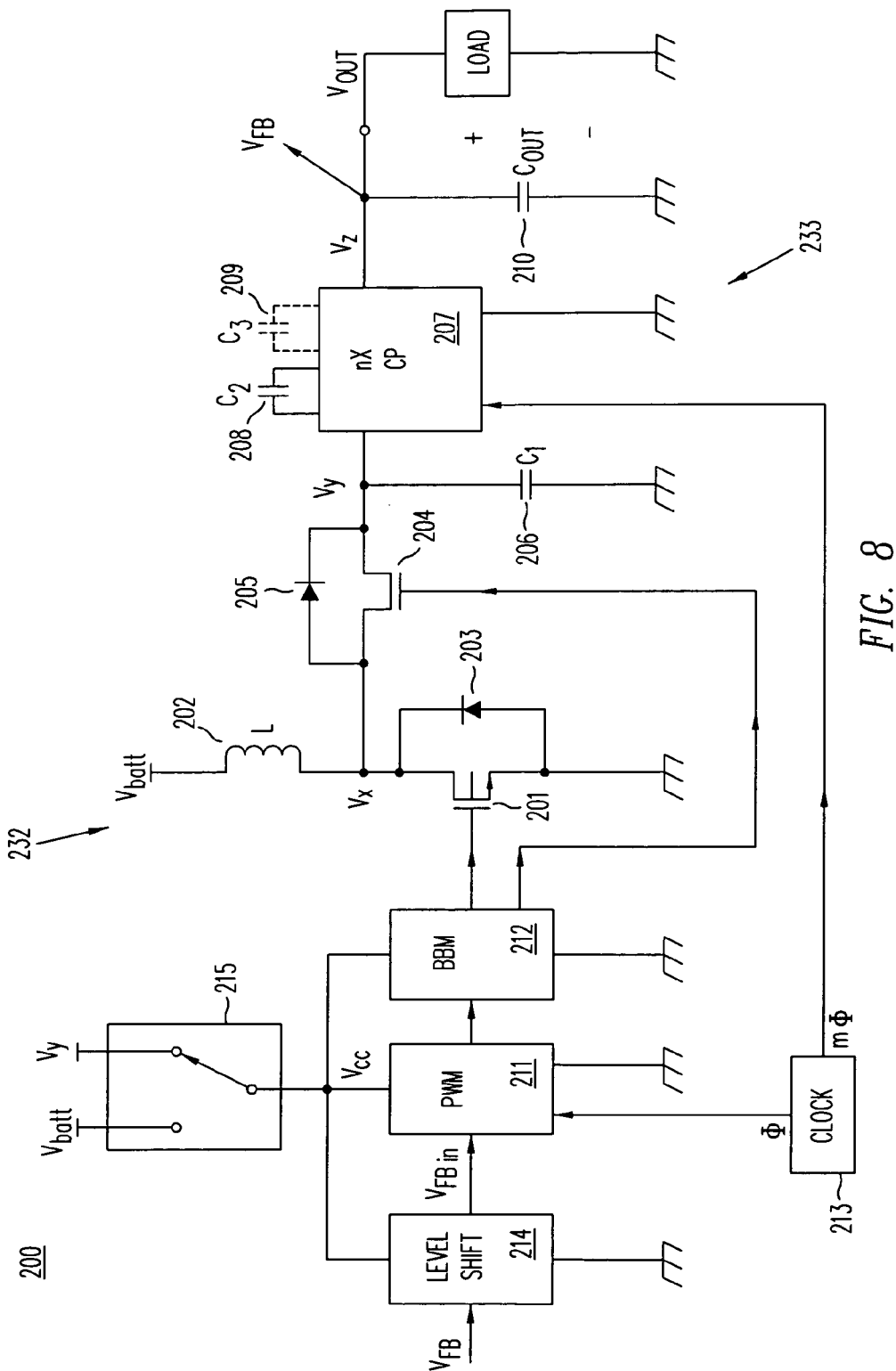
FIG. 8 is a generalized schematic circuit diagram of a switched LCUX converter in accordance with the invention.

FIG. 8 illustrates a switched LCUX converter 200 comprising a step-up, switched inductor pre-regulator 232 supplying an intermediate voltage $V_y$ to a post-converter 233 comprising a switched capacitor converter 233. Post-converter 233 contains a charge pump 207 with a voltage conversion ratio n. The output voltage $V_{out}$ is used as feedback to control the operating condition and output of the pre-regulator 232. The pre-regulator 232 is regulated for optimum efficiency to maintain an output $V_y$ at a 1/n multiple of the desired output voltage $V_{out}$. In the closed loop, the combined pre-regulator 232 and post-converter 233 dynamically adjust the output voltage to produce a well-regulated output at a desired voltage $V_{out}$.

Within converter 200, the switched-inductor pre-regulator 232 comprises a PWM controller 211, a break-before-make gate buffer 212, a low-side N-channel power MOSFET 201, a floating synchronous rectifier power MOSFET 204 with an intrinsic PN diode 205, and an inductor 202. A filter capacitor 206 is connected across the output terminal of pre-regulator 232 to insure stability, reduce ripple, and improve transient response. In this embodiment of the invention, the step-up switched-inductor pre-regulator is topologically configured as a synchronous boost converter, although any step-up switched inductor DC/DC converter may be used. For example, MOSFET 204 may be eliminated and diode 205 may be replaced by a Schottky rectifier to implement a conventional boost converter in lieu of the synchronous boost converter shown. Alternatively, the step-up switched inductor DC/DC converter could comprise a flyback converter, a forward converter, a çuk converter, or a bridge converter.

PWM controller 211 controls the on-time of low-side N-channel MOSFET 201 by varying the duty factor D of pre-regulator 232 in response to its feedback input, operating at a fixed frequency φ as determined by ramp generator clock 213. The duty factor D is defined as the percentage of the time that low-side MOSFET 201 is turned on to magnetize the inductor 202, as described below. Alternatively, PWM controller 211 may operate at a variable frequency with either a fixed or variable on-time for N-channel 201.

Whenever N-channel MOSFET 201 is turned on, a current flows from the input terminal of pre-regulator 232 ($V_{batt}$) through inductor 202. Inductor 202 is thereby magnetized, storing energy in an amount equal to ½LI² and resisting any rapid changes in current. At the switching frequency φ, the current in inductor 202 cannot react to the rapid switching of MOSFET 201 so that the inductor behaves as a nearly lossless current source, whose average current changes slowly, over many clock cycles in response to modulation of the pulse widths provided by PWM controller 211. During the intervals in which inductor 202 is being magnetized, no energy flows from the battery or inductor 202 into post-converter 233, and an output capacitor 210 supplies any current required by load 216.

Whenever low-side MOSFET 201 is not conducting, inductor 202 drives the intermediate voltage $V_x$ above the output voltage $V_{out}$ of converter 200, forward biasing diode 205 and allowing current in inductor 202 to flow uninterrupted, i.e. to recirculate through filter capacitor 206 and charge pump 207. If both MOSFETs 201 and 204 are turned off, the power dissipated in diode 205 is equal to $I_L \cdot V_f$, where $V_f$ is the forward voltage across P-N junction diode 205. Floating synchronous rectifier MOSFET 204 conducts all or some portion of the time whenever N-channel MOSFET 201 is off, shunting current from diode 205 and redirecting the recirculation current through the channel of floating MOSFET 204. Since MOSFET 204 conducts current only when rectifier diode 205 is conducting, it operates as a "synchronous" rectifier, although conduction in MOSFET 204 may occur only during a portion of the time that diode 205 is conducting. Thus, MOSFET 204 is "synchronized" with diode 205 in the sense that MOSFET 204 is always turned off (non-conducting) whenever diode 205 is reverse-biased (non-conducting). When synchronous rectifier MOSFET 204 is conducting current, the voltage drop across MOSFET 204 is equal to $I_L \cdot R_{DS}(on)$, and its instantaneous power dissipation is $I_L^2 \cdot R_{DS}(on)$.

Alternatively, as described in application Ser. No. 11/890,947, titled "Low-Noise DC/DC Converter With Controlled Diode Conduction," filed contemporaneously herewith and incorporated herein by reference in its entirety, the synchronous rectifier MOSFET may remain on but controlled in a manner to limit the magnitude of its drain current, when it is not being operated as a fully-on device. By alternating between a resistive switch state and a low-current constant-current mode, the method reduces electrical noise in switched-inductor converters.

Break-before make buffer 212 insures that low-side power MOSFET 201 and floating power MOSFET 204 never conduct simultaneously to prevent shoot-through conduction, which would short out the load. Shoot-through conduction, the "crow barring" of the input from overlapping conduction, is an undesirable condition leading to wasted power, a loss of efficiency, and potentially MOSFET device damage. While BBM intervals must be sufficiently long to prevent shoot-through, excessively long BBM intervals are also undesirable since they force diode 205 to carry current for longer times and to dissipate more power.

Except for the BBM period, synchronous rectifier MOSFET 204 ideally should be turned on and conducting whenever low-side MOSFET 201 is off. In some circumstances, however, it may be advantageous to turn off synchronous rectifier MOSFET 204 prematurely or not to turn it on at all. For example, at very low output currents, unwanted oscillations and reverse current flow may occur if MOSFET 204 is left on for an extended duration. Shutting MOSFET 204 off disables channel conduction, and diode 205 under a reverse bias condition prevents reverse current conduction, improving the light load efficiency of converter 200.

Alternatively, as described in the above-referenced application Ser. No. 11/890,818, synchronous rectifier MOSFET 204 may remain on, but it may be controlled in a manner to limit the magnitude of its drain current when it is not being operated as a fully-on device. Operating the synchronous rectifier MOSFET in such a way that it alternates between a resistive switch state and a low-current constant-current mode reduces the electrical noise.

Charge pump 207 in post-converter 233 scales the voltage $V_y$ delivered by the inductive pre-regulator 232 by a factor "n" to produce an output voltage $V_{out}$. Charge-pump 207, including capacitor 208 and optionally capacitor 209 or more capacitors, comprises a switched-capacitor network producing a variety of voltage multiplication factors, including doubling, inverting, fractional, or fractional-inverting. The node biased at the intermediate voltage $V_y$, forms the input to charge pump 207, and may be connected to ground through filter capacitor 206, depending on various design considerations. The output of charge pump 207 is filtered by output capacitor 210.

In greater detail, converter 200 converts the input voltage $V_{batt}$ to an intermediate voltage $V_y$ using a step up switched inductor boost pre-regulator 232. The voltage $V_y$ is then scaled by a factor nX using a capacitor network with flying capacitors 208 (optionally) 209. The conversion ratio nX of switched-capacitor post-converter 233 may be step-up, step down, or inverting. Step-down conversion in the post-converter 233 of a switched LCUD converter can include a dual-capacitor fractional implementation, where n=0.5.

In the event that post converter 233 performs a step-up conversion, e.g. implementing a single capacitor doubler where n=2, or a dual-capacitor fractional version where n=1.5, converter 200 operates as a LCUU (up-up) converter.

An inverting form of post converter 233 may utilize a single capacitor circuit, where n=−1 or a fractional-type dual capacitor, where n=−0.5. Following the nomenclature defined above, such an inverter is referred to a CLUI converter In a preferred embodiment, the output voltage $V_{out}$ is sent to the input terminal of level-shifter 214 as a feedback signal $V_{FB}$. Feedback signal $V_{FB}$ is converted by level-shifter 214 to a voltage $V_{FBin}$ that is used to control PWM circuit 211. Alternatively, intermediate voltage $V_y$ can be used to control PWM circuit 211. As shown below, the value of $V_y$ is very important in setting the overall efficiency of LCUX converter 200.

In the preferred embodiment, the voltage $V_{FBin}$ produced by level-shifter 214 should force the value of $V_y$ to a voltage $V_{out}/n$. In the case of an LCUD or LCUU converter level-shifter 214 may comprise a network of two resistors (not shown) acting as a voltage divider. In a LCUI inverter an alternative circuit (described below) is typically employed in level-shifter 214.

Another feature of LCUX converter 200 is the use of clock 213 to control the switching of MOSFETs 201 and 204 in pre-regulator 232 and of charge pump 207 in post-converter 233. By synchronizing the switched inductor pre-regulator and switched capacitor post-converter circuits, the size of intermediate filter capacitor 206 can be greatly reduced or, in some cases, eliminated altogether.

Regulating Vout through $V_y$

One unexpected aspect of a LCUX converter is the dependence of its overall efficiency η on the value of the intermediate voltage $V_y$. Another important aspect is the way in which the voltage $V_y$ may be controlled with closed loop feedback to improve the converter's transient regulation.

Figure 9:
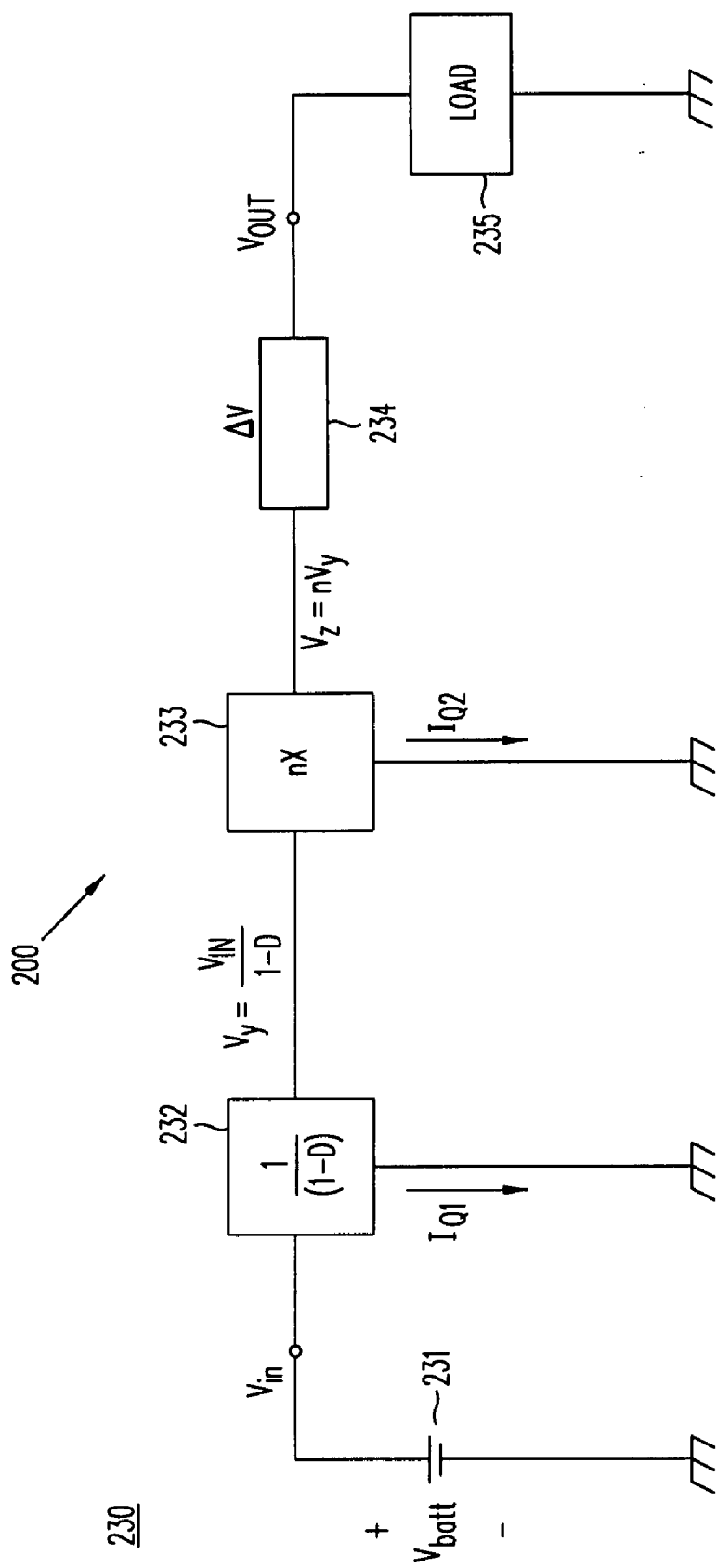
FIG. 9 is a block behavioral model diagram of the switched LCUX converter.

To better understand these considerations, the behavioral model 230 of FIG. 9 can be used for control analysis and for estimating efficiency. As shown, step-up pre-regulator 232 is powered from input voltage $V_{in}$ producing intermediate voltage $V_y$. In the LCUX topology, pre-regulator 232 operates as a step-up converter, providing an output voltage given by $$V_y = V_{in}/(1-D)$$

where D is the duty cycle of the low side MOSFET 210, ranging between 0% and 100%. This regulated up-conversion is represented graphically in FIG. 12A, where the battery input voltage $V_{batt}$ (curve 391) is multiplied by an varying factor 1/(1−D) to generate a constant voltage $V_y$ of 6.6V (curve 392).

Referring again to FIG. 9, $V_y$ in turn powers switched-capacitor post-converter 233 to produce a voltage $V_z$. The conversion ratio of post converter 233 is given by $$V_z = n \cdot V_y$$

or the voltage conversion ratio $V_z/V_y$ of post-converter 233 equals:

$$\frac{V_z}{V_y} = n$$

where n has discrete, quantized values equal, for example, to 2, 1.5, 0.5, −0.5 or −1.0, depending on the number of capacitors and the switch configuration in post-converter 233. For example in FIG. 12A, where n=0.5, the step-down post converter 233 halves the $V_y$ intermediate voltage (curve 392) to a constant 3.3V (curve 393).

Referring again to FIG. 9, the input voltage source 231 powers the entire LCUX converter. This power source may represent the output of any power supply but commonly comprises a LiIon battery. In the case of a battery, the cell voltage $V'_{batt}$ is substantially equal to $V_{in}$ except in the event of high-current transients when some voltage drop may occur inside the battery pack, further exemplifying the need for regulating voltage converters.

As shown, the output of LCUX converter 200 powers a load 235 operating at a voltage $V_{out}$, the desired output voltage of converter 200. The parasitic lossy element 234 is included schematically to model the impact of a voltage mismatch between the output voltage $V_z$ of post-converter 233 and the output voltage $V_{out}$ required to supply load 235. Assuming that the output voltage $V_z$ of post-converter 233 is substantially the same as the desired output voltage $V_{out}$, then the voltage ΔV across lossy parasitic element 234 is negligible, and $V_{out} \approx V_z$. Combining the above equations, yields the relation $$V_{out} \approx V_z = n \cdot V_y = n \cdot V_{in}/(1-D)$$

The voltage conversion ratio of LCUX converter 200 is thus equal to:

$$\frac{V_{out}}{V_{in}} = \frac{n}{1-D}$$

From this relationship, we can make the important observation that the product of the duty-factor dependent term 1/(1−D) of pre-regulator 232 and the conversion ratio "n" of post-converter 233 yields the output-to-input ratio of converter 200. In essence, to properly regulate the output voltage $V_{out}$, the duty factor D, the conversion ratio n, or both must be varied dynamically to compensate for changes in input voltage $V_{in}$.

Using a 0.5X post-converter, for example a divide-by-two fractional charge pump, the LCUX conversion ratio becomes that of an LCUD converter:

$$\frac{V_{out}}{V_{in}} = \frac{0.5}{1-D}$$

Figure 12A:
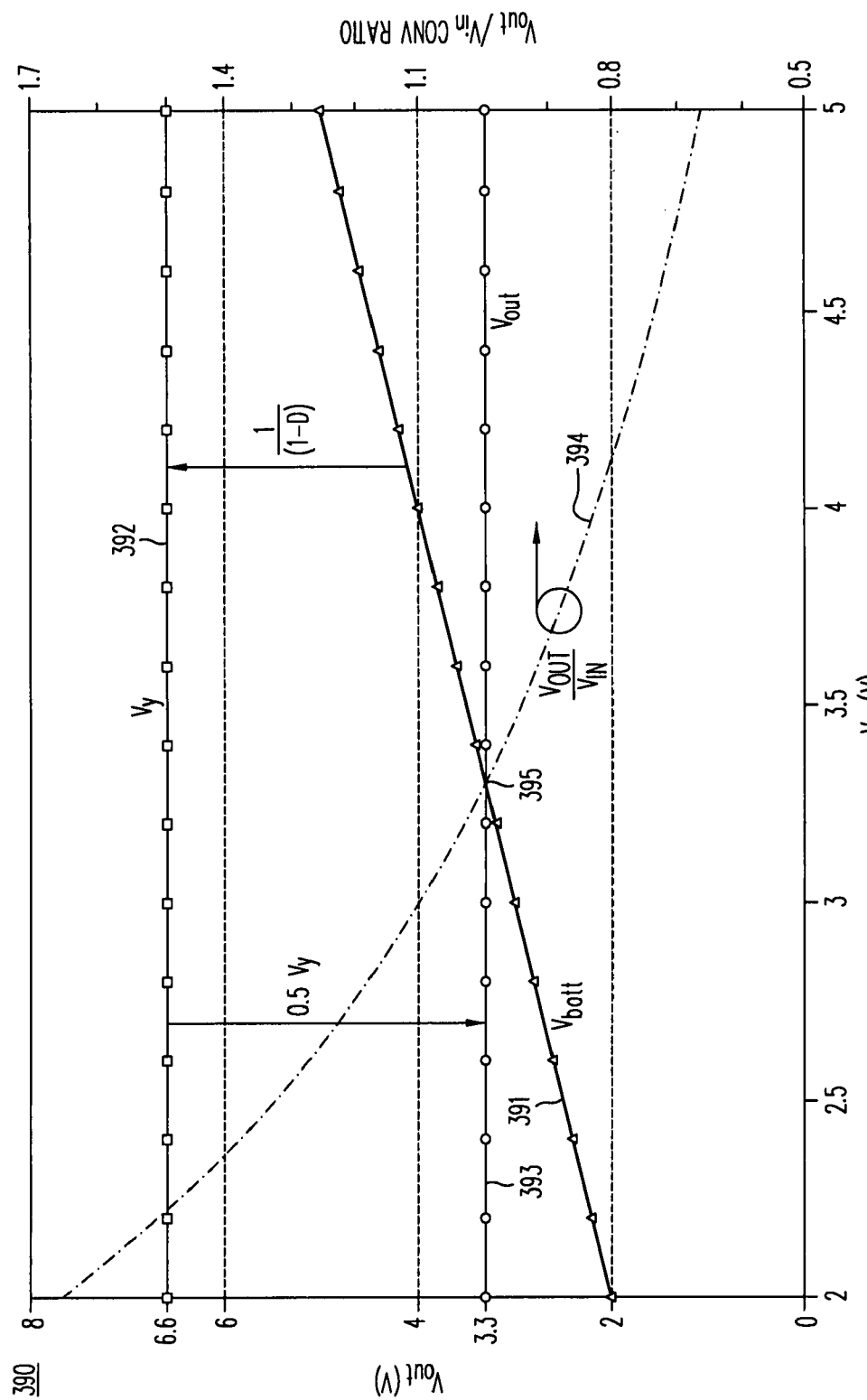
FIG. 12A is a graph showing $V_{out}$ as a function of $V_{in}$ for a 0.5X LCUD converter.

The conversion ratio of this 0.5X-type LCUD converter is illustrated by the dashed curve 394 in FIG. 12A. Curve 394 varies above and below unity, having a magnitude ranging roughly between 0.67 to over 1.6. At point 395, i.e. where $V_{in}$ =3.3V, the voltage conversion ratio is unity, and converter 200 is operating at the edge between step-up and step down conversion. Notice that LCUD converter 200 passes through this unity conversion condition without ever changing operating modes.

Figure 12B:
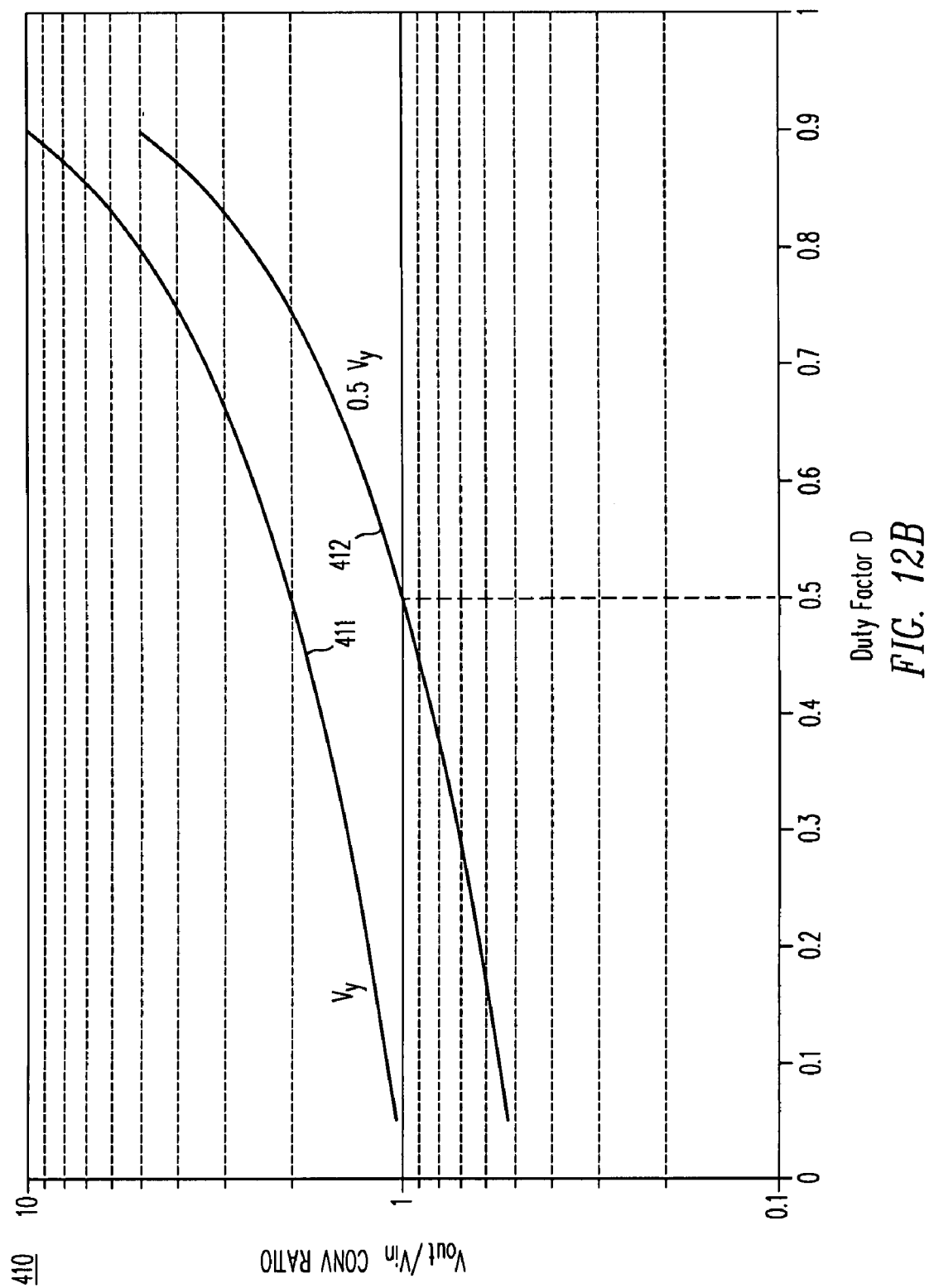
FIG. 12B is a semi-log graph showing the conversion ratio $V_{out}/V_{in}$ as a function of the duty factor of the pre-regulator for a 0.5X LCUD converter.
Figure 12C:
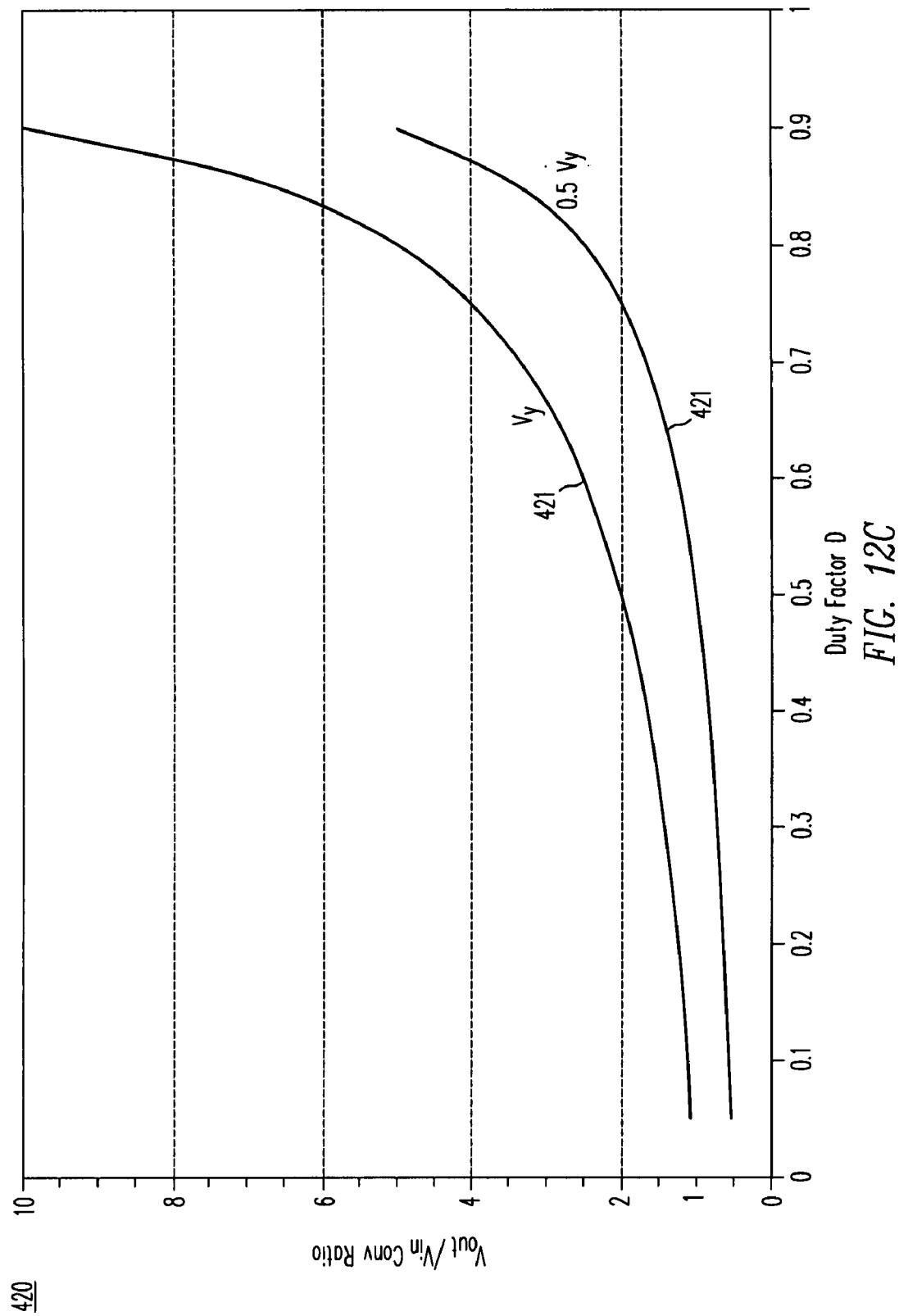
FIG. 12C is a linear graph showing the conversion ratio $V_{out}/V_{in}$ as a function of the duty factor of the pre-regulator for a 0.5X LCUD converter.

Further analyzing 0.5X-type LCUD 200, graph 420 of FIG. 12C illustrates that its voltage conversion ratio is inversely, i.e. hyperbolically, dependent on its duty factor D, as shown by curve 422, which is similar in shape to, but half the value of, $V_y$ (curve 421). The dependence of the conversion ratio on D is further illustrated by curve 412 in the semi-log graph 410 of FIG. 12B, Curve 412 has half the slope of $V_y$ (curve 411) describing the output-to-input ratio of pre-regulator 232. Notice that with post-converter 233 having a voltage transfer characteristic of 0.5, the LCUD regulator exhibits a unity conversion ratio at a comfortable 50% duty factor.

While theoretically the converter is able to regulate output voltages ratios from zero to twice the input voltage, operation below a 10% duty factor or above a 90% duty factor is complicated by the need for narrow on or off pulses, which are difficult to control. Instead, even by limiting the converter to duty factors ranging from 10% to 90%, the output voltage of the 0.5X LCUD converter covers a wide range, from a minimum step-down factor roughly 0.5 times the input to a maximum step-up factor 5 times the input—a voltage conversion range of over an order of magnitude.

At a unity conversion ratio, the duty factor of pre-regulator 232 is only 50%. At a 50% duty factor, a switching converter can easily be implemented for operation at high frequencies without being limited by the problematic extremes in duty factor suffered by conventional Buck, boost, and Buck-boost converter topologies.

Operation of a LCUX converter for other values of n is considered below. The fractional or 0.5X-type LCUD regulator is included here as an example.

Controlling $V_y$ for Maximum Converter Efficiency

The efficiency of LCUX converter 200 can also be estimated using behavioral model 230 of FIG. 9. For pre-regulator 232, the input power is given by $P_{in1}=I_{in} \cdot V_{in}$ while the output power is given by $P_{out1}=I_y \cdot V_y$. The efficiency of the pre-regulator 232 can then be expressed as $$\eta_1 = \frac{P_{out1}}{P_{in1}} = \frac{I_y \cdot V_y}{I_{in} \cdot V_{in}}$$

Figure 13A:
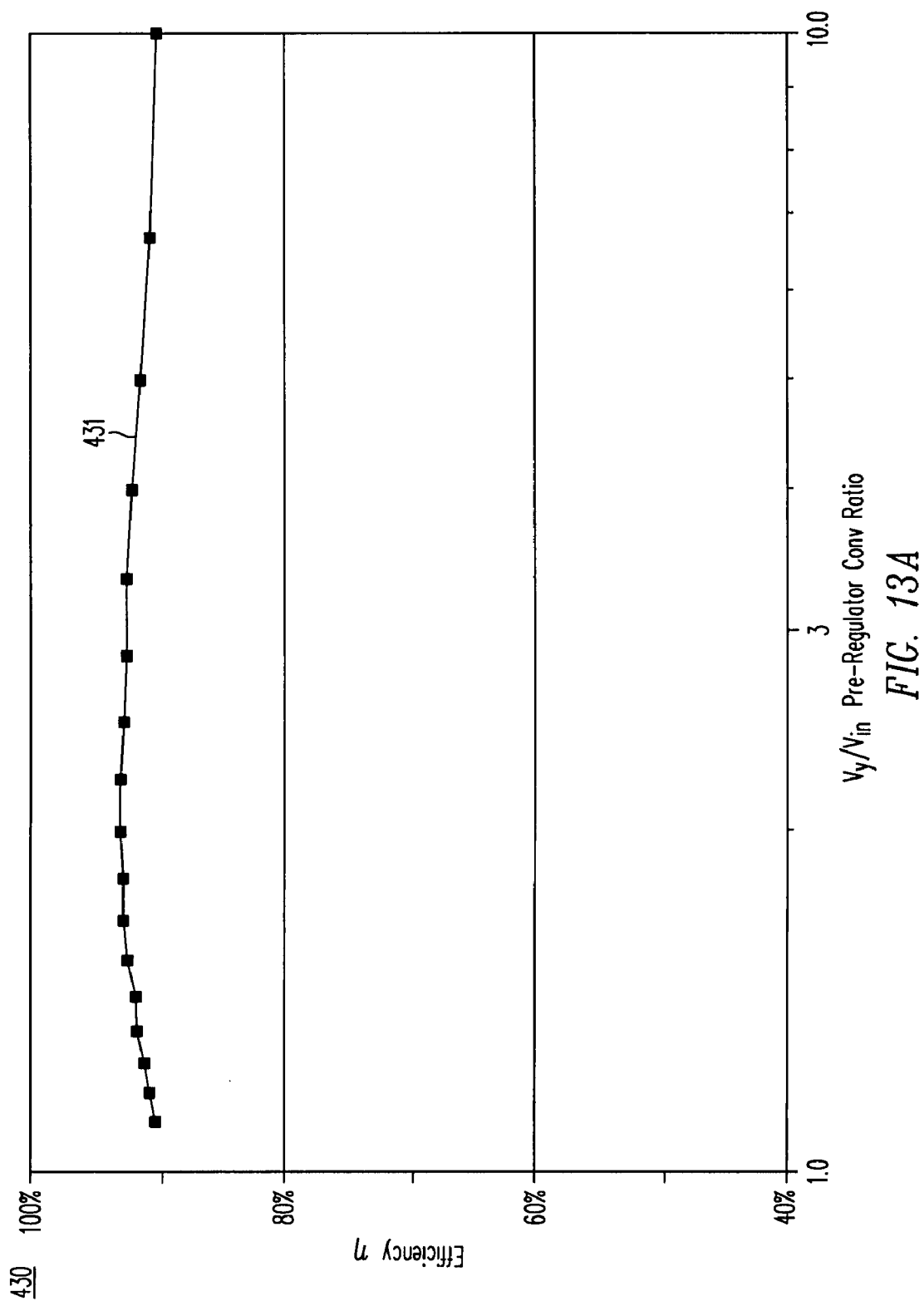
FIG. 13A is a graph showing the efficiency of a pre-regulator in a 0.5X LCUD converter as a function of the voltage conversion ratio of the pre-regulator.

FIG. 13A illustrates in graph 430 that the efficiency $\eta_1$ of pre-regulator 232 is relatively constant and independent of its voltage conversion ratio $V_y/V_{in}$. Typical values range from 93% to 89% depending on operating conditions, power MOSFET resistance and operating currents.

The charge pump in post-converter 233 typically has a maximum efficiency in the range of 96% when delivering power to a load operating at its output voltage $V_z$. Since a charge pump is simply a converter and not a regulator an analysis of its efficiency must consider the case when there is a mismatch between its output and the desired voltage needed to power an electrical load. Specifically, if for any reason, the post-converter's output $V_z$ is different from the desired output voltage $V_{out}$, the voltage error $\Delta V=V_z-V_{out}$ is no longer negligible and an additional loss of efficiency will result. This $\Delta V$ mismatch results in a loss that has the same mathematical form $\Delta V/V_{in}$ as the losses in a linear regulator, even though lossy element 234 is not really regulating voltage. Specifically the loss may be defined as $$P_{loss3}=I_{out} \cdot \Delta V=I_{out}(V_z-V_{out})$$

where $V_z>V_{out}$. The efficiency of the third stage, related to the lossy element 234, is then given by $$\eta_3 = \frac{P_{out}}{P_z} = \frac{P_z - P_{loss3}}{P_z} = \frac{I_{out}V_z - I_{out}(V_z - V_{out})}{I_{out} \cdot V_z} = \frac{V_{out}}{V_z}$$

where $V_{out} \leq V_z$, i.e. the maximum theoretical efficiency is limited to 100%. From the transfer function $V_z=n \cdot V_y$ then $$\eta_3 = \frac{V_{out}}{V_Z} = \frac{V_{out}}{nV_y}$$

Including the efficiency of charge pump 207, post-converter 233 has an efficiency given by $$\eta_{PC} = \eta_2 \eta_3 = \eta_2 \frac{V_{out}}{V_Z} = \frac{\eta_2}{n} \frac{V_{out}}{V_y}$$

Figure 13B:
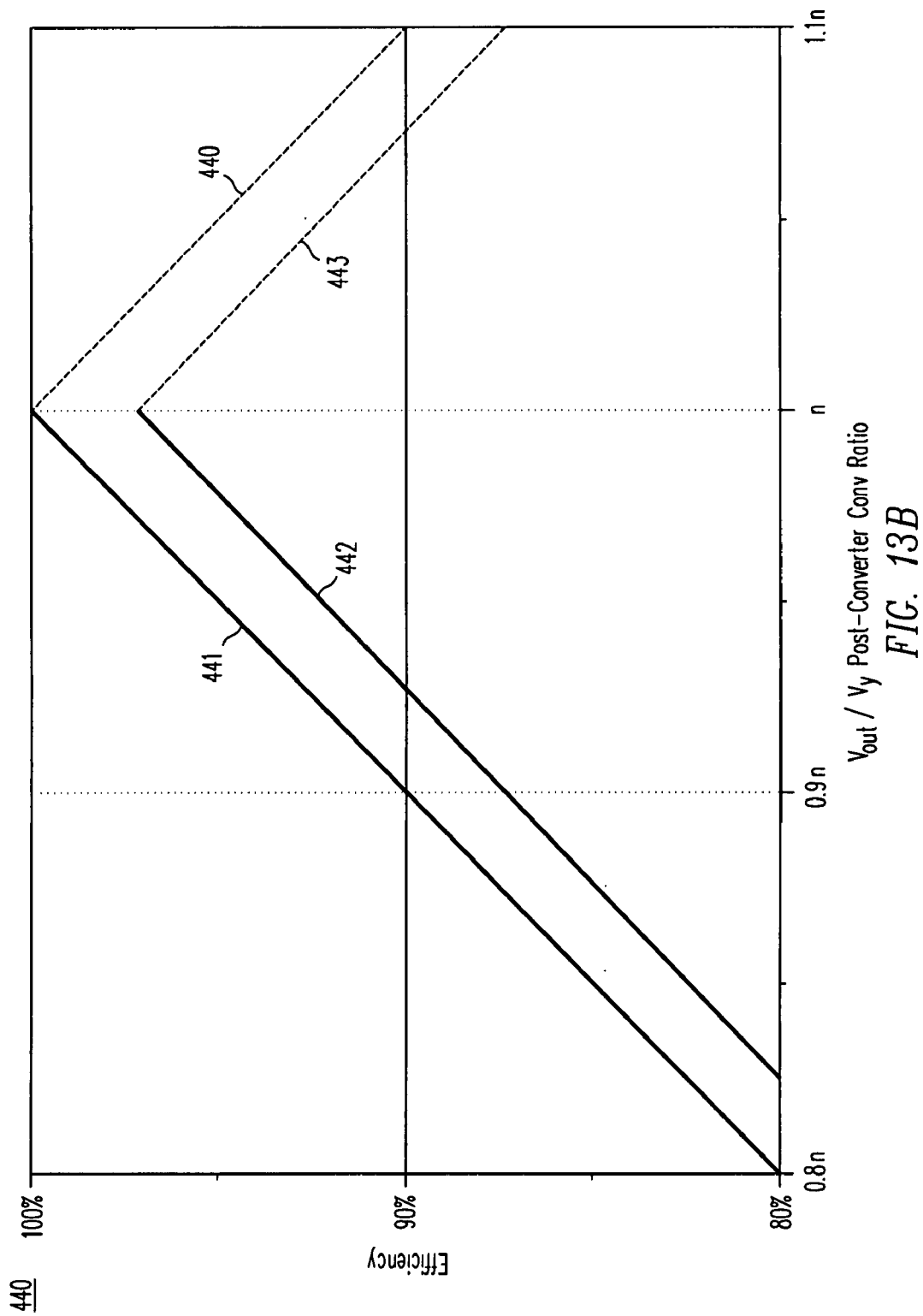
FIG. 13B is a graph showing the efficiency of a post-converter in a 0.5X LCUD converter as a function of the voltage conversion ratio of the post-converter.

The efficiency equation for post-converter 233, including the $\Delta V$ load mismatch, is illustrated in FIG. 13B where the post converter's voltage conversion ratio $V_{out}/V_y$ is plotted against its efficiency $\eta_{PC}$ in graph 440 for both ideal and real quiescent currents, shown by curves 441 and 442, respectively. In both cases, the efficiency of post converter 233 reaches its peak value when $V_{out}/V_y$ equals the conversion ratio "n", i.e. when $V_{out}=n \cdot V_y$.

For example, in a fractional type of post-converter, where n=0.5X, the maximum output voltage of the LCUD converter occurs when $V_{out}=0.5V_y$. Any deviation in $V_y$ from that condition reduces the LCUD converter's overall efficiency.

In the ideal case, reflected in curve 441, the quiescent operating current $I_{Q2}$ is substantially zero in the charge pump and its peak theoretical efficiency approaches 100%. In a real charge pump, some energy is lost operating the charge pump, its quiescent current $I_{Q2}$ is not zero and the peak efficiency is limited to less than 100%, specifically to some value $\eta_2$, typically 95 to 97%, as shown by curve 442.

Since the charge pump cannot produce an output voltage greater than "n" times its input, the efficiency for ratios of $V_{out}/V_y$ above n is not meaningful, but it does describe the shortfall of the charge pump output voltage $V_z$ from meeting the desired output voltage $V_{out}$. The curve shown as dashed line 440 is symmetric with curve 441 about the condition $V_{out}/V_y$=n. It is included here for completeness.

From the transfer function $V_z=n \cdot V_y=n \cdot V_{in}/(1-D)$ for converter 200, the efficiency can be re-expressed in terms of duty factor D rather than in terms of the intermediate voltage $V_y$. Accordingly, the efficiency impact of the $\Delta V$ mismatch can be described as $$\eta_3 = \frac{V_{out}}{V_Z} = \frac{(1-D) \cdot V_{out}}{n \cdot V_{in}}$$

and the efficiency of post-converter 233 can be described as $$\eta_{PC} = \eta_2 \eta_3 = \eta_2 \frac{V_{out}}{V_Z} = \frac{(1-D) \cdot \eta_2}{n} \frac{V_{out}}{V_{in}}$$

The total efficiency of LCUX converter 200 is then the product of the individual efficiencies, i.e.

$$\eta = \eta_1 \cdot \eta_2 \cdot \eta_3 = \left(\eta_1 \cdot \eta_2 \frac{1-D}{n}\right) \frac{V_{out}}{V_{in}}$$

For any given $V_{out}/V_{in}$ conversion ratio, this overall efficiency is the product of the individual efficiencies $\eta_1$ and $\eta_2$, and the mismatch between the load's desired operating voltage and the output of post-converter 233. This relationship is illustrated in graph 450 of FIG. 13C for a 0.5X LCUD regulator, where each line 451 represents a fixed duty factor D for a range of conversion ratios. As shown, low conversion ratios, e.g. below 0.3, exhibit lower efficiencies because the converter 200 is producing an output voltage that is too high for the load, i.e. $V_z > V_{out}$.

Provided that the load "clamps" the output voltage, the voltage differential $\Delta V$ is dropped across some lossy element, typically by saturating a MOSFET within charge pump 207, and the efficiency suffers. If the load cannot clamp the output voltage, converter 200 produces a voltage that is too high. In other words, to reach peak efficiency, LCUX converter 200 must be programmed to the desired output voltage and the load cannot clamp the output to a lower value, or the overall efficiency will be degraded.

Figure 13C:
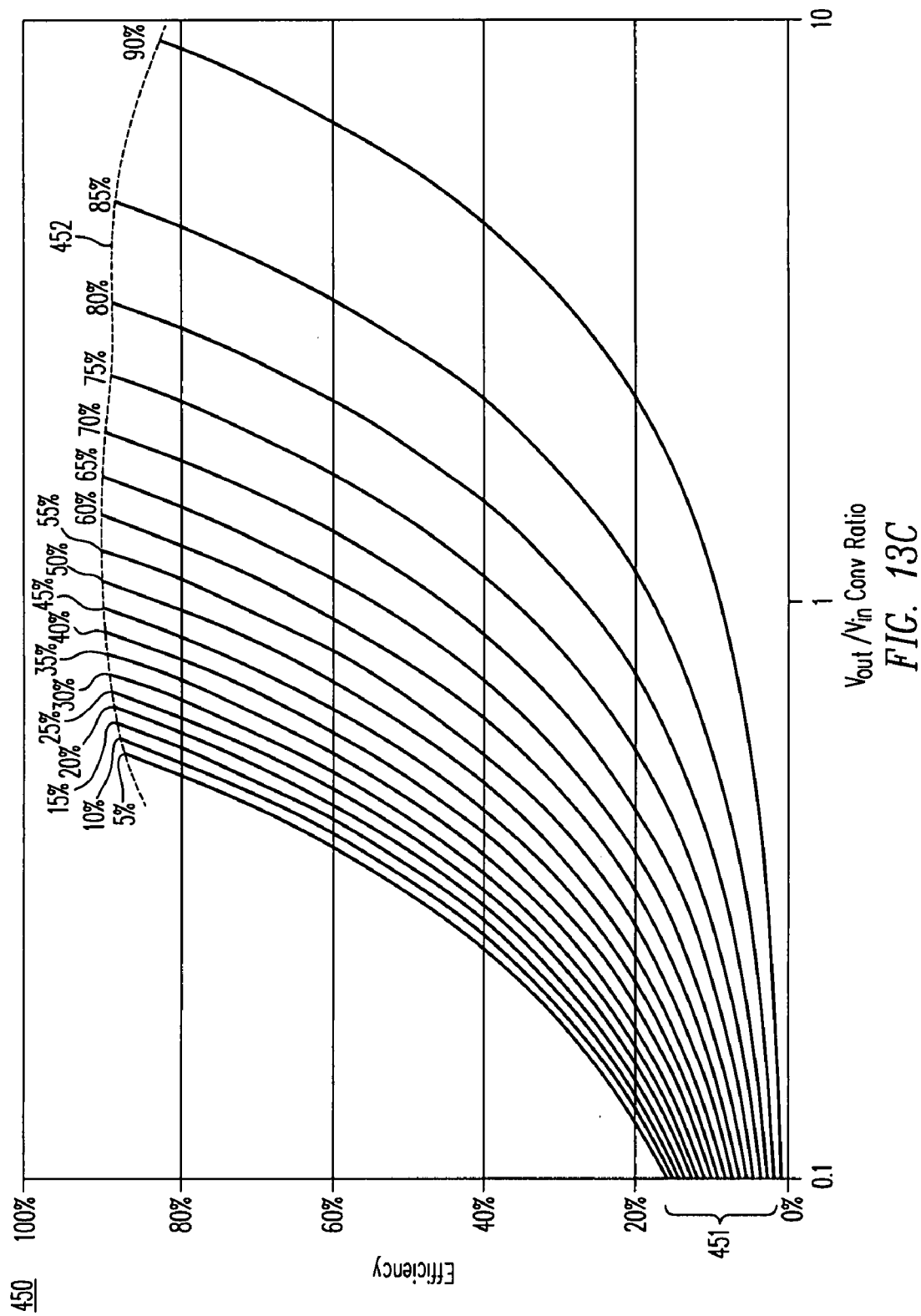
FIG. 13C is a graph showing the efficiency of a 0.5X LCUD converter as a function of the voltage conversion ratio of the converter.

The optimum efficiency occurs when $V_z > V_{out}$ and the desired load voltage is equal to n/(1−D), as illustrated by line 452 in FIG. 13C. In a 0.5X-type LCUD regulator, the peak efficiency occurs when 0.5/(1−D).

$$\frac{V_{out}}{V_{in}} = \frac{0.5}{1-D}$$

Therefore, for any given duty factor D there is one and only one $V_{out}/V_{in}$ ratio that exhibits maximum efficiency, i.e. there is a one-to-one correspondence between the voltage conversion ratio and the duty factor D to achieve maximum efficiency. In a 0.5X-type LCUD regulator, n=0.5, so the condition of peak efficiency occurs when D=50%, where $V_y=2 \cdot V_{in}$ and $V_{out}=0.5(2 \cdot V_{in})=V_{in}$.

Clearly, it is important to keep the converter in its high efficiency region of operation by controlling the duty factor D. This is accomplished through the use of feedback control techniques, specifically by maintaining an adequate but not excessive duty factor. Without feedback, open-loop operation could easily suffer a loss of efficiency as well as degraded regulation. Insufficient duty factors result in insufficient output voltages, excessive duty factors cause degraded efficiencies.

Even assuming that the duty factor D is dynamically adjusted to maximize efficiency, real LCUX efficiencies are limited because $\eta_1 \cdot \eta_2 < 100\%$ even when $V_{out}/V_{in} = n/(1-D)$, because of conduction and switching losses in the switched inductor pre-regulator and in the switched-capacitor post-converter. These effects are considered in asymptote 452 of graph 451 in FIG. 13C, where the product of $\eta_1 \cdot \eta_2$, together exhibit a slight dependence on duty factor D. Clearly, however, the greatest deviation from reaching peak efficiency occurs from excessive duty factors, over-pumping the converter's output $V_z$ to levels above the desired voltage $V_{out}$.

Properly controlled, a switching LCUD converter of this invention can produce a well regulated output in either step-up or step-down modes without exhibiting any mode changes, narrow pulse, or dropout effects near unity voltage conversion ratios, i.e. when $V_{out} \approx V_{in}$. The LCUD converter is able to operate over a range of output-to-input voltage ratios far beyond that of a Buck converter, boost converter or charge pump. Assuming a practical limitation on duty factor ranges between 10% and 90%, Table 1 compares the usable range of voltage conversion ratios of the LCUD converter to those of a charge pump doubler, Buck converter, and boost converter.

TABLE 1

| Converter Topology | Range of $V_{out}/V_{in}$ | Range of Efficiency | Unit Ratio Efficiency |
|---|---|---|---|
| 2 × Charge Pump | 0.1 to 1.9 | Above 1.8 | Poor, $\eta < 50\%$ |
| Boost Converter | 1.1 to 15 | Good up to ~4 | Dropout above 0.9 |
| Buck Converter | 0.1 to 0.9 | Good over range | Dropout below 1.1 |
| 0.5 × LCUD | 0.55 to 7 | Good over range | Good, $\eta > 90\%$ |

Despite its high efficiency characteristic, a boost converter operating between 10% to 90% duty factor is only capable of step-up conversion ratios, i.e. where $V_{out} = \{1.1V_{in} \text{ to } 15V_{in}\}$. Conversely, the efficiency of a 2X charge pump is high only for conversion ratios exceeding 1.8. In contrast, the efficiency of a LCUD converter remains high over a wide range of voltage conversion ratios, i.e. where $V_{out} = \{0.55V_{in} \text{ to } 7.5V_{in}\}$. This result is unexpected, considering that the LCDU converter contains elements of the charge pump and the boost converter, yet regulates over a much wider range of operating conditions than either of them.

Figure 11A:
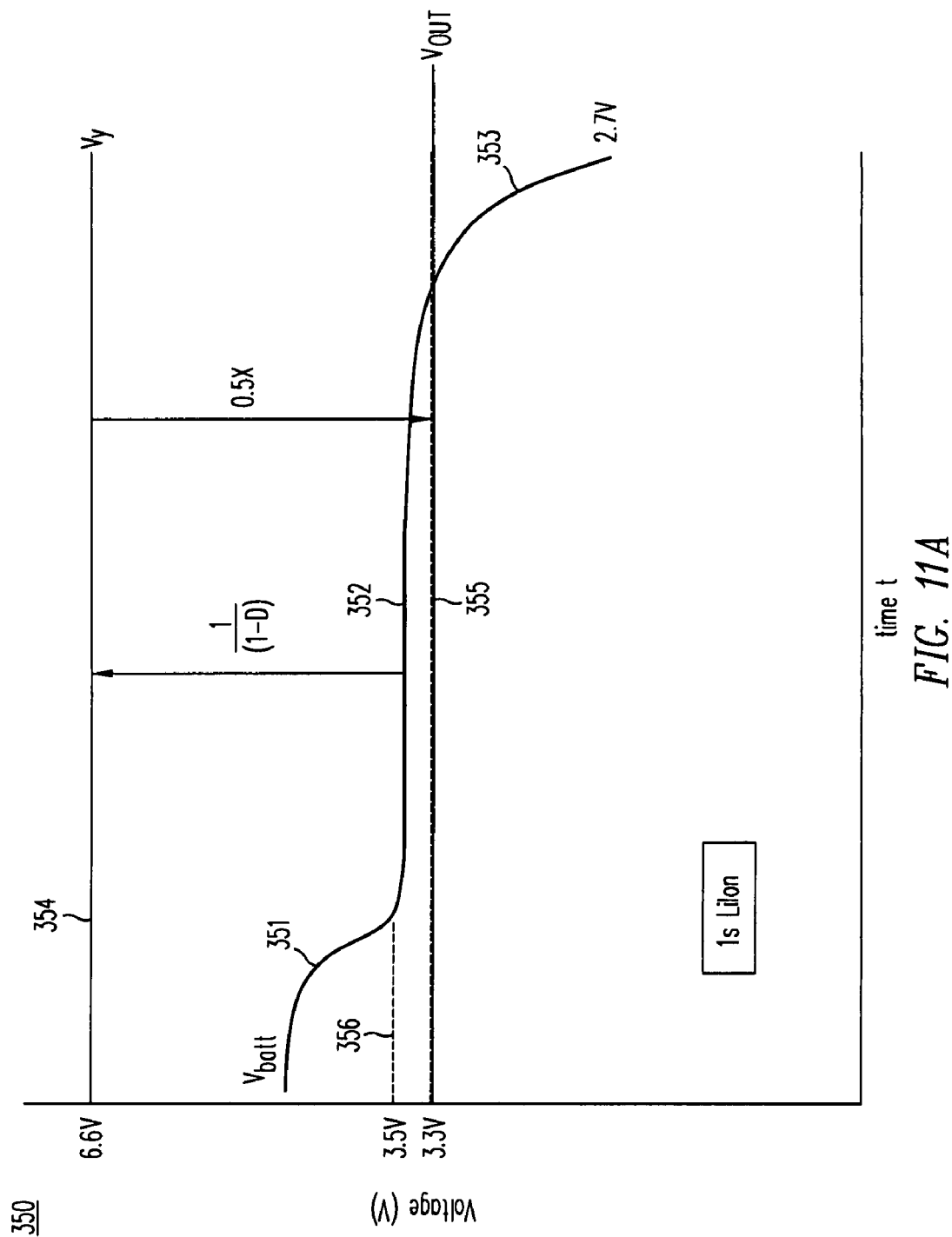
FIG. 11A is a graph illustrating the operation of the 0.5X LCUD converter with a 1-cell LiIon battery.
Figure 11B:
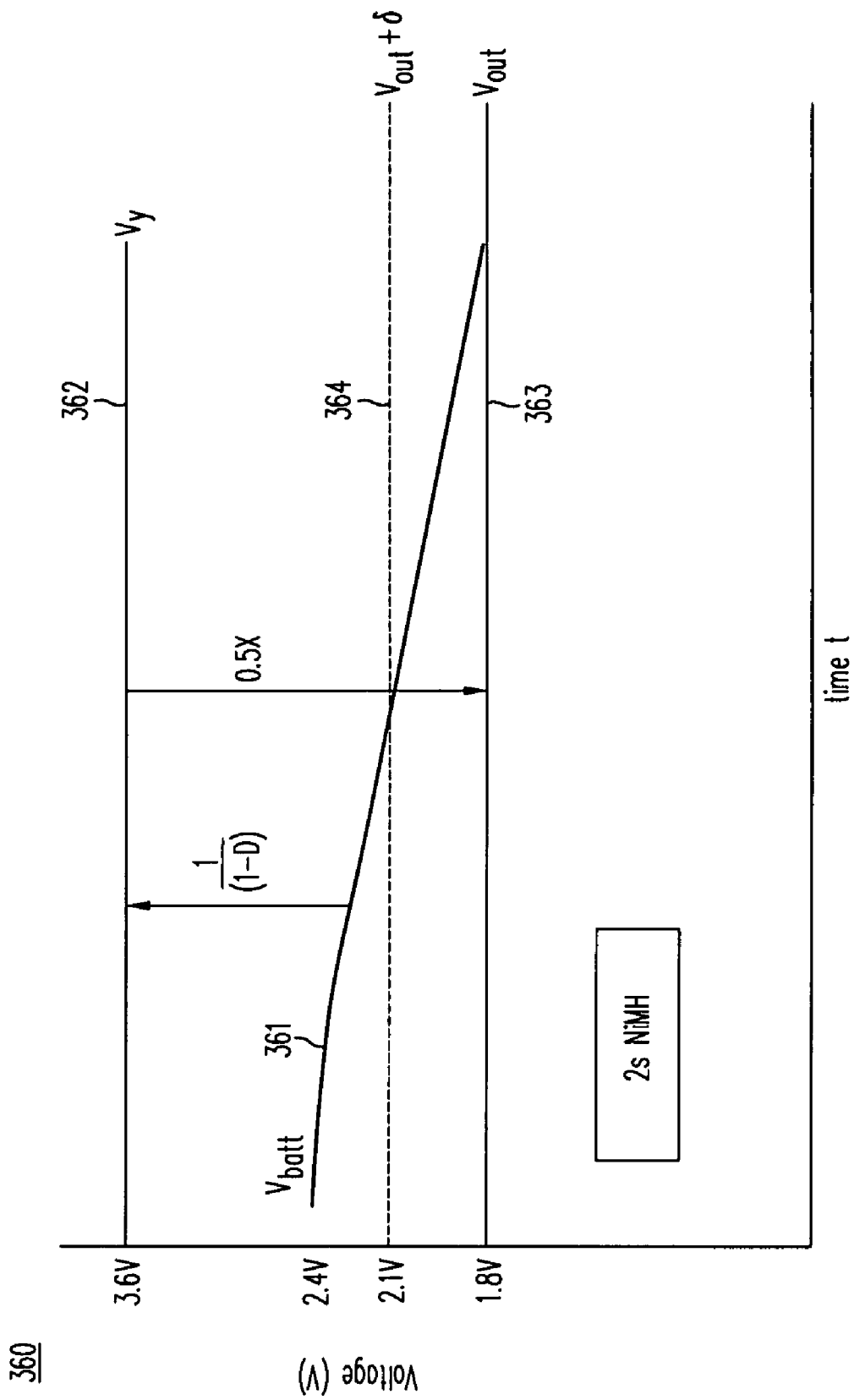
FIG. 11B is a graph illustrating the operation of the 0.5X LCUD converter with a 2-cell NiMH battery.

An example of a switched LCUD converter in operation is illustrated in FIG. 11A, where the voltage of a single-cell LiIon battery is used to generate a regulated 3.3V output during the entire battery discharge cycle. The cell voltage, after charging, starts at 4.2V then decays during an initial interval to around 3.5V to 3.6V (curve 351), where the battery operates during most of its discharge cycle. Later, curve 352 illustrates that the battery voltage decays below 3.5V into a range {Vout<Vbatt<(Vout+δ)} between lines 355 and 356, a condition where a normal converter would suffer dropout or mode switching problems. Finally as represented by curve 353, the battery voltage falls to a level well below the converter's 3.3V output. Only specialized LiIon batteries can operate down to 2.7V without growing crystallites shorting out the cell.

Regardless of the LiIon cell voltage, the LCUD converter steps the battery voltage up by duty factor 1/(1−D) to a constant pre-regulated voltage $V_y$ shown by curve 354, then steps the voltage $V_y$ back down by a 0.5X charge pump post-converter to produce a regulated 3.3V output $V_{out}$ (curve 355. The converter's condition can be described by in Table 2 below:

TABLE 2

| Phase | Up/Down | $V_{batt}$ | D | $V_y$ | nX | $V_{out}$ | $V_{out}/V_{in}$ |
|---|---|---|---|---|---|---|---|
| Full charge | Down | 4.2 V | 36% | 6.6 V | 0.5X | 3.3 V | 0.52 |
| 351. Decay | Down | 3.6 V | 46% | 6.6 V | 0.5X | 3.3 V | 0.92 |
| 352. Plateau | Down | 3.5 V | 47% | 6.6 V | 0.5X | 3.3 V | 0.94 |
| $V_{batt} \approx V_{out}$ | Unity | 3.3 V | 50% | 6.6 V | 0.5X | 3.3 V | 1.00 |
| Discharged | Up | 3.0 V | 55% | 6.6 V | 0.5X | 3.3 V | 1.10 |
| 353. Extend Range | Up | 2.7 V | 59% | 6.6 V | 0.5X | 3.3 V | 1.22 |

One common application using a single cell LiIon battery and requiring a 3.3V regulated supply is the cell phone. No present day regulator is able to operate with high efficiency over the battery's entire voltage range. Handset designers today must employ step-down-only Buck regulators that cut off around 3.5V, thereby throwing away the battery life in the initial discharge phase (curve 351) and a portion of voltage-plateau-phase (curve 352), because the added use-life of later phases of discharge is overridden by the efficiency loss of a conventional Buck-boost converter.

Figure 1A:
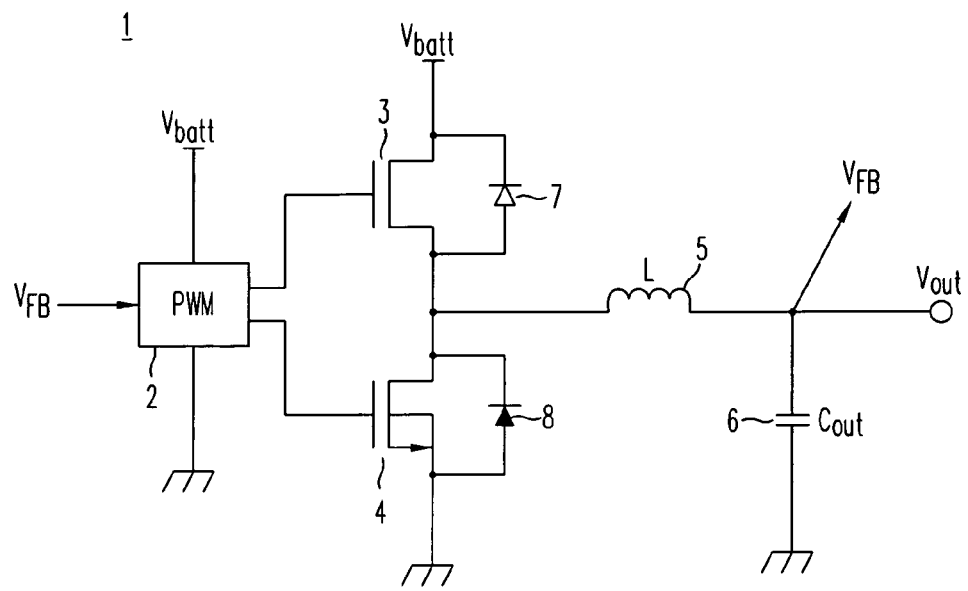
FIG. 1A is a circuit diagram of a prior-art synchronous Buck converter.
Figure 1B:
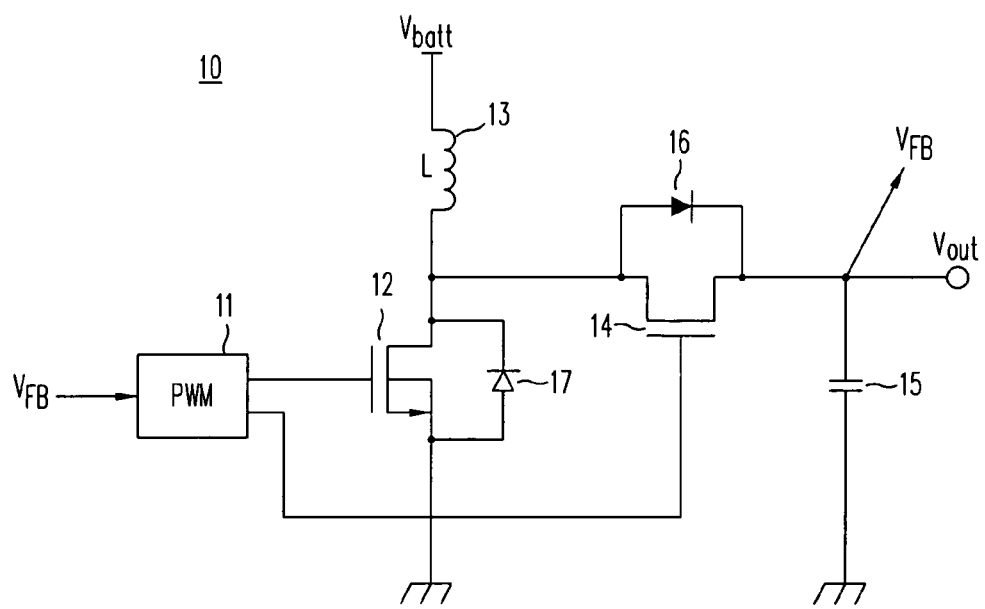
FIG. 1B is a circuit diagram of a prior-art synchronous boost converter
Figure 2A:
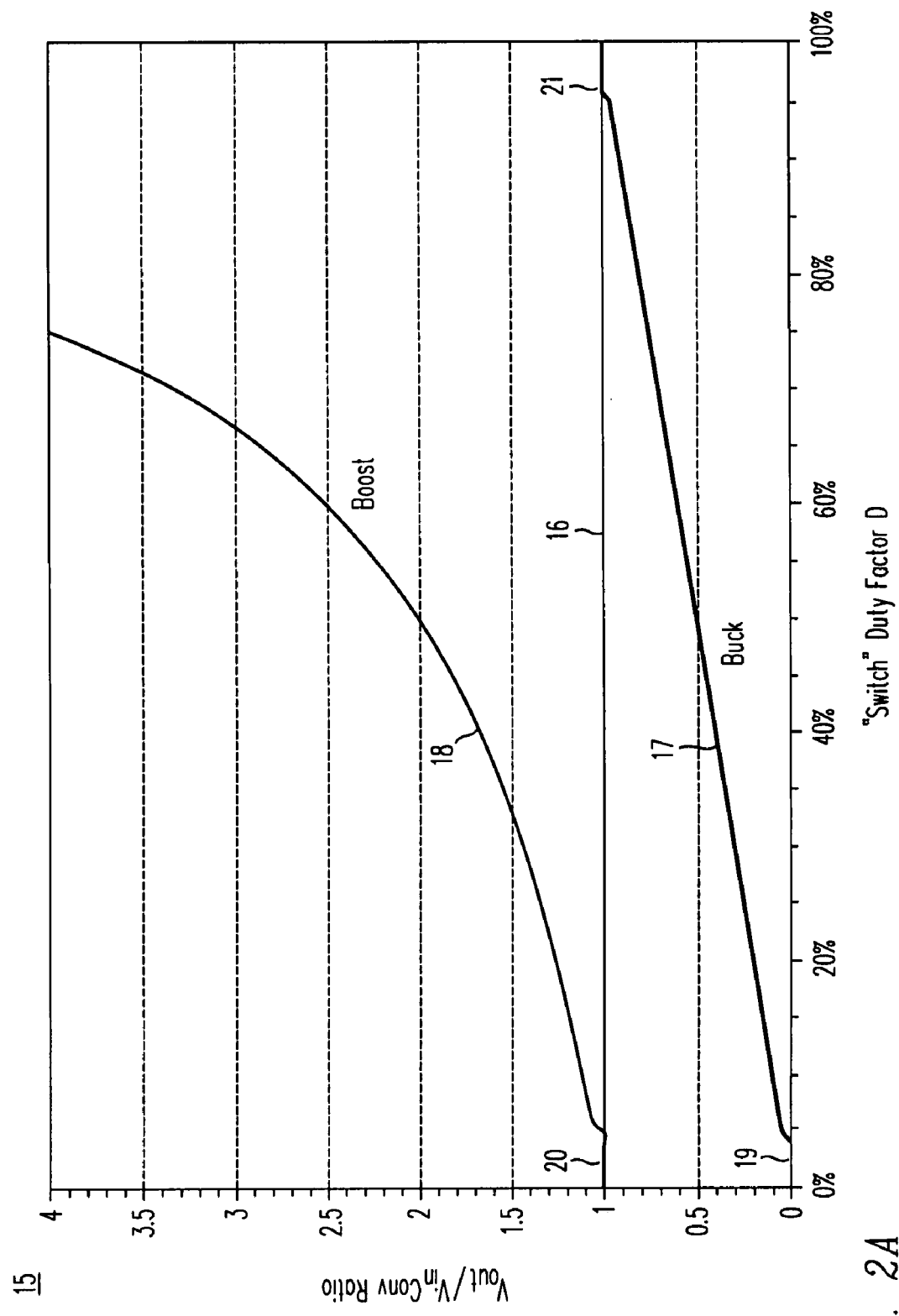
FIG. 2A is a graph showing the voltage conversion ratio versus duty factor for conventional Buck and boost converters.
Figure 2B:
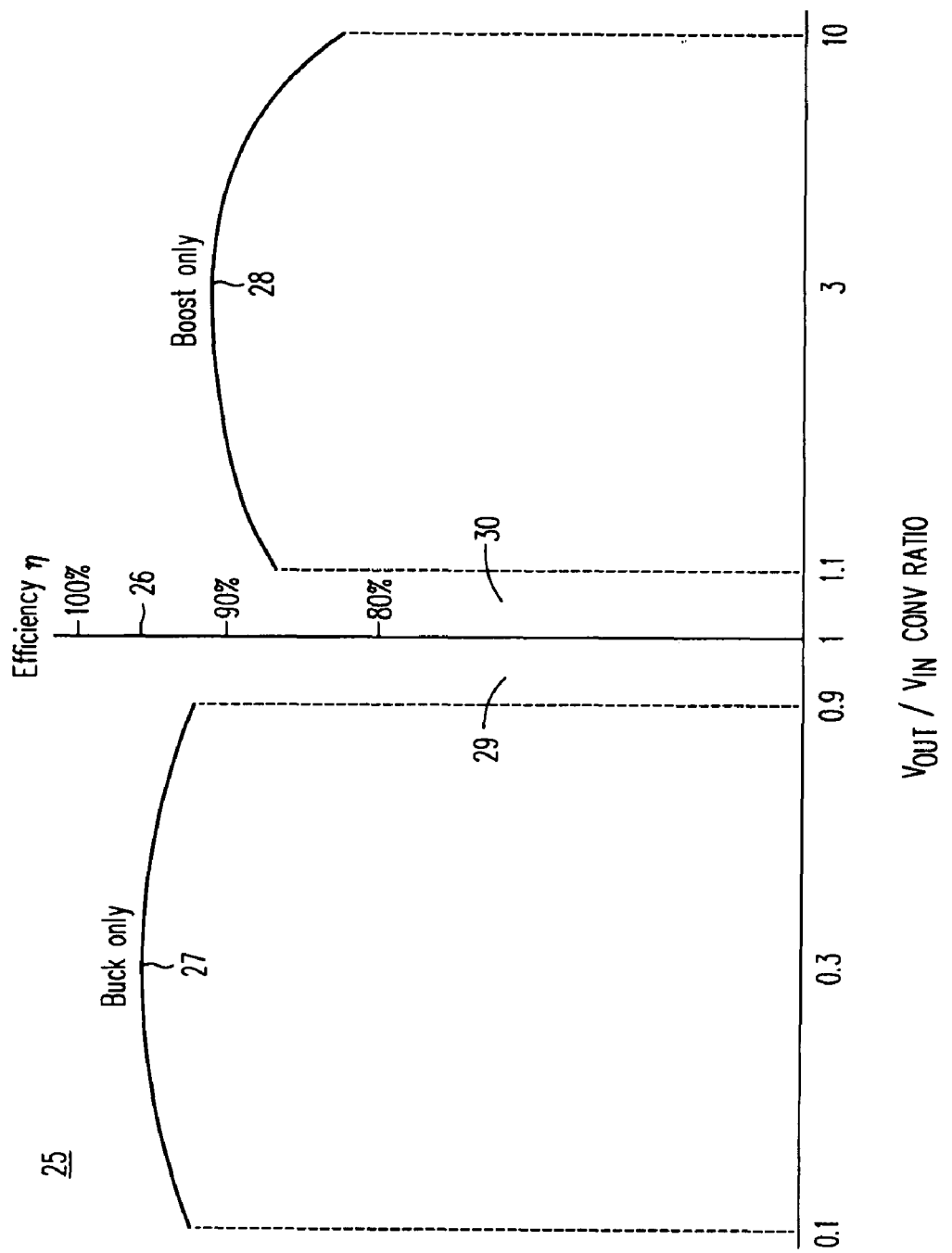
FIG. 2B is a graph showing the efficiency versus voltage conversion ratio for conventional Buck and boost converters.
Figure 3C:
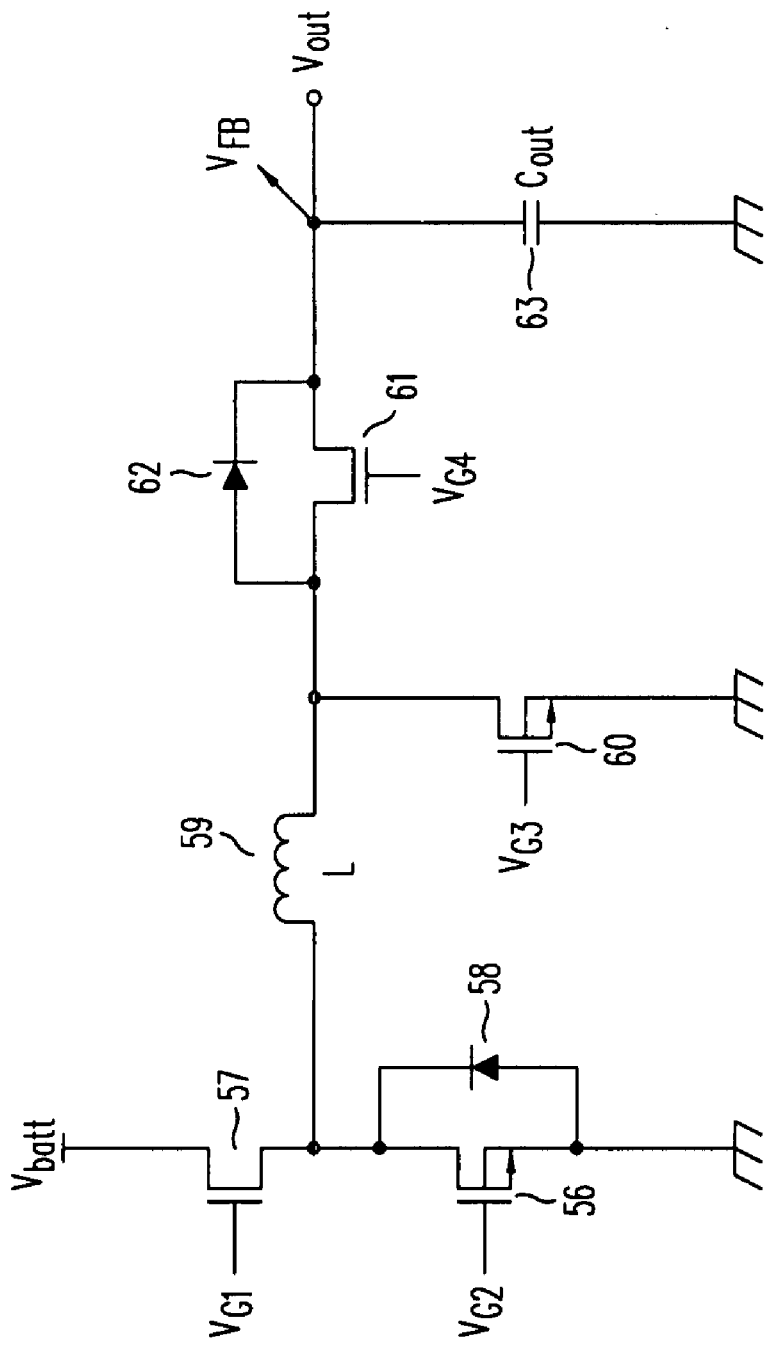
FIG. 3C is a circuit diagram of a alternative cascaded boost-Buck converter.
Figure 3D:
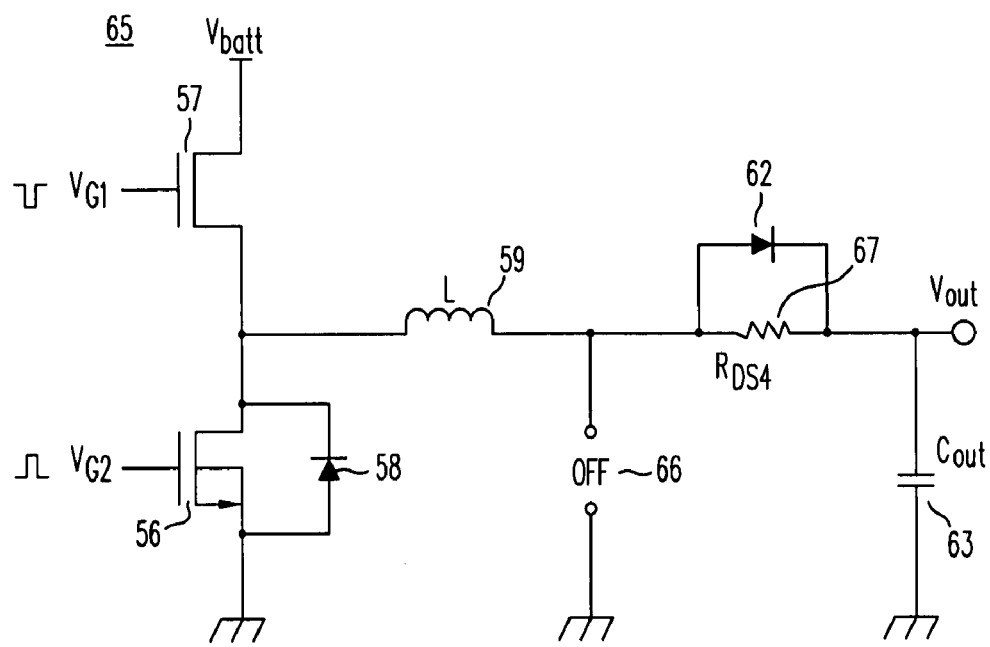
FIG. 3D is an equivalent circuit diagram of a Buck-boost converter in Buck-only mode.
Figure 3E:
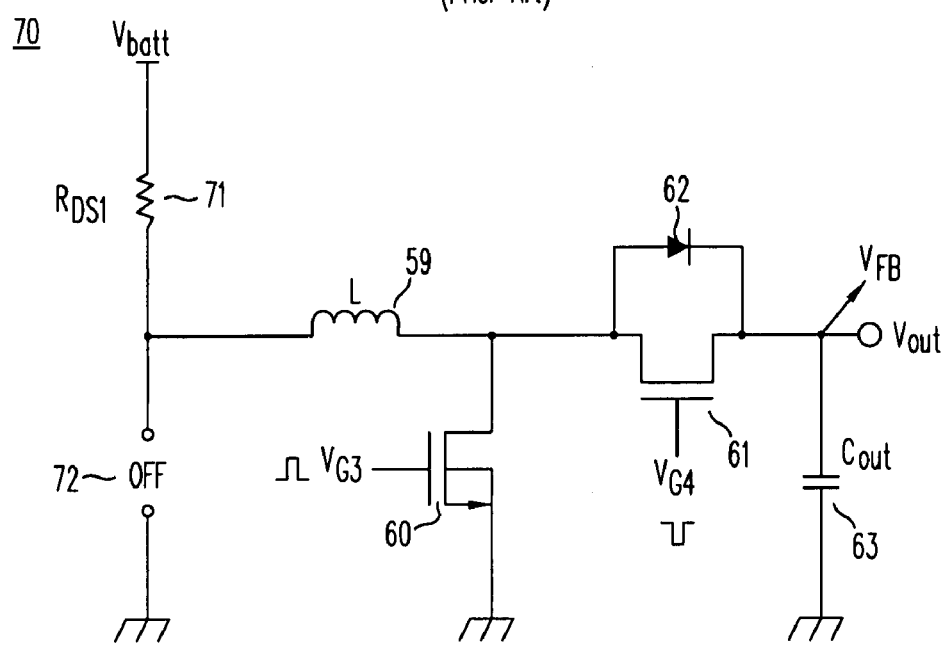
FIG. 3E is an equivalent circuit diagram of a Buck-boost converter in boost-only mode.
Figure 4:
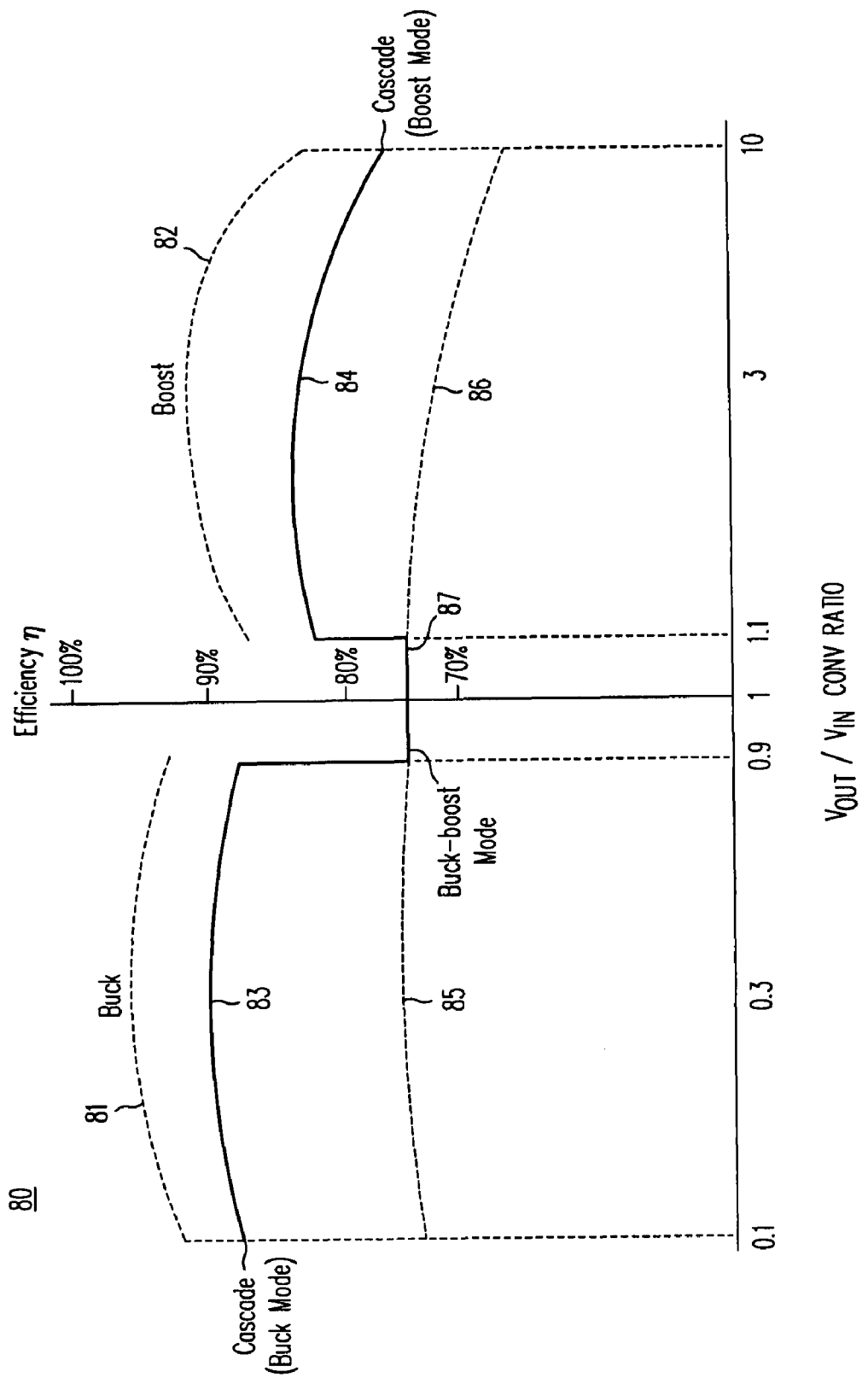
FIG. 4 is a graph showing efficiency versus voltage conversion ratio for a Buck converter, a boost converter and a Buck-boost converter.
Figure 5A:
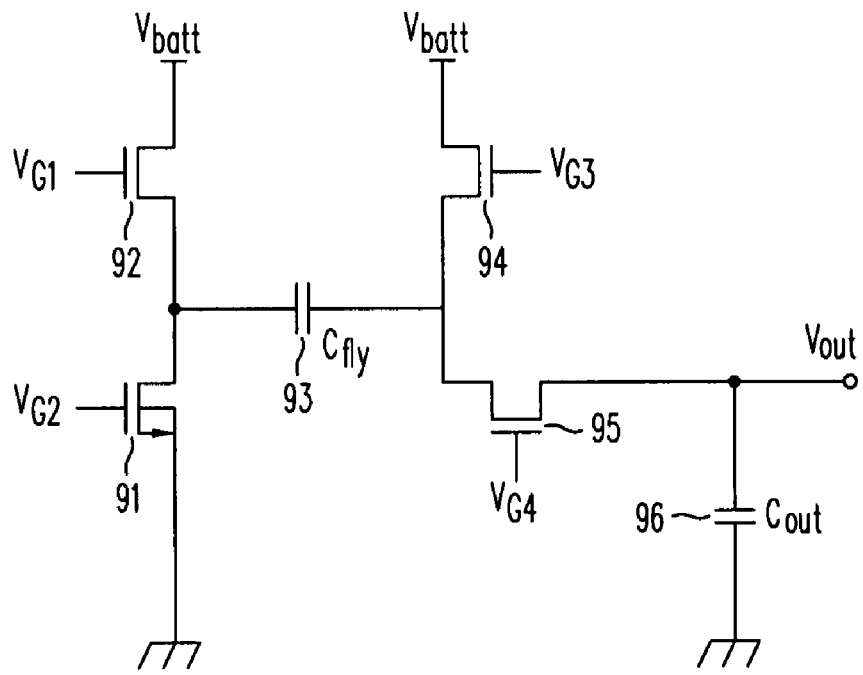
FIG. 5A is a circuit diagram of a 2X (doubler) charge pump.
Figure 5B:
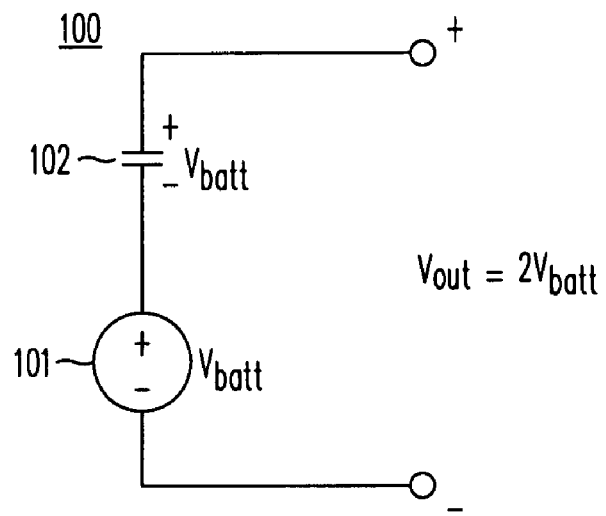
FIG. 5B is an equivalent circuit diagram of the 2X charge pump during the discharge phase.
Figures 5C, 5D:
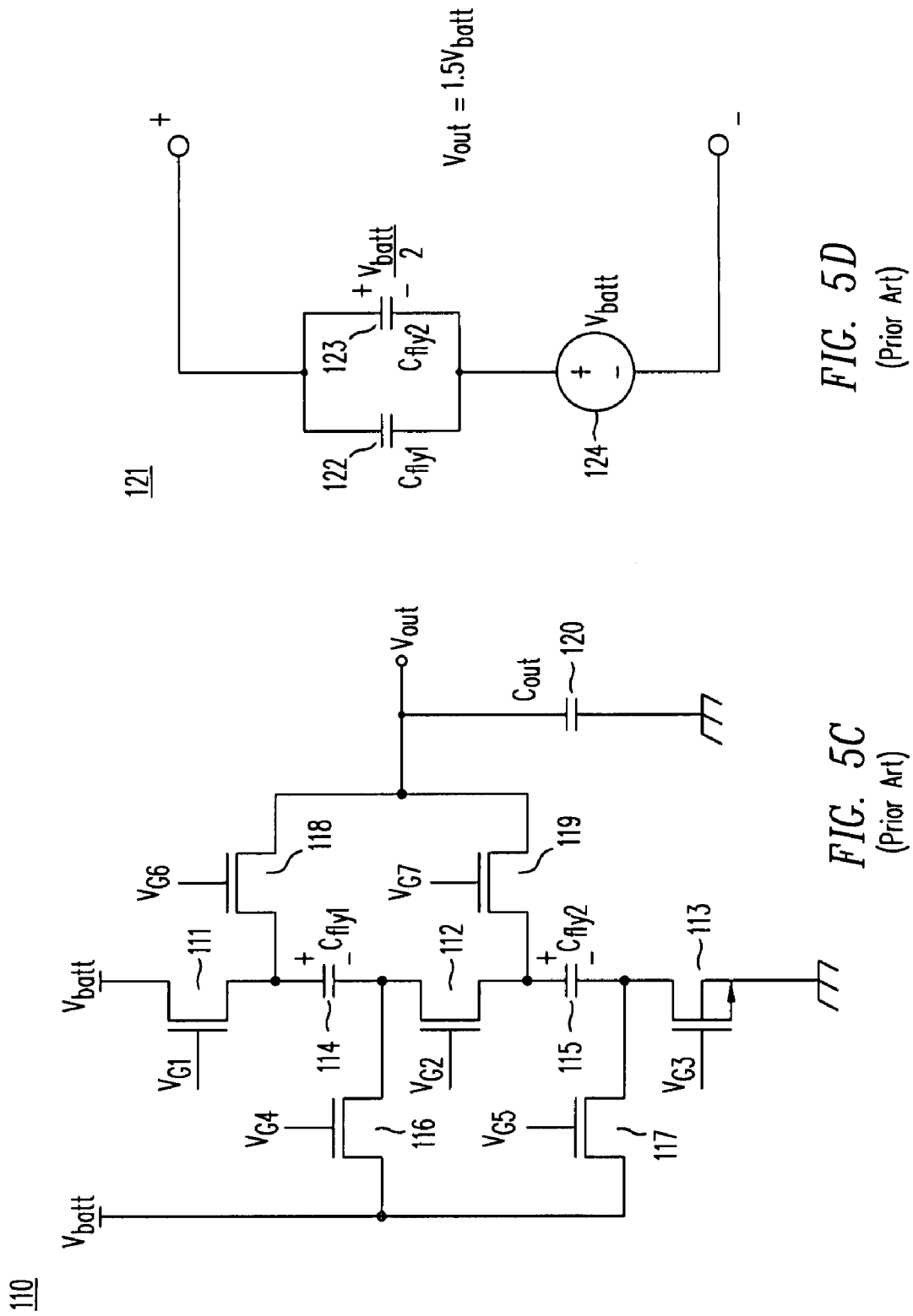
FIG. 5C is a circuit diagram of a 1.5X fractional charge pump.
FIG. 5D is an equivalent circuit diagram of the 1.5X charge pump during the discharge phase.
Figure 5E:
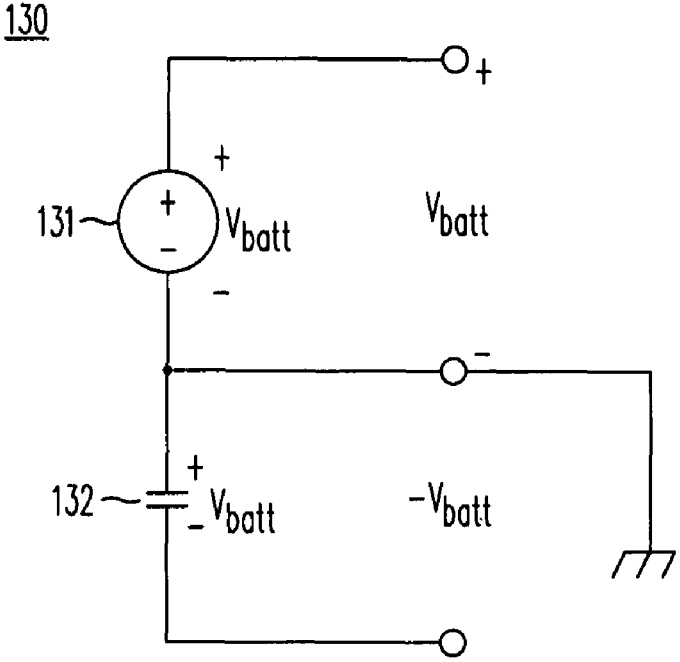
FIG. 5E is an equivalent circuit diagram of a −1X (inverter) charge pump during the discharge phase.
Figure 5F:
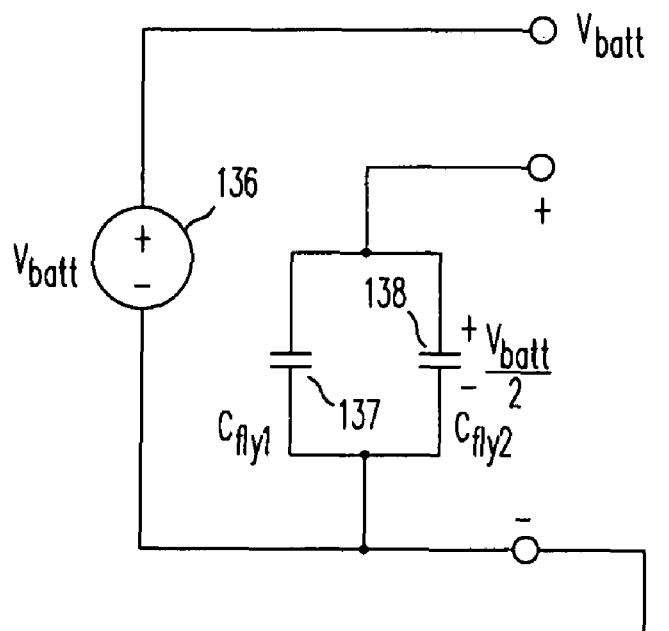
FIG. 5F is an equivalent circuit diagram of a 0.5X charge pump during the discharge phase.
Figure 6A:
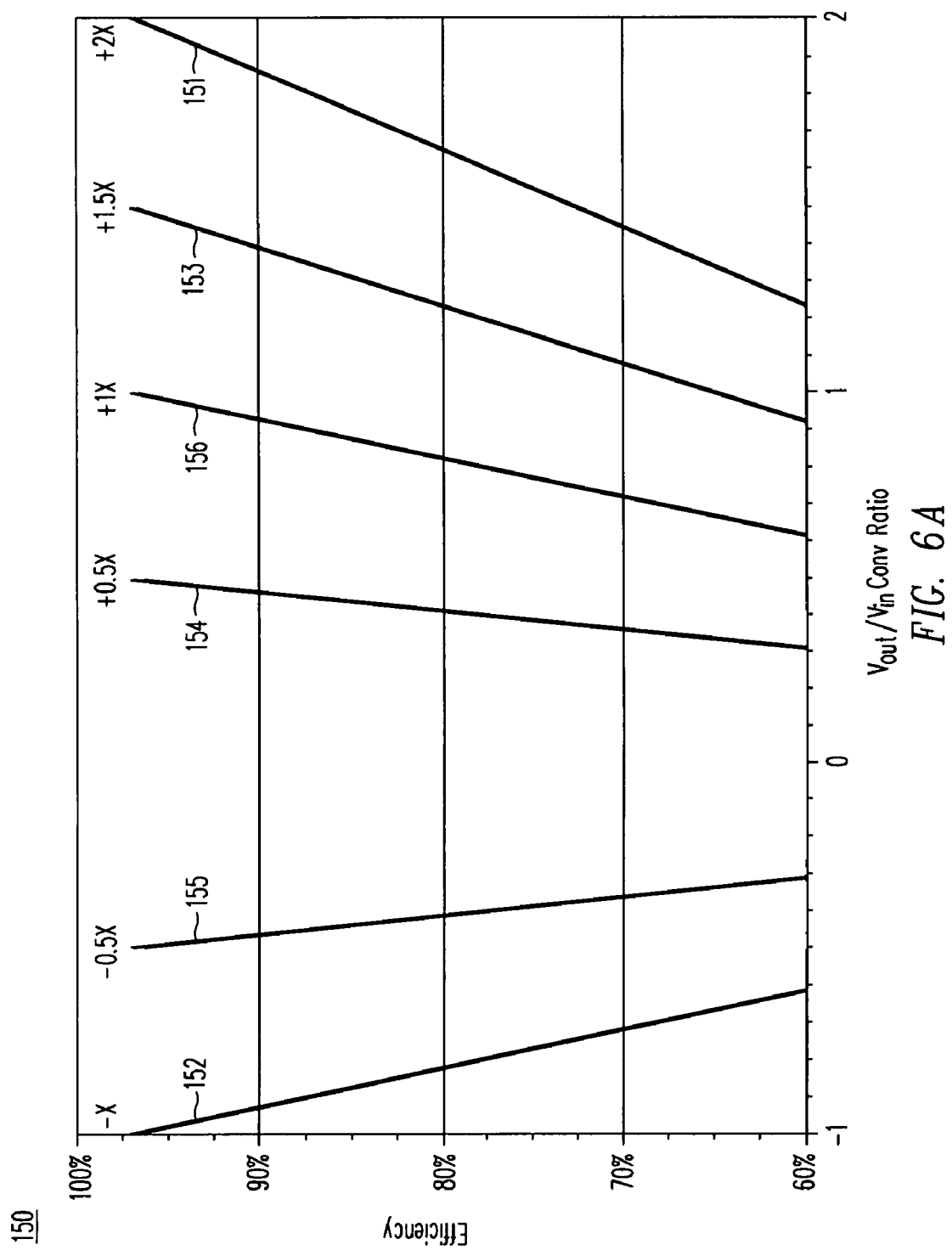
FIG. 6A is a graph of efficiency versus conversion ratio for a single-mode charge pump.
Figure 6B:
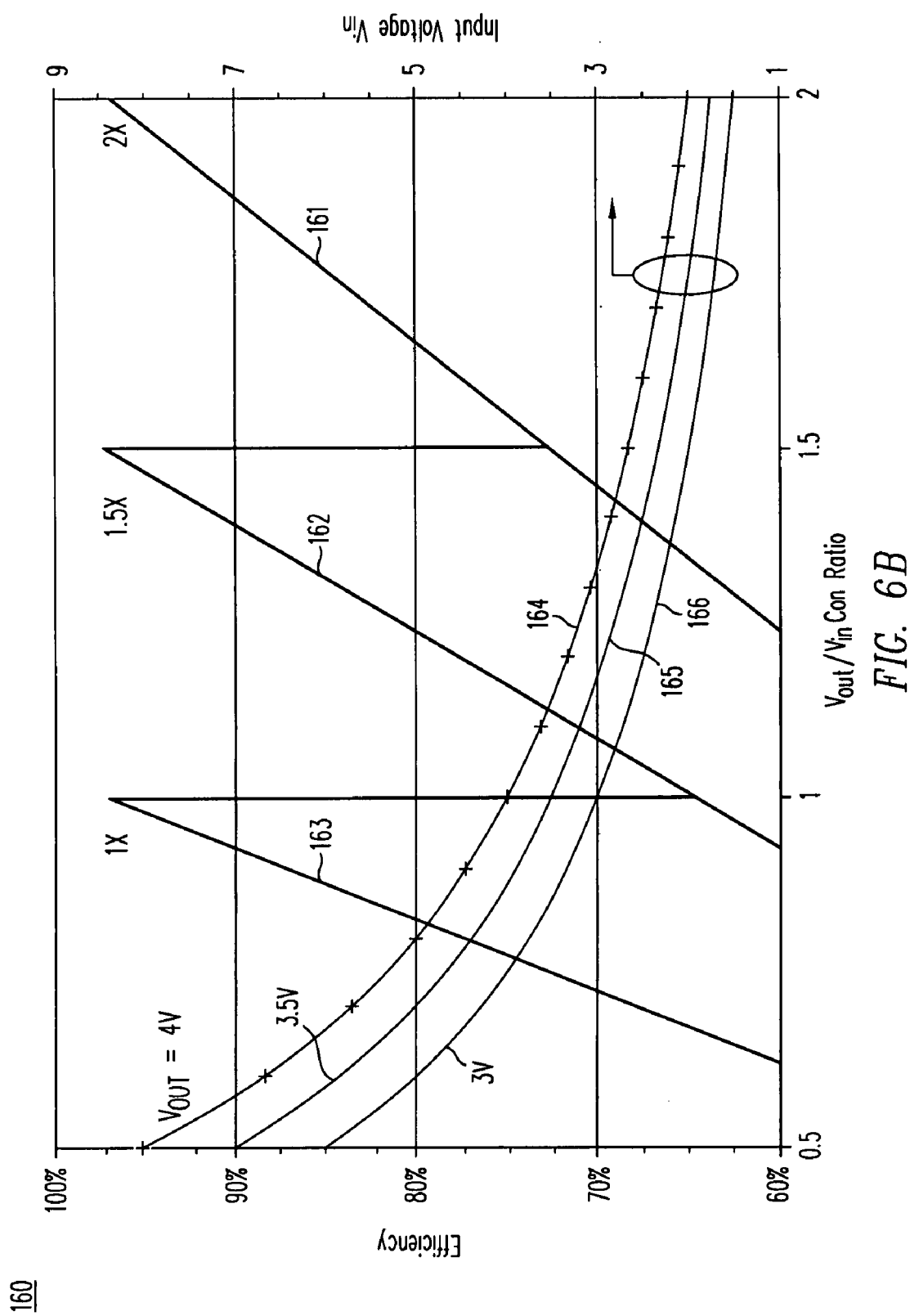
FIG. 6B is a graph of efficiency versus conversion ratio for a tri-mode charge pump.

Another application of a converter of this invention is the regulation of two and three cell nickel-metal-hydride, or NiMH, batteries. Since single NiMH cells exhibit voltages from 1.2V to 0.9V during discharge, then two series-connected cell (2s NiMH) batteries exhibit a discharge curve from 2.4V to 1.8V, i.e. a 600 mV range, as shown by curve 361 in the graph 360 of FIG. 1B. Since many integrated circuits operate on 1.8V, supplying a well regulated 1.8V source of power to these components is crucial to achieving reliable operation and consistent performance. But because linear regulation typically requires 200 to 300 mV of dropout δ even in low dropout (LDO) implementations, then a 1.8V LDO will begin to suffer from degraded regulation for inputs less than 2.0 to 2.1V, represented by dashed line 364 ($V_{out}+δ$). A loss of regulation for 200 to 300 mV of the 2s NiMH battery's 600 mV range represents a 33% reduction in usable battery life per charge.

An LCUD converter eliminates the dropout problem altogether by first stepping the battery voltage up by a varying amount 1/(1–D) to a voltage $V_y$ of 3.6V, shown by line 362, and then back down by a fixed 0.5X factor to produce a regulated 1.8V output, illustrated by time invariant voltage 363.

A similar situation occurs when producing a 2.7V, 3V, or 3.3V output voltage from a 3s NiMH battery. The 3s NiMH battery varies in voltage from 2.7V to 3.6V during discharge, a range of 900 mV. Since these output voltages fall within the battery's voltage range, a linear regulator with a 200 to 300 mV dropout δ substantially reduces the battery's 900-mV useable voltage range. A 2.7V LDO with a 300 mV dropout, for example, exhibits a reduced range of only 600 mV, a 33% shorter battery life. A 3.0V output allows only 300-mV of battery discharge before the linear regulator falls out of regulation, representing a 66% reduction in the battery's full capability. Even worse, a 3.3V output always operates in dropout even when the battery is fully charged, meaning an LDO cannot be used to supply a regulated 3.3V output from a 3s NiMH battery pack.

Figure 11C:
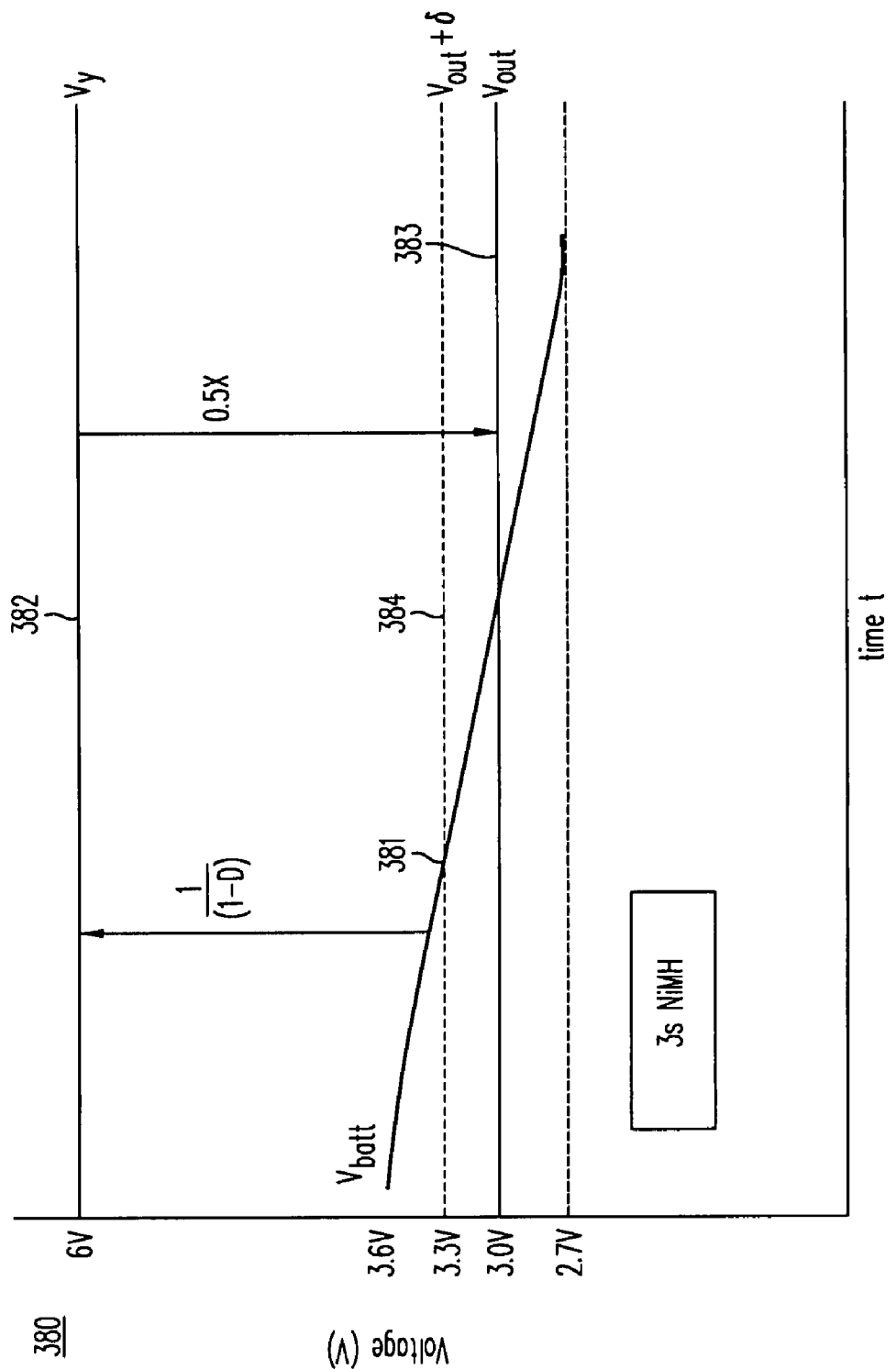
FIG. 11C is a graph illustrating the operation of the 0.5X LCUD converter with a 3-cell NiMH battery.

An LCUD converter is capable of supplying regulated outputs of 2.7V to 3.3V over the entire 900-mV discharge range of a 3s NiMH battery without ever exhibiting dropout, loss of regulation, or mode switching. In graph 380 of FIG. 11C, for example, the output voltage of a 3s NiMH battery discharging over time (curve 381) is stepped up by a varying factor 1/(1–D) to produce a constant $V_y$ voltage of 6V (curve 382), then reduced by a factor of 0.5X to produce 3V output (curve 383). Unlike with an LDO, no change in circuit operation or loss of regulation occurs when $V_{batt}$ (curve 381) decays below line 384, the 3.3V dropout limit of an LDO.

Switched Inductor-Capacitor Up-Down (0.5X LCUD) Regulating Converters

Figure 10A:
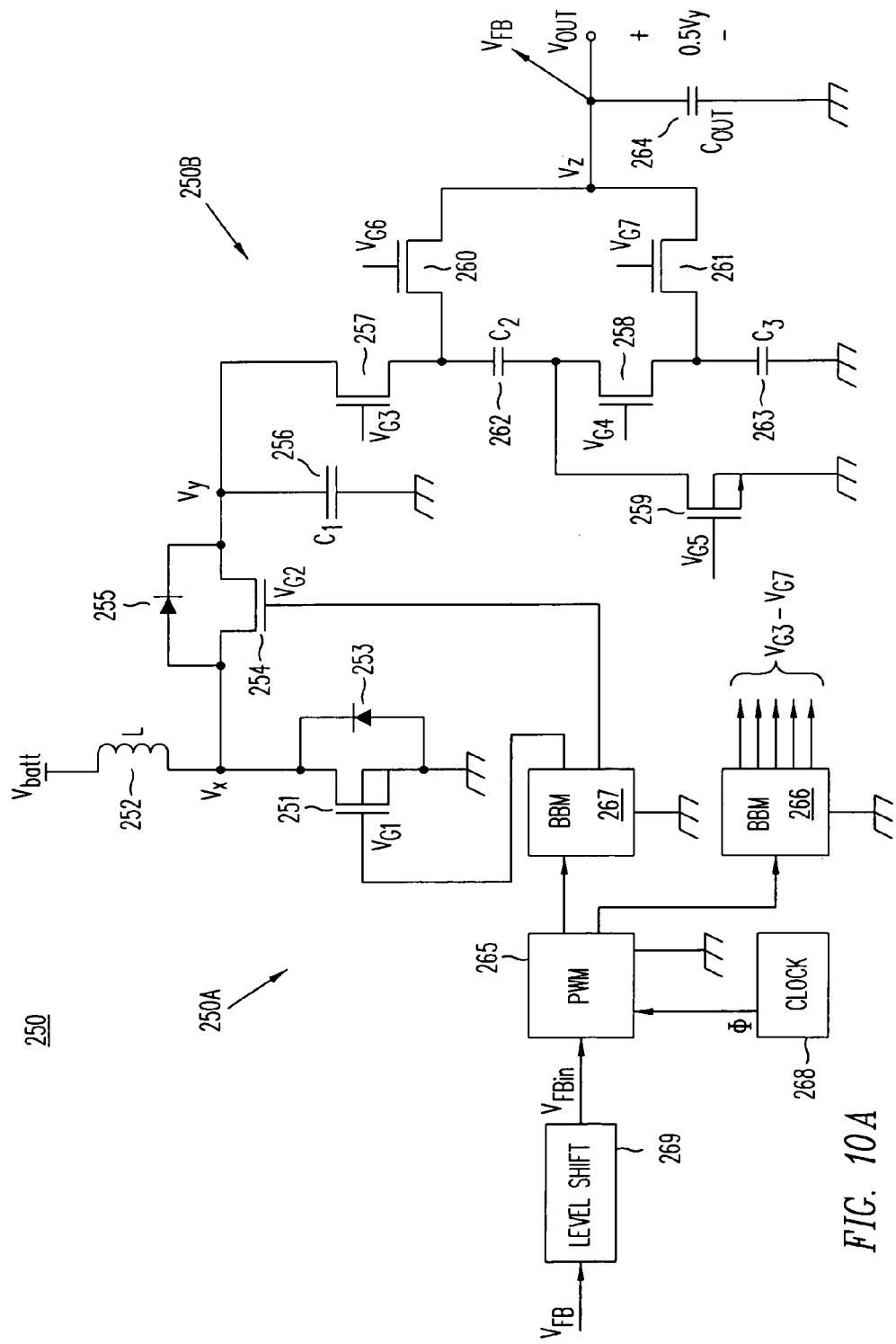
FIG. 10A is a circuit diagram of one embodiment of a 0.5X LCUD converter.

Examining the implementation of the LC-type up-down converters in greater detail, FIG. 10A illustrates a schematic circuit diagram of a fractional-type switched LCUD regulating converter 250, where n=0.5.

As shown, LCUD switching converter 250 includes a low-side N-channel power MOSFET 251, a floating synchronous rectifier MOSFET 254 with an intrinsic P-N diode 255, and an inductor 252. These components are included in a pre-regulator 250A, which converts the input voltage $V_{batt}$ to the intermediate voltage $V_y$. The output of pre-regulator 250A with an optional filter capacitor 256 forms the input to a 0.5X-type fractional charge pump post-converter 250B, which includes power MOSFETs 257, 258, 259, 260 and 261, together sequentially charging and discharging flying capacitors 262 and 263 and delivering an output voltage into an output filter capacitor 264.

High-side and floating power MOSFETs 254, 257, 258, 260, and 261 may be either N-channel or P-channel devices, with appropriate changes in the gate drive signal and gate buffer circuitry. Low-side power MOSFETs 251 and 259 are preferably implemented as N-channel devices. Output voltage $V_{out}$ is used as feedback signal $V_{FB}$, scaled by a level-shift circuit 269 to produce a voltage proportional to intermediate voltage $V_y$ as the control input to an error amplifier within a PWM controller 265. This control voltage is chosen to force the output of pre-regulator 250A to a voltage $V_y$ having a magnitude twice that of the output voltage.

A PWM controller 265, driven by clock and ramp generator circuit 268 switches at a clock frequency φ and drives a break-before-make (BBM) buffer 267 at the same frequency. BBM buffer 267 drives low-side MOSFET 251 and synchronous rectifier MOSFET 254 out of phase with gate biases $V_{G1}$ and $V_{G2}$ to prevent shoot-through conduction. The polarity of $V_{G1}$ is positive with respect to the source of MOSFET 251 assuming it is an N-channel device. Synchronous rectifier MOSFET 254 is controlled to conduct all or some portion of the time when MOSFET 251 is off, but never to conduct significant current when the low-side MOSFET 251 is on.

If synchronous rectifier MOSFET 254 is a P-channel device, its gate drive signal $V_{G2}$ may have the same phase and polarity as $V_{G1}$, since a positive going signal turns on an N-channel device but turns off a P-channel device. If synchronous rectifier MOSFET 254 is an N-channel device, a floating gate drive circuit is needed to bias its gate to a voltage more positive than $V_x$, the positive going signal occurring out of phase with low-side control $V_{G1}$.

The clock signal controlling PWM controller 265 also controls BBM buffer 267, producing gate signals $V_{GS3}$, $V_{GS4}$, $V_{GS5}$, $V_{GS6}$ and $V_{GS7}$ to control the sequencing of charge pump MOSFETs 257, 258, 259, 260 and 261, respectively. These MOSFETs conduct in alternating fashion. MOSFETs 257 and 258 conduct while MOSFETs 259, 260 and 261 are off to charge capacitors 262 and 263; and then MOSFETs 259, 260 and 261 conduct while MOSFETs 257 and 258 are off to discharge capacitors 262 and 263, transferring their charge onto reservoir capacitor 264. A BBM buffer 266 prevents shoot-through conduction between the out-of-phase MOSFETs within post-converter 250B.

The MOSFETs 257, 258, 259, 260 and 261 may be switched synchronously at the same frequency φ as the MOSFETs 251 and 254, or they may be switched at some multiple of φ, i.e. mφ, or alternatively at a frequency independent of φ. In a preferred embodiment, all the power MOSFETs in pre-regulator 250A and the charge pump post-converter 250B are switched in synchronous fashion. This allows filter capacitor 256 to be made small or eliminated. In contrast, if charge pump post-converter 250B oscillates independently of pre-regulator 250A, capacitor 256 is required to temporarily store energy needed to support momentary load and line transients.

Figure 10B:
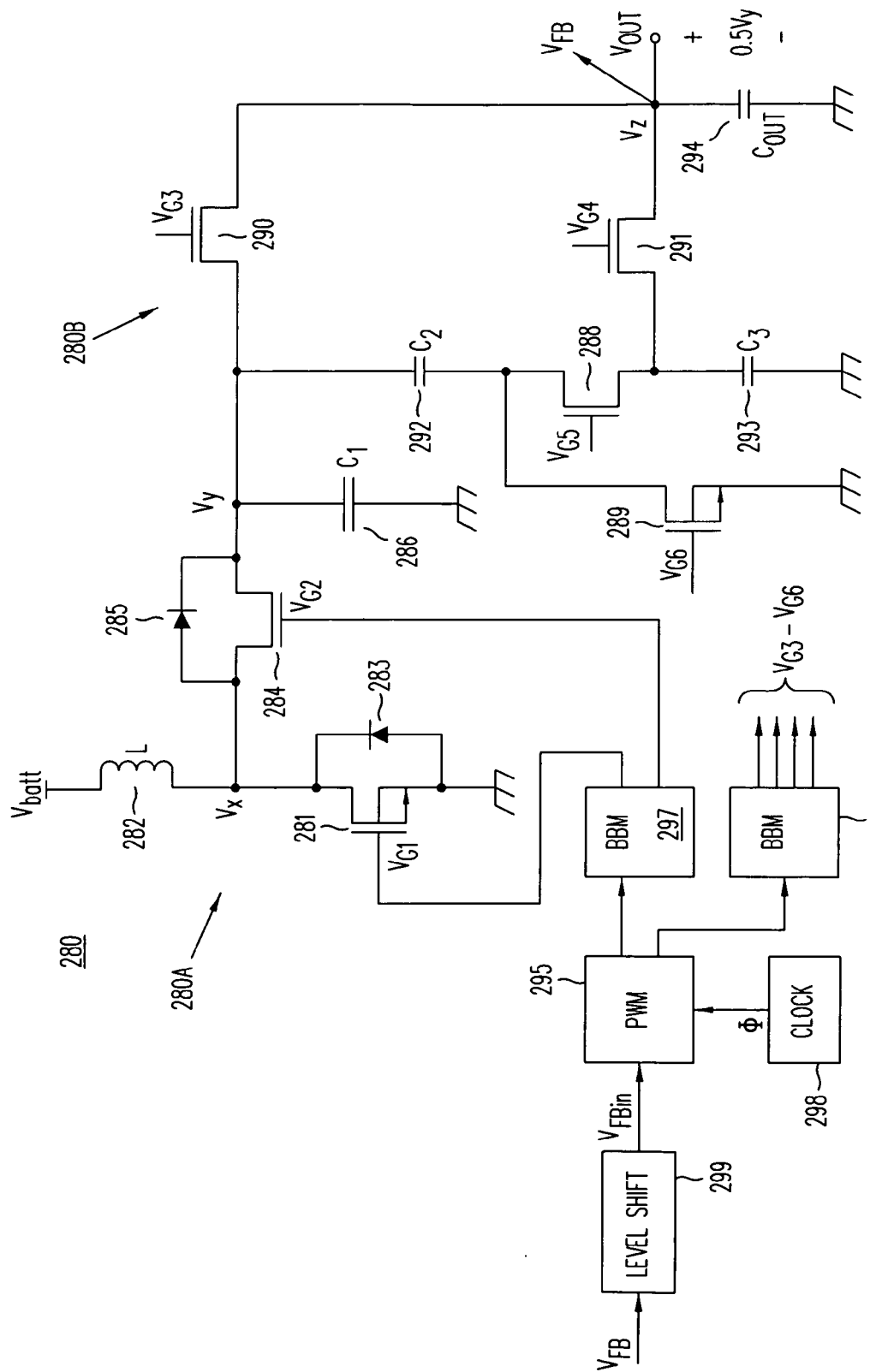
FIG. 10B is a circuit diagram of an alternative embodiment of a 0.5X LCUD converter.

Assuming synchronous operation of pre-regulator 250A and post-converter 250B, then synchronous rectifier MOS- FET 254 and pre-charge MOSFET 257 will be on simultaneously and switched in phase. In such a case, MOSFET 257 is redundant and can be eliminated. The resulting simplified LCUD converter 280 is shown in FIG. 10B. Like converter 250, converter 280 includes a boost pre-regulator 280A comprising an inductor 282, a low-side N-channel MOSFET 281, a synchronous rectifier MOSFET 284, a PWM controller 295 and a BBM circuit 297, followed by a post-converter 280B. Post-converter 280B includes a 0.5X-type fractional charge pump comprising capacitors 292 and 293, MOSFETs 288, 289, 290, and 291, controlled by a BBM circuit 296 to switch at the same frequency as MOSFETs 281 and 284, namely at the frequency φ determined by a clock and ramp generator 298. Closed-loop regulation occurs by feeding the output voltage $V_{out}$ across filter capacitor 294 back as a signal $V_{FB}$ to PWM controller 295 through a level-shift circuit 299.

Figure 10C:
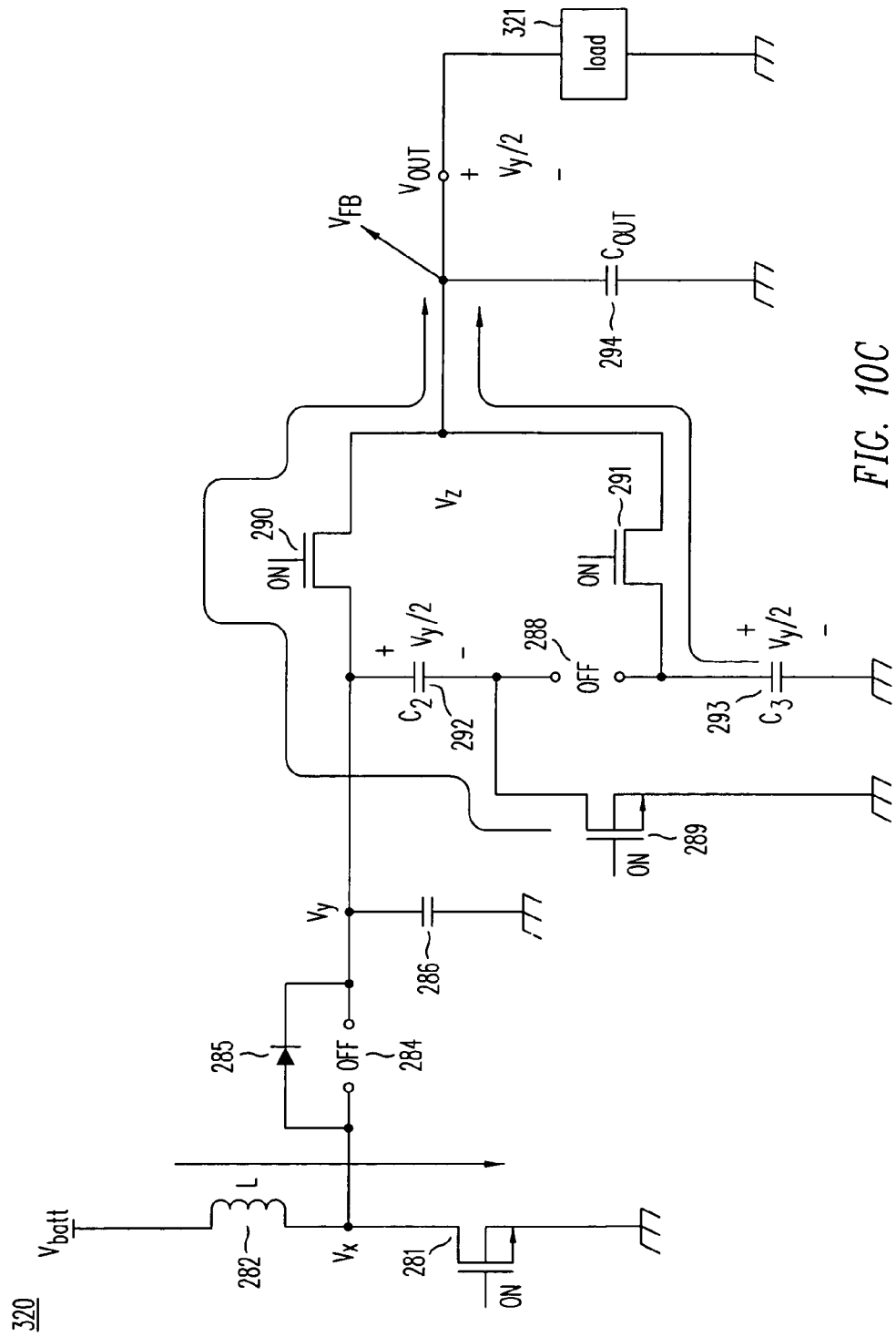
FIG. 10C is an equivalent circuit diagram of the 0.5X LCUD converter during the magnetizing and discharging stage.
Figure 10D:
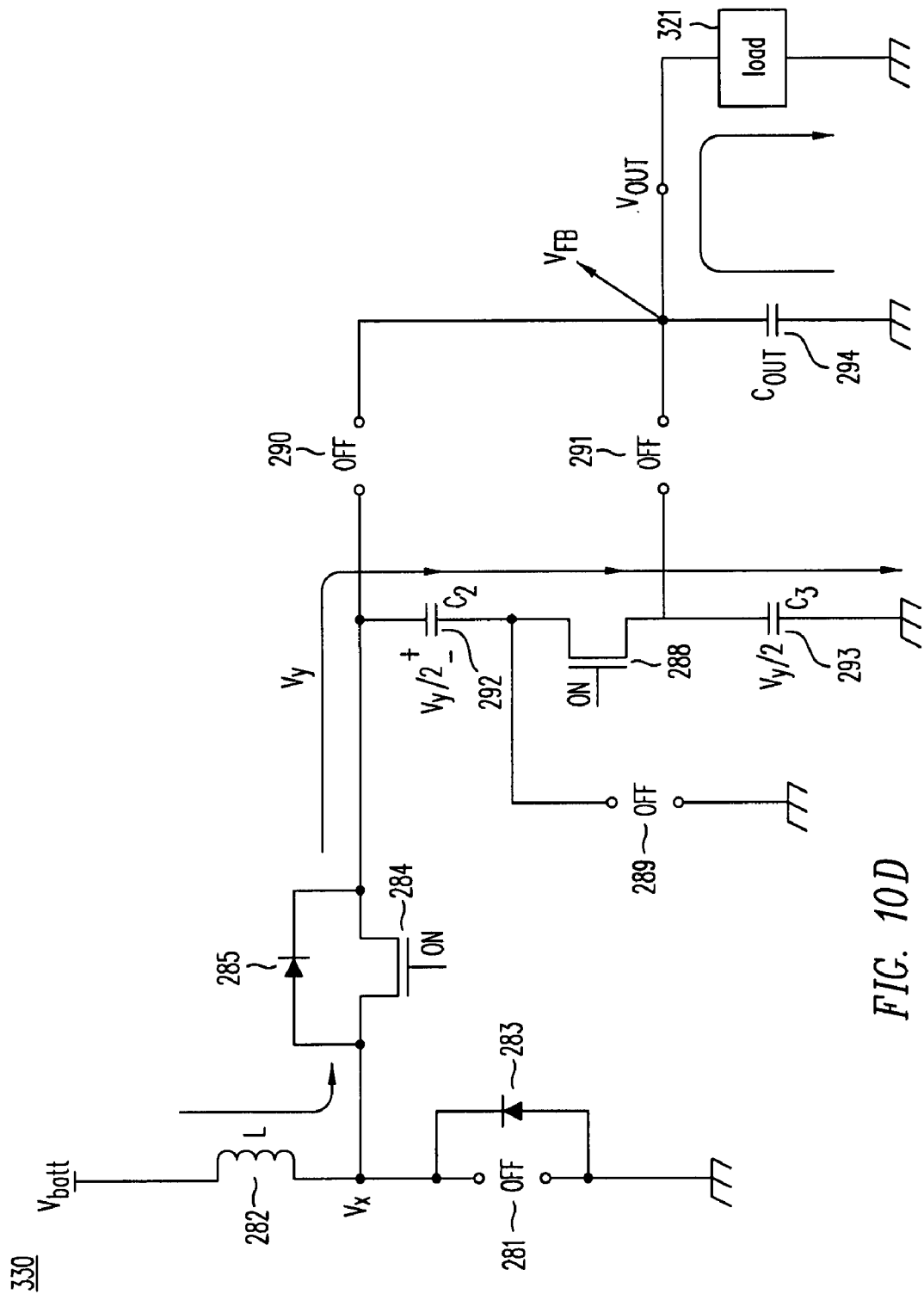
FIG. 10D is an equivalent circuit diagram of the 0.5X LCUD converter during the charging stage.

Synchronous operation of pre-regulator 280A and post-converter 280B in the 0.5X-type LCUD converter 280 is illustrated in FIGS. 10C and 10D. In FIG. 10C, schematic diagram 320 represents converter 280 during the magnetizing of inductor 282, during which time the charge on flying capacitors 292 and 293, having previously been charged to voltage $V_y/2$, is transferred to output capacitor 294 and to load 321 via conducting MOSFETs 289, 290 and 291. Synchronous rectifier MOSFET 284 is turned off during the magnetizing of inductor 282. Because voltage $V_y$ exceeds $V_x$ and in this phase of operation, diode 285 remains reverse-biased, and the boost pre-regulator 280A and charge pump post-converter 280B are literally disconnected from one another. Off MOSFETs 284 and 288 are represented by open circuits.

In FIG. 10D, schematic diagram 330 represents LCUD converter 280 during the recirculation of current in inductor 282 and the simultaneous charging of the flying capacitors 292 and 293, with current flowing from $V_{batt}$ through inductor 282 and on-state MOSFETs 284 and 288. During this time, $V_x$ is approximately equal to $V_y$, and each of the series-connected flying capacitors 292 and 293, is charged to a voltage $+V_y/2$. Off MOSFETs 281, 289, 290, and 291 are represented by open circuits. During this cycle, while the flying capacitors are being charged, output capacitor 294 supplies load 321.

Figure 14A:
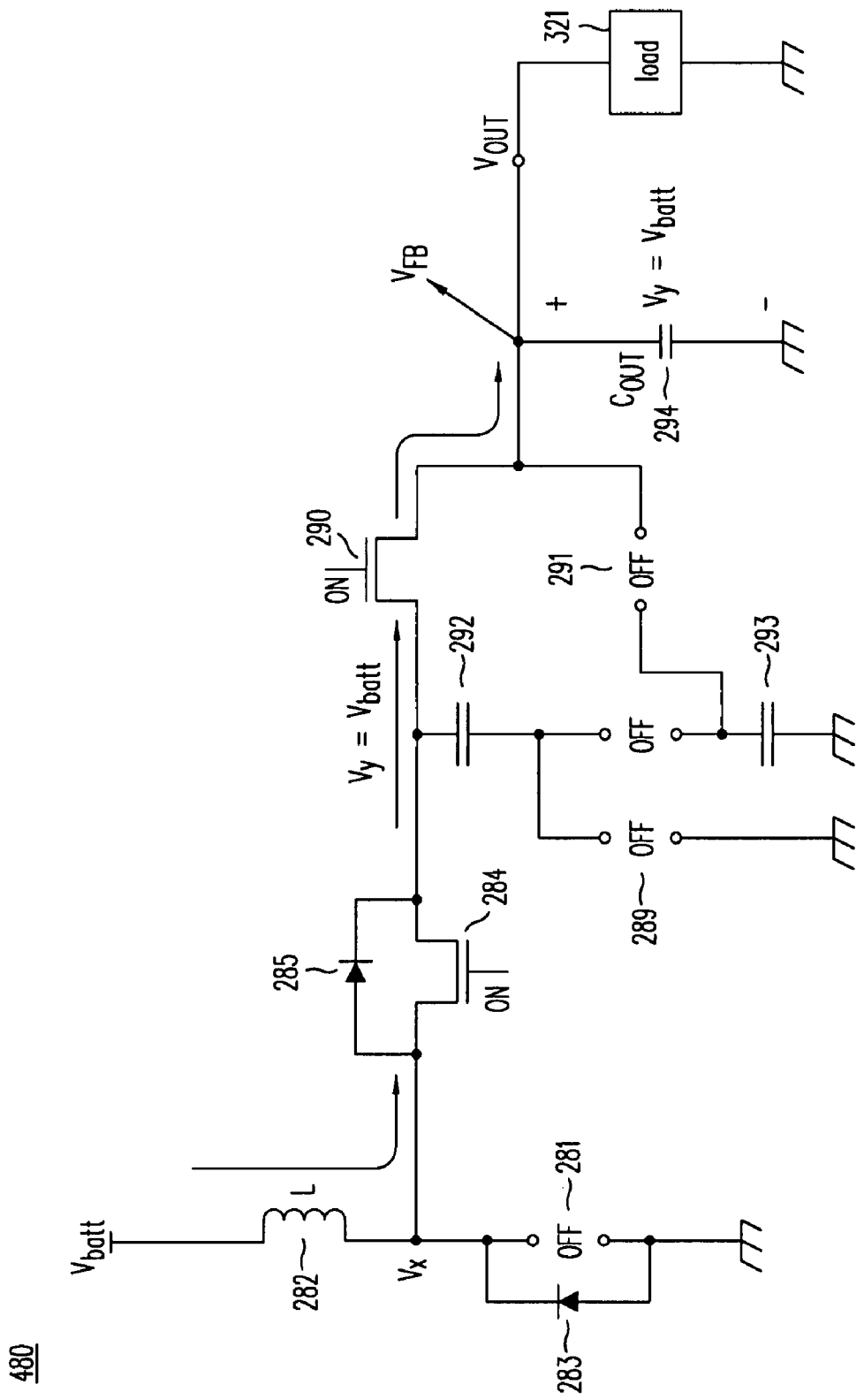
FIG. 14A is an equivalent circuit diagram of the pre-charge or bypass operational mode of a 0.5X LCUD converter.

In an alternative embodiment shown in the circuit diagram 480 of FIG. 14A, 0.5X post-conversion and pre-regulation are eliminated by discontinuing the switching of all MOSFETs and by turning on both MOSFETs 284 and 290 so that $V_{batt} \approx V_y \approx V_{out}$, whereby the voltage across output capacitor 294 is the converter's battery input voltage $V_{batt}$ and the converter is essentially bypassed. During this bypass operating condition, MOSFETs 281, 288, 289, and 291 remain off and are represented as open circuits.

Figure 14B:
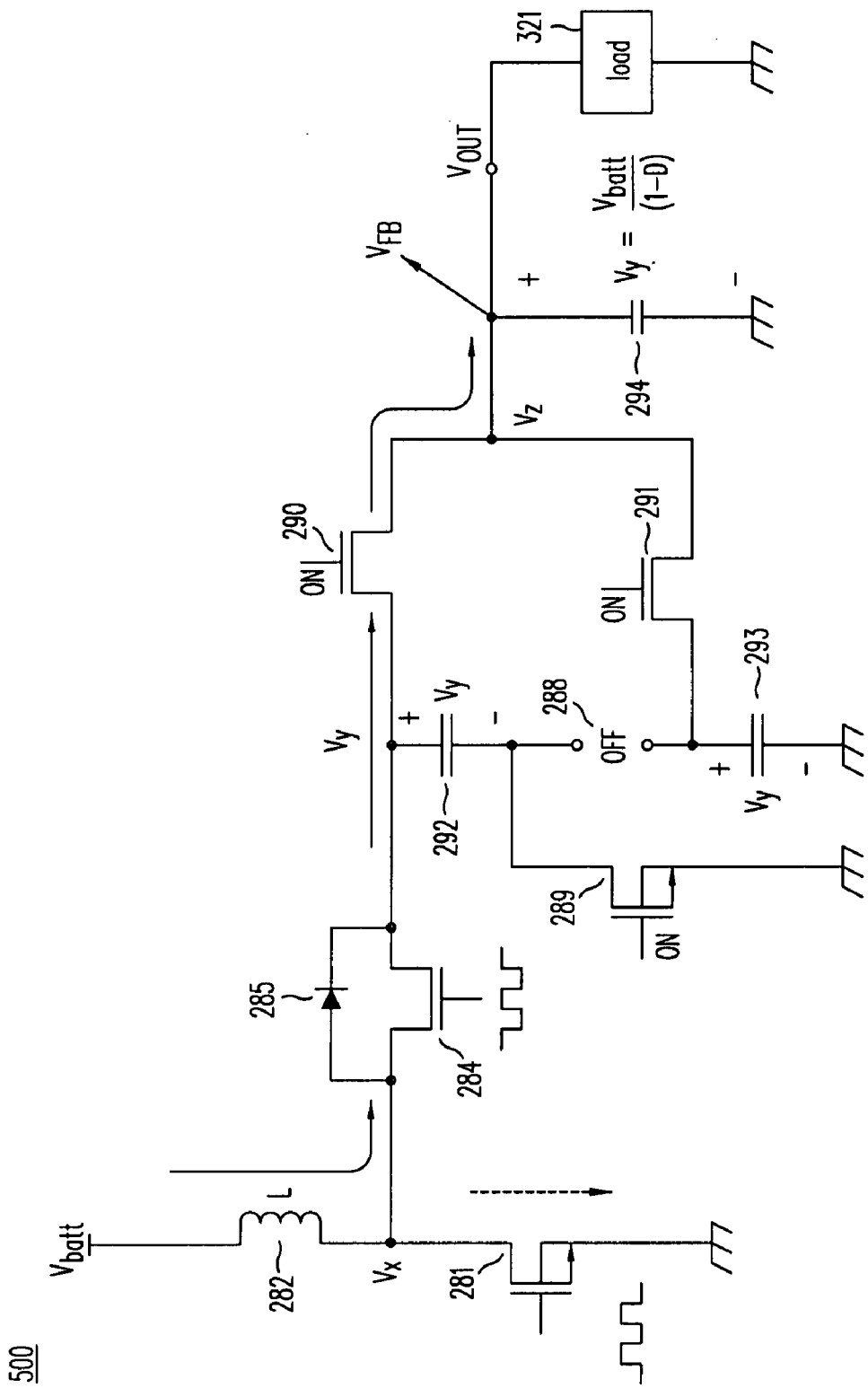
FIG. 14B is an equivalent circuit diagram of the boost only operational mode of a 0.5X LCUD converter.

In an another embodiment shown in the circuit diagram 500 of FIG. 14B, 0.5X post-conversion is eliminated by discontinuing switching of the charge pump MOSFETs without discontinuing the operation of the switched inductor boost pre-regulator. In this boost only mode, MOSFETs 290 and 291 are biased "on" connecting $V_{out}$ to intermediate voltage $V_y$, thereby bypassing the charge pump circuitry while pre-regulator MOSFETs 281 and 284 continue to switch out of phase to perform boost conversion. MOSFETs 291 and 289 are optionally turned on to connect capacitor 292 to ground and capacitor 293 to load 321, beneficially increasing the filter capacitance in parallel with output capacitor 294. MOSFET 288 is biased off as indicated by an open circuit. Feedback from the output $V_{FB}$ to the PWM control circuit via feedback network 299 may remain unaffected or be adjusted to result in a different output voltage whenever the boost only mode is invoked.

Figure 14C:
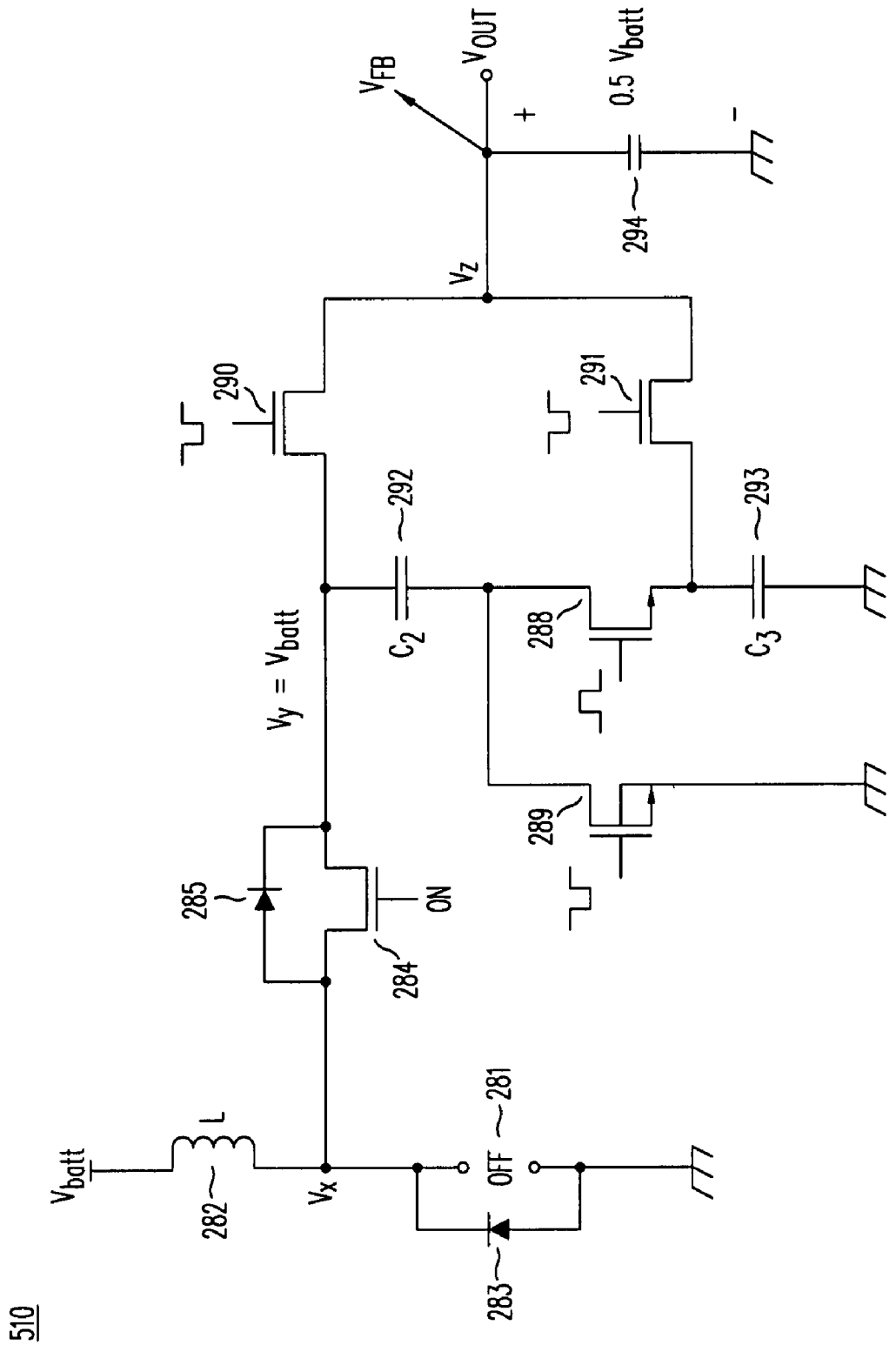
FIG. 14C is an equivalent circuit diagram of the fractional charge pump only operational mode of a 0.5X LCUD converter.

In yet another embodiment shown in the circuit diagram 510 of FIG. 14C, a charge pump only mode is invoked, whereby switching of the pre-regulator is discontinued while the charge pump continues to operate. As a result, MOSFET 281 is turned off. Because MOSFET 284 is common to both inductive pre-regulator and capacitive post-converter, it continues to switch on in phase with MOSFET 288 and out of phase with MOSFETs 289, 290, and 291. In this way, flying capacitors 292 and 293 are repeatedly charged to half the input voltage then connected across output capacitor 294 during the charge transfer phase. The voltage $V_x$ with MOSFET 284 conducting is substantially equal to $V_{batt}$, with inductor 282 of magnitude L acting like a low-pass input filter. Unless inductor 282 is saturated whenever current in inductor 282 is interrupted by switching off MOSFET 284, the inductor will drive the voltage $V_x$ below ground, forward biasing low-side diode 283. If inductor 282 saturates from high currents, its inductance drops dramatically and the voltage $V_x$ may remain positive, dominated by stray and parasitic capacitance on the node.

Figure 15:
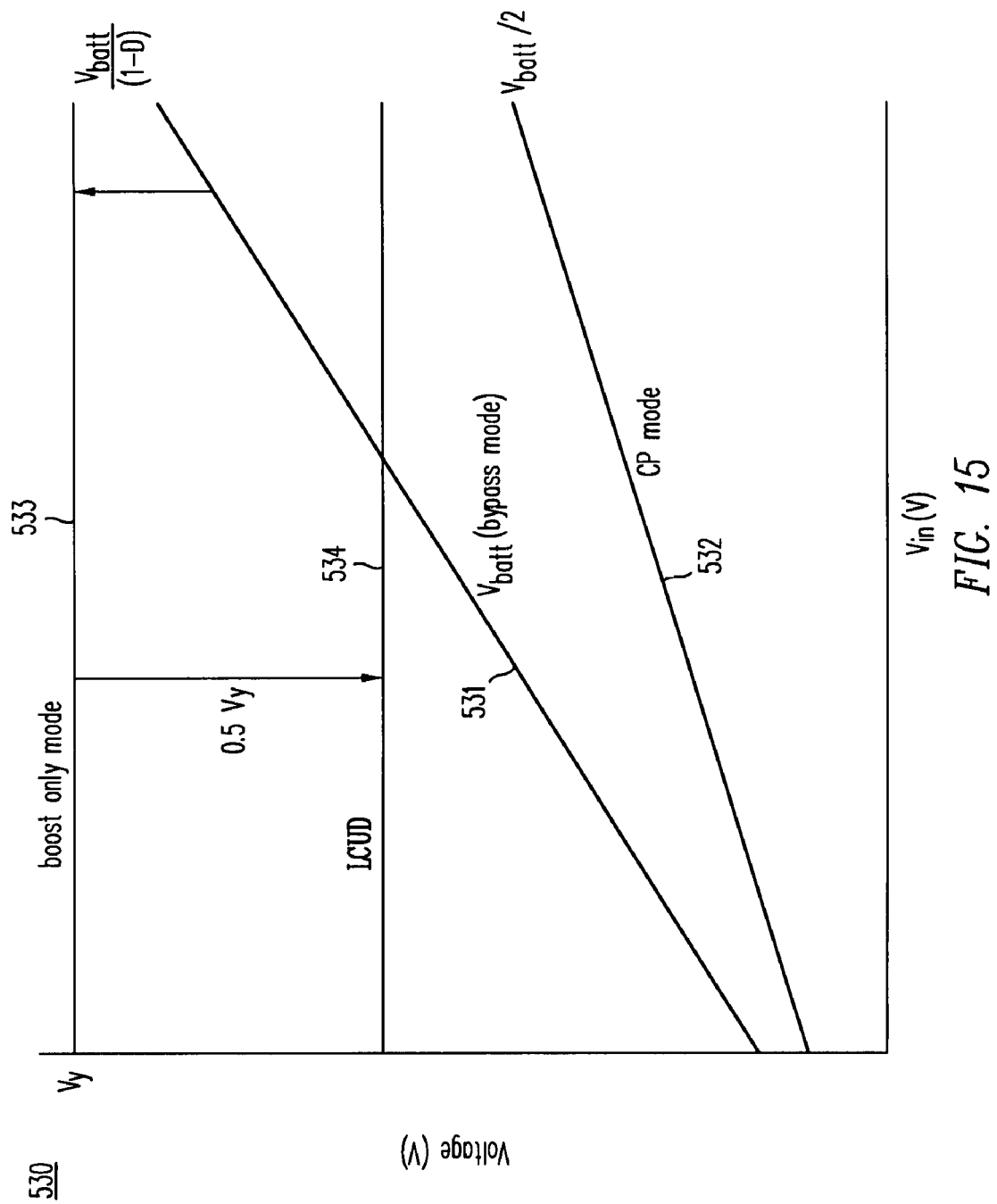
FIG. 15 is a graph showing the intermediate output voltage of the pre-regulator in a 0.5X LCUD regulating converter in alternate operating modes.

The output voltage versus input voltage transfer characteristics of these alternative embodiments are illustrated in graph 530 of FIG. 15 and are compared to the corresponding characteristics of the 0.5X-type LCUD regulator described above. Line 531 illustrates the unregulated bypass mode of operating the converter, as shown in FIG. 14A. Line 533 represents the regulated output voltage of the inductive boost pre-regulator, as shown in FIG. 14B with a duty factor dependence of $V_{batt}/(1-D)$. Conversely, the charge pump only circuit of FIG. 14C results in an unregulated output, shown by line 532. Line 534 illustrates regulation using the LCUD operating mode.

Other Non-inverting LCUX Switching Regulators

As stated previously, an LCUX converter exhibits an output to input voltage conversion governed by the equation $$\frac{V_{out}}{V_{in}} = \frac{n}{1-D}$$

where n has discrete, quantized values of n equal to, for example, 2, 1.5, 0.5, −0.5 or −1.0, depending on the number of capacitors and the switch configuration in the post-converter, and where D is dynamically adjusted using feedback to maximize the converter's overall efficiency.

While the discussion above was focused on up-down conversion, LCUX conversion can be adapted for step-up only operation as a LCUU regulator, by selecting nX post conversion ratios greater than unity, e.g. where n=2 or n=1.5. Compared to conventional boost converters, LCUU step up conversion is capable of higher output-to-input voltage conversion ratios without requiring operation at extreme duty factors.

Figure 16A:
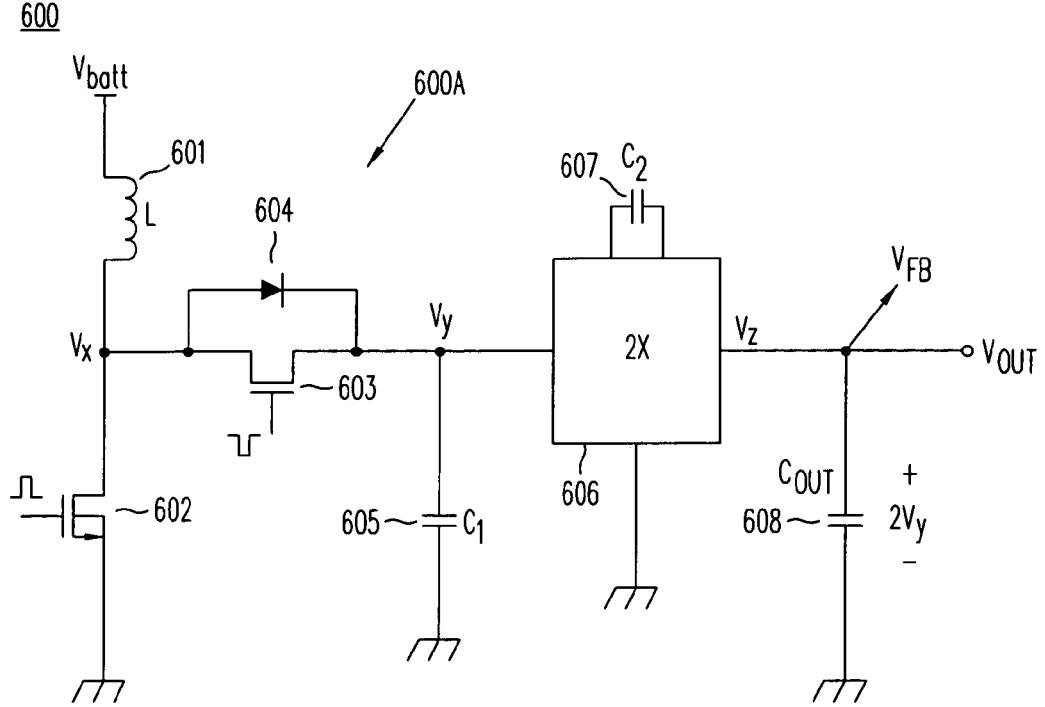
FIG. 16A is a functional block diagram of a 2X LCUU converter.
Figure 16B:
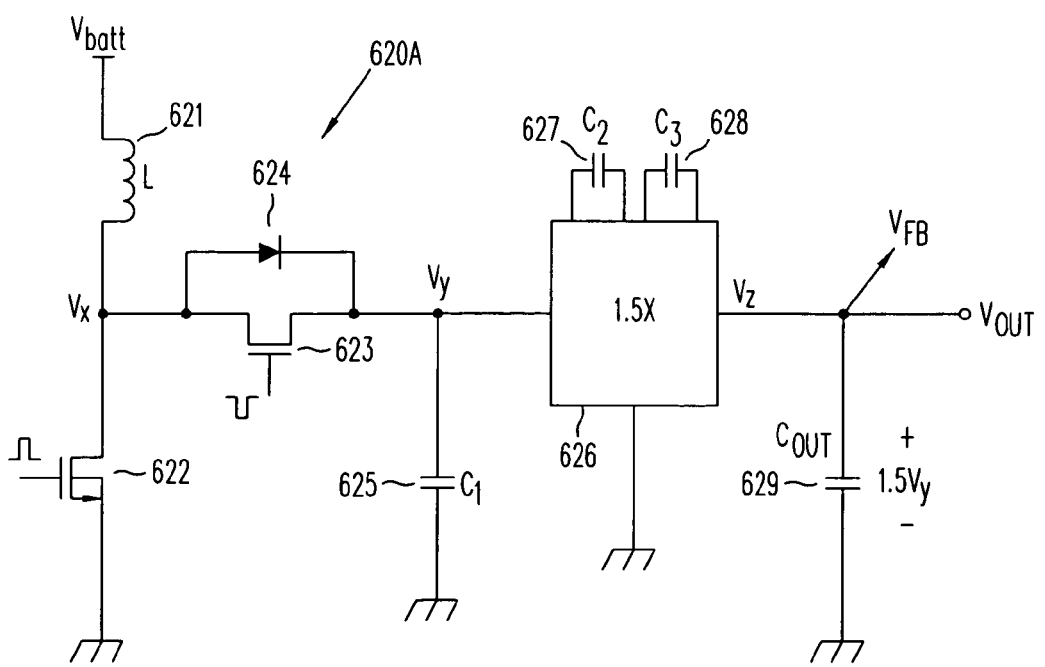
FIG. 16B is a functional block diagram of a 1.5X LCUU converter.

This is illustrated in the simplified circuit diagrams of FIGS. 16A and 16B. The 2X LCUU converter 600 shown in FIG. 16A employs a boost pre-regulator 600A, comprising a low-side MOSFET 602, an inductor 601, a diode 604 and a floating synchronous rectifier MOSFET 603, and a single-capacitor 2X-type charge pump post-converter 606 with a flying capacitor 607 to produce an output given by the relation $V_{out}=2V_{batt}/(1-D)$. D is dynamically adjusted through feedback to force converter 600 to operate at or near its optimum efficiency. Pre-regulator 600A produces an intermediate voltage $V_y$ across an optional capacitor 605. Post converter 606 produces an output voltage $V_{out}$ across an output filter capacitor 608, and provides a feedback signal $V_{FB}$ to facilitate closed control of the switching of MOSFETs in pre-regulator 600A and post-converter 606.

Similarly, 1.5X LCUU converter 620 in FIG. 16B employs a boost pre-regulator 620A, comprising a low-side MOSFET 622, an inductor 621, a diode 624 and a floating synchronous rectifier MOSFET 623, and a dual-capacitor 1.5X-type fractional charge pump post-converter 626 with flying capacitors 627 and 628 to produce an output given by the relation $V_{out}=1.5V_{batt}/(1-D)$. D is dynamically adjusted through feedback to force converter 620 to operate at or near its optimum efficiency. Pre-regulator 620A produces an intermediate voltage $V_y$ across optional capacitor 625. Post converter 626 produces an output voltage $V_{out}$ across an output filter capacitor 629, and provides a feedback signal $V_{FB}$ to facilitate closed control of the switching of MOSFETs switching in pre-regulator 620A and post-converter 626.

Figure 17A:
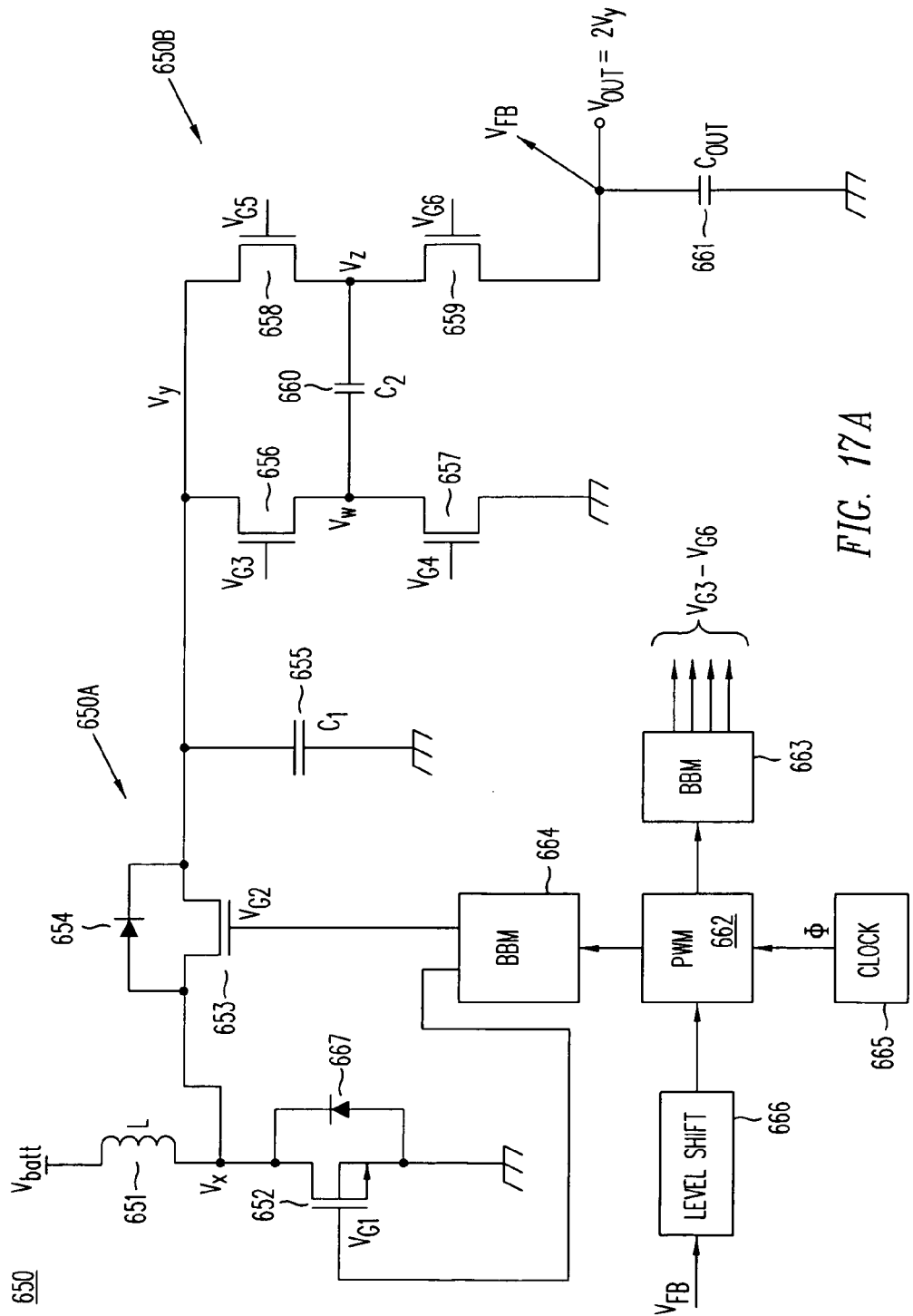
FIG. 17A is a circuit diagram of an embodiment of a 2X LCUU converter.

One embodiment of 2X-type LCUU converter 600 is illustrated in circuit 650 of FIG. 17A. Converter 650 includes a switched inductor boost pre-regulator 650A, comprising a low-side N-channel MOSFET 652 with a parasitic P-N diode 667, an inductor 651, a floating synchronous rectifier MOSFET 653 with a corresponding P-N diode 654 and an optional output capacitor 655, whose output voltage $V_y$ forms the input to a 2X-type charge-pump post-converter 650B. Post-converter 650B comprises MOSFETS 656, 657, 658, and 659; a flying capacitor 660; and an output capacitor 661. MOSFETs 652 and 654 in pre-regulator 650A are driven with gate voltages $V_{G1}$ and $V_{G2}$ respectively, and controlled by a PWM controller 662 and break-before-make (BBM) buffer 664 while a BBM buffer 663 drives MOSFETs 656, 657, 658, and 659 in post-converter 650B with gate voltages $V_{G3}$ through $V_{G6}$, respectively.

MOSFET 652 switches at the frequency $\phi$ as determined by a clock and ramp generator 665. Synchronous rectifier MOSFET 653 conducts all or some portion of the time when MOSFET 652 is not conducting. MOSFETs 656 through 659 switch at a frequency m·$\phi$, which may be higher or lower than the frequency $\phi$ generated by clock and ramp generator 665. Ideally, MOSFETs 656 through 659 operate at the same frequency $\phi$ so that capacitor 655 can be reduced in size or even eliminated. In the event that MOSFETs 656 through 659 do not switch at the frequency $\phi$, their switching should be synchronized from a single clock source so that they operate in phase, to reduce noise.

The output voltage $V_{out}$ is regulated using negative feedback $V_{FB}$ to dynamically adjust PWM controller 662 for changes in load current or input voltage.

By regulating the intermediate voltage $V_y$ to a value equal to one-half of the desired output voltage, the charge pump post-converter 650B is able to operate at its point of maximum efficiency. The feedback voltage is level-shifted to a value so that PWM controller 662 regulates its output to a voltage $V_y$ equal to $V_{out}/2$, the desired output voltage. In other words, the feedback input voltage $V_{FBin}$ to PWM controller 662 is defined as the voltage that the PWM controller will try and force on its $V_y$ output, i.e. so under closed-loop control $V_y \rightarrow V_{out}/2$.

Feedback using a doubler-type charge-pump post-converter requires only a resistor divider to adjust the signal for the PWM converter's control input. Since the output voltage $V_{FB}$ is twice the magnitude of the desired voltage $V_y$, the feedback divider utilizes equal size resistors to divide the output signal in half as an input to the PWM controller $V_{FBin}$.

Figure 17B:
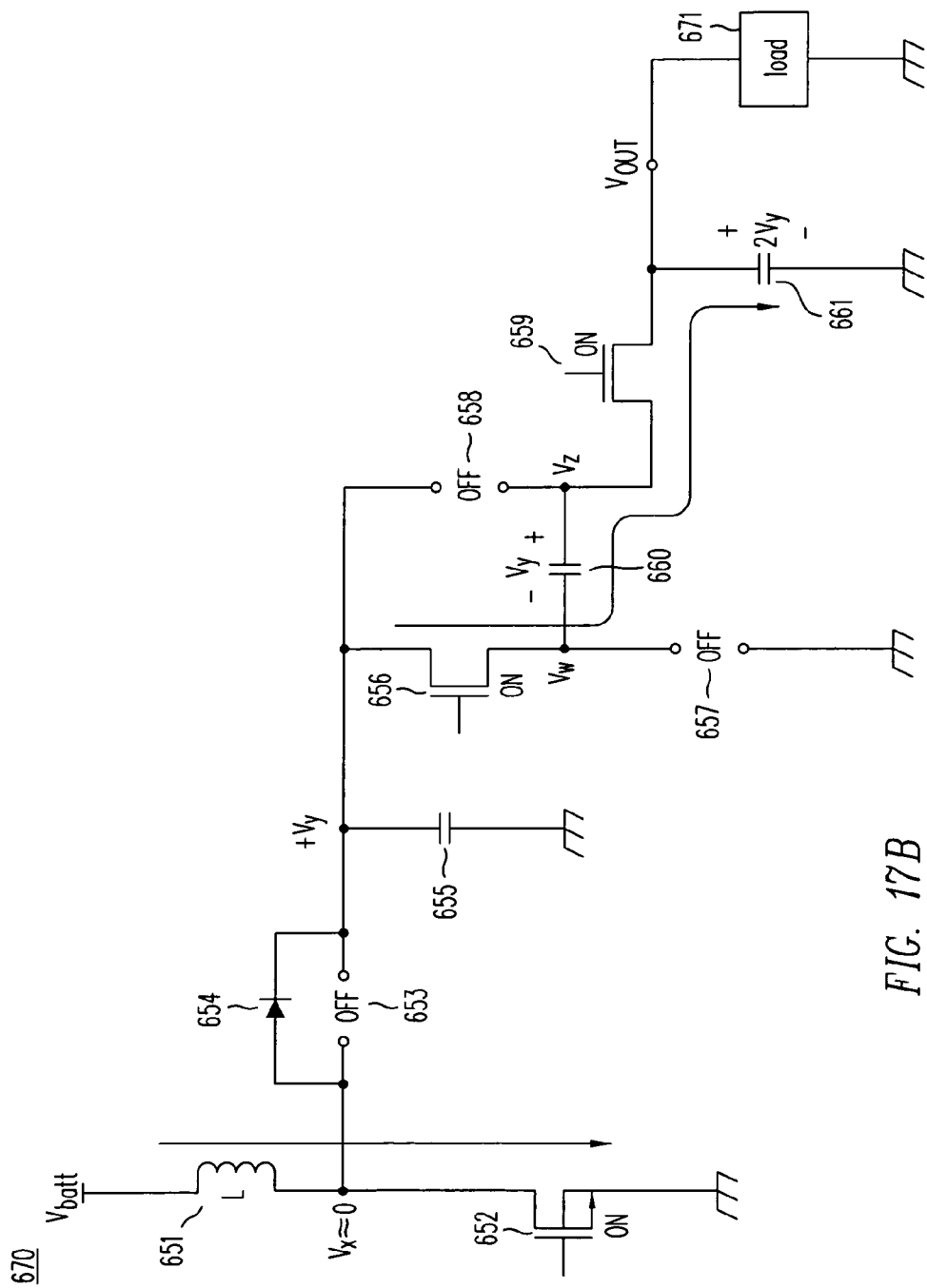
FIG. 17B is an equivalent circuit diagram of the 2X LCUU converter during the magnetizing and discharging stage.
Figure 17C:
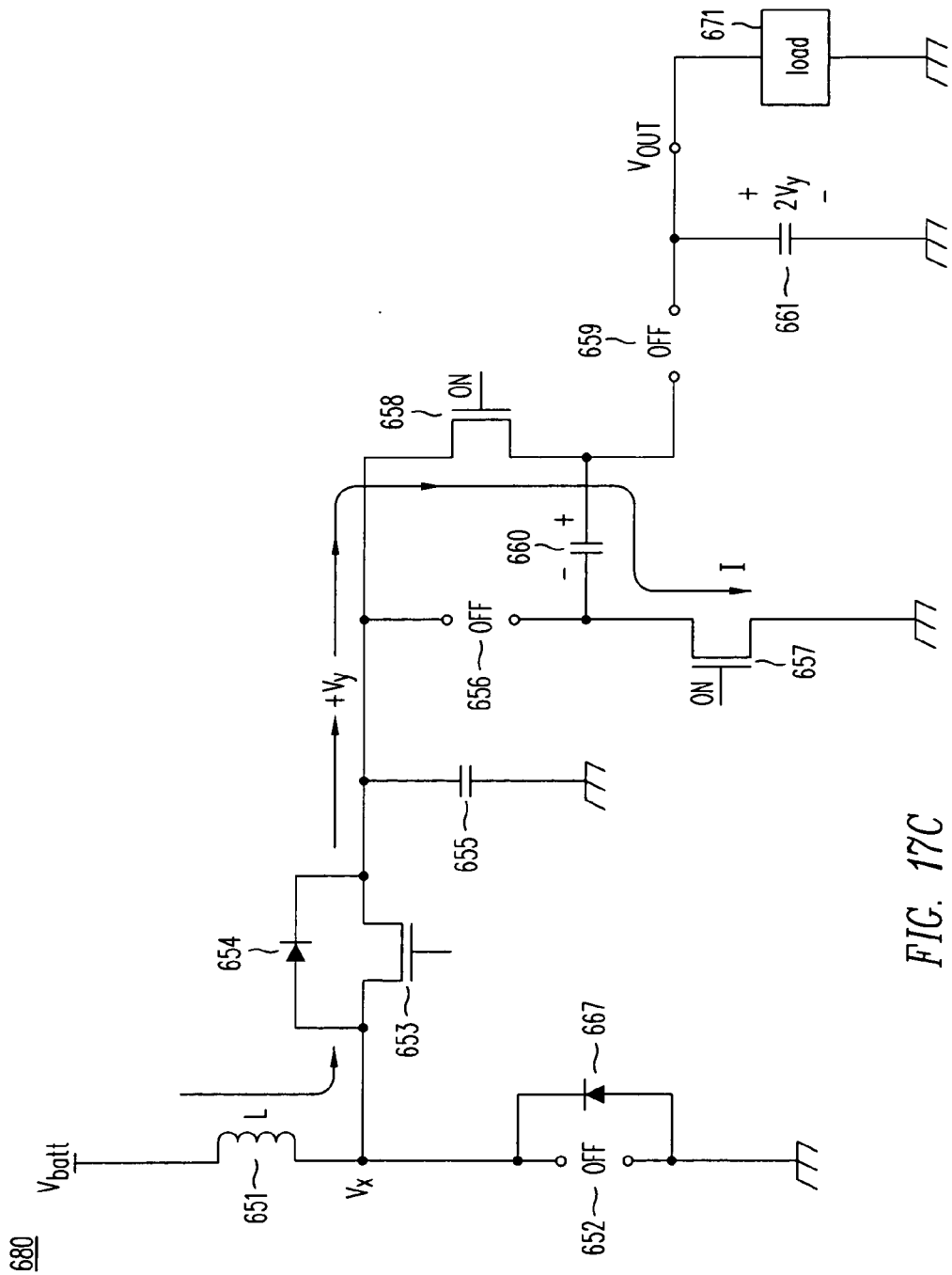
FIG. 17C is an equivalent circuit diagram of the 2X LCUU converter during the charging stage.

Operation of converter 650 involves two alternating phases. In circuit diagram 670 of FIG. 17B, MOSFET 652 conducts current, magnetizing inductor 651 while synchronous rectifier 653 remains off, disconnecting boost pre-regulator 650A from the charge pump post-converter 650B. Since $V_x$ is near ground and $V_y > V_{batt}$, P-N diode 634 remains reverse-biased. During this phase of operation, MOSFETs 656 and 659 conduct current, transferring charge from flying capacitor 660 to output capacitor 661 and to load 671 while MOSFETs 658 and 657 remain off.

In the other phase, MOSFET 652 is turned off and synchronous rectifier MOSFET 653 is turned on, whereby inductor 651 forces the voltage $V_x$ upward, substantially to voltage $V_y$, the voltage across capacitor 655, transferring energy from inductor 651 into charge pump post-converter 650B and charging flying capacitor 660 to the voltage $V_y$, through conducting MOSFETs 658 and 657. During this phase, MOSFETs 652, 659, and 656 remain off and diode 667 remains reverse-biased. Because MOSFET 659 is off, output capacitor 661 must supply the current to load 671 during this switching cycle.

The output voltage of charge pump post-converter 650B is $2V_y$, where $V_y$, the output of the boost pre-regulator is $V_{batt}/(1-D)$. The resulting voltage conversion ratio of the LCUU regulator is given by $$\frac{V_{out}}{V_{in}} = \frac{2 \cdot V_{batt}}{(1-D)}$$

Figure 18A:
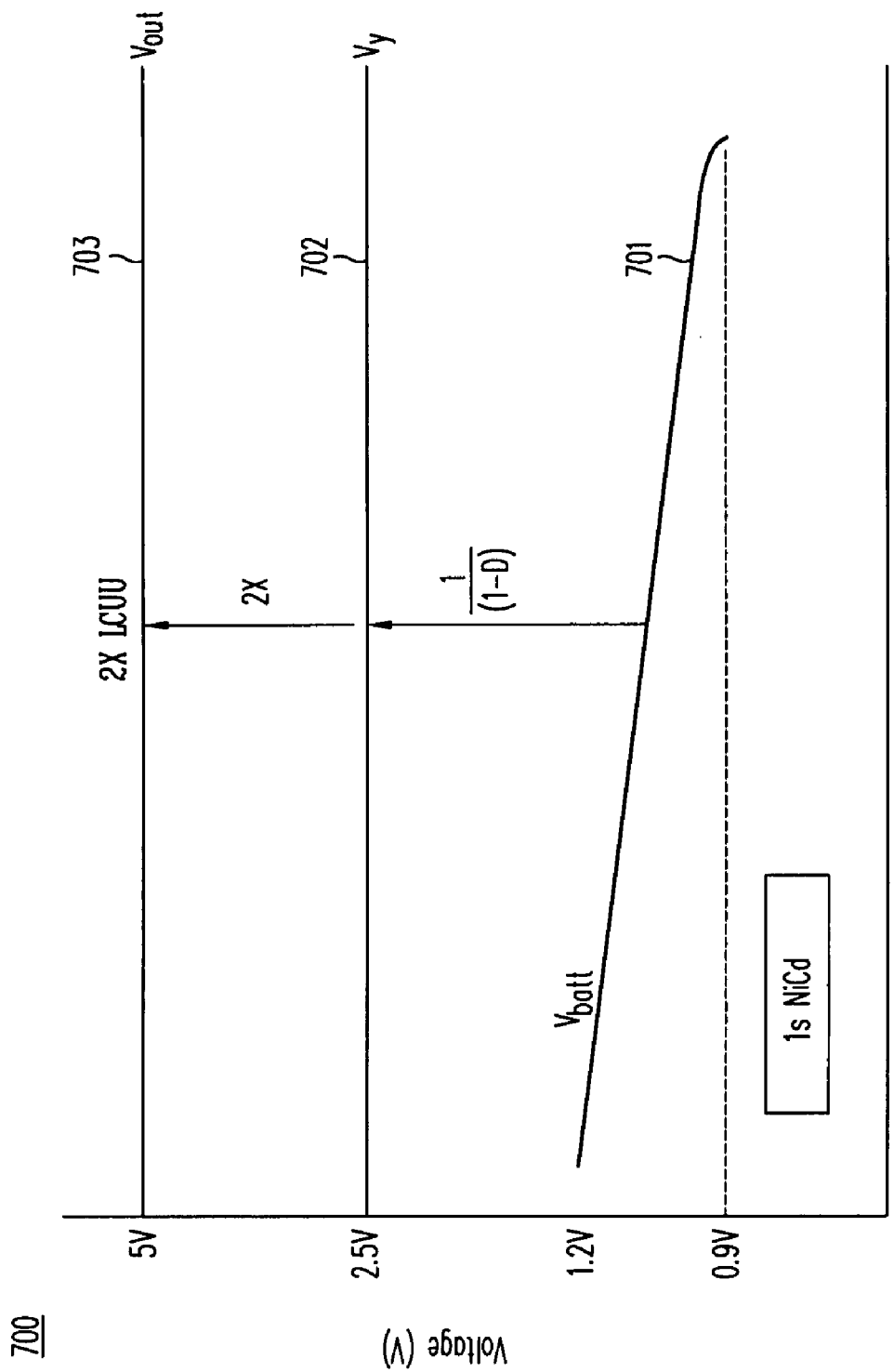
FIG. 18A is a graph showing the operation of a 2X LCUU converter with a 1-cell NiCd battery as a function of time.

The operation of LCUU converter 650 with a one-cell nickel-cadmium battery, or 1s NiCd, is illustrated in graph 700 in FIG. 18A, where the time discharge curve 701 of $V_{batt}$ varies from 1.2V to 0.9V. The unregulated battery is then stepped up by a varying amount equal to $1/(1-D)$ to produce a regulated 2.5V intermediate voltage $V_y$, shown by curve 702, and then further increased by a factor of 2X by the charge pump post-converter 650B to produce a time invariant 5V output, shown by line 703.

Figure 18B:
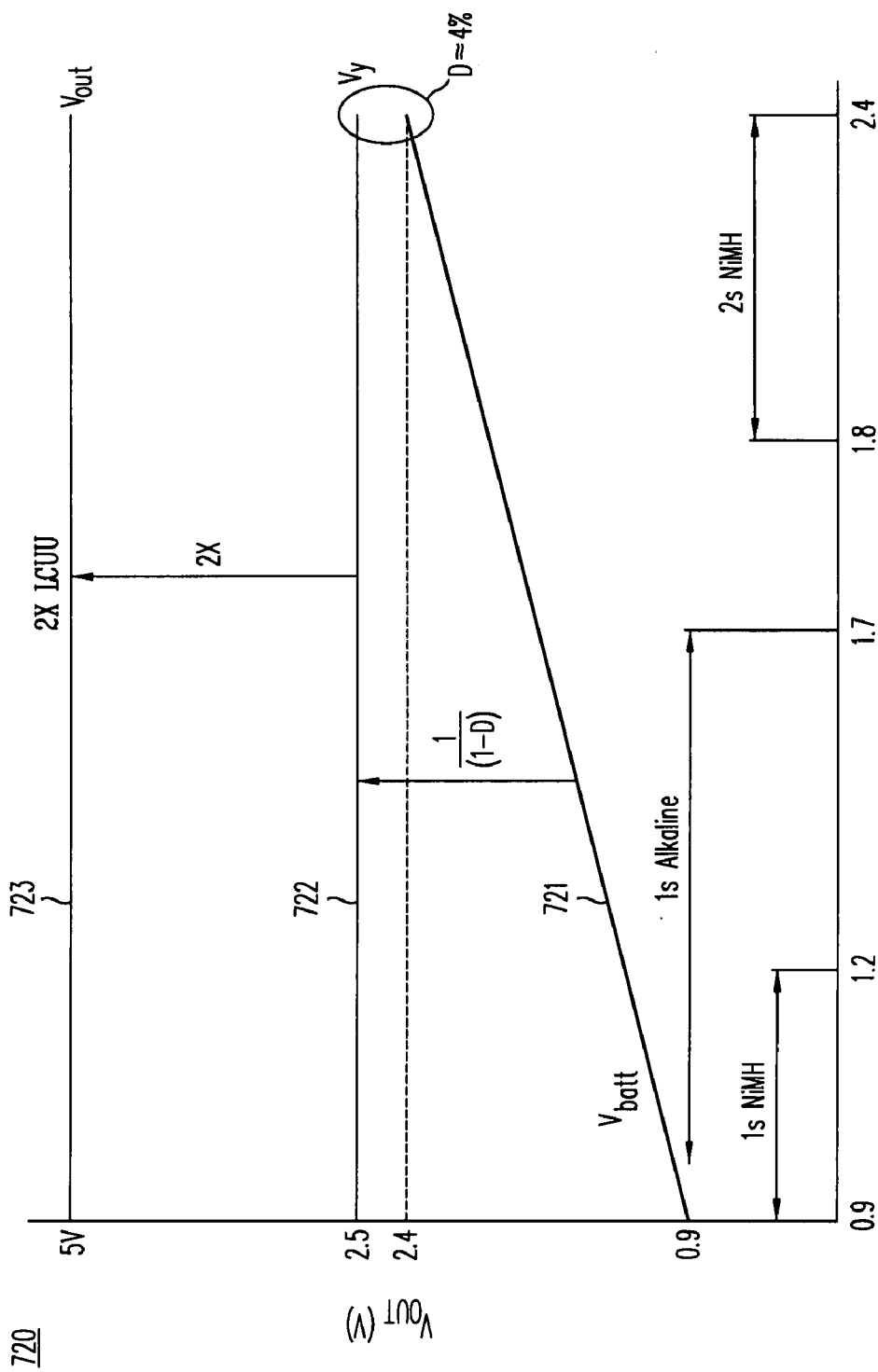
FIG. 18B is a graph showing $V_{out}$ as a function of $V_{in}$ for a 2X LCUU converter for the input voltage ranges provided by 1-cell and 2-cell NiMH and 1-cell alkaline batteries.

The $V_{out}$ versus $V_{in}$ transfer characteristics of the 2X-type LCUU converter 650 with a 5V output is further illustrated by graph 720 of FIG. 18B for input voltages ranging from 0.9V to 2.4V. The input range of 0.9 to 1.2V is representative of 1s NiCd and 1s NiMH cells, with inputs up to 1.7V for an alkaline cell during charging, and 1.8V to 2.4V for 2s NiMH. Battery input voltage $V_{batt}$ 721 is stepped up by a varying amount $1/(1-D)$ to produce intermediate voltage $V_y$ at 2.5V, shown by line 722. This voltage is stepped up by 2X using a doubler charge pump post-converter 650B to produce well regulated 5V output (line 723).

One feature of the 2X-type LCUU regulator is its ability to achieve high step-up ratios at moderate duty factors. For example, for a 1.2V input, a 60% duty factor results in a 4.2X voltage conversion ratio and a 5V output. At a 2.4V input, however, a 5V output requires regulation down to a duty factor of 4%. To increase the duty factor at higher input voltages, a variant of LCUU converter 650 employs a 1.5X charge pump post converter in place of a doubler.

Figure 19A:
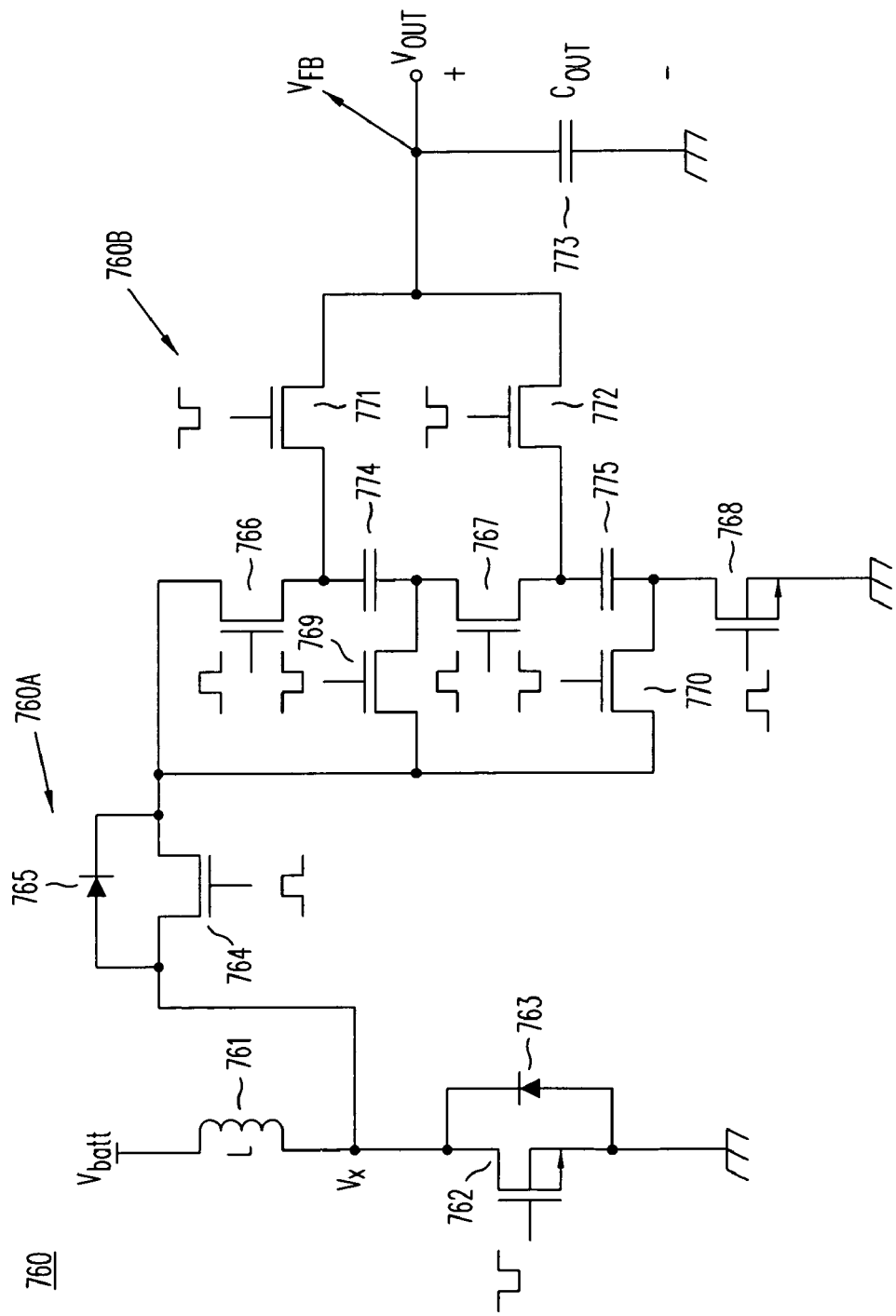
FIG. 19A is a circuit diagram of an embodiment of a 1.5X LCUU converter.

The 1.5X-type LCUU converter 760 is shown in FIG. 19A. Converter 760 includes a boost pre-regulator 760A, comprising a low-side MOSFET 762, an inductor 761, a synchronous rectifier MOSFET 764 with an intrinsic diode 765 and an optional capacitor 779, and a charge pump post-converter 760B comprising MOSFETs, 766, 767, 768, 769, 770, 771 and 772; flying capacitors 774 and 775 and an output capacitor 773. Converter 760 is controlled in a manner similar to 2X-type LCUU converter 650, except that the charge pump is a 1.5X fractional type rather than a doubler.

Figure 19B:
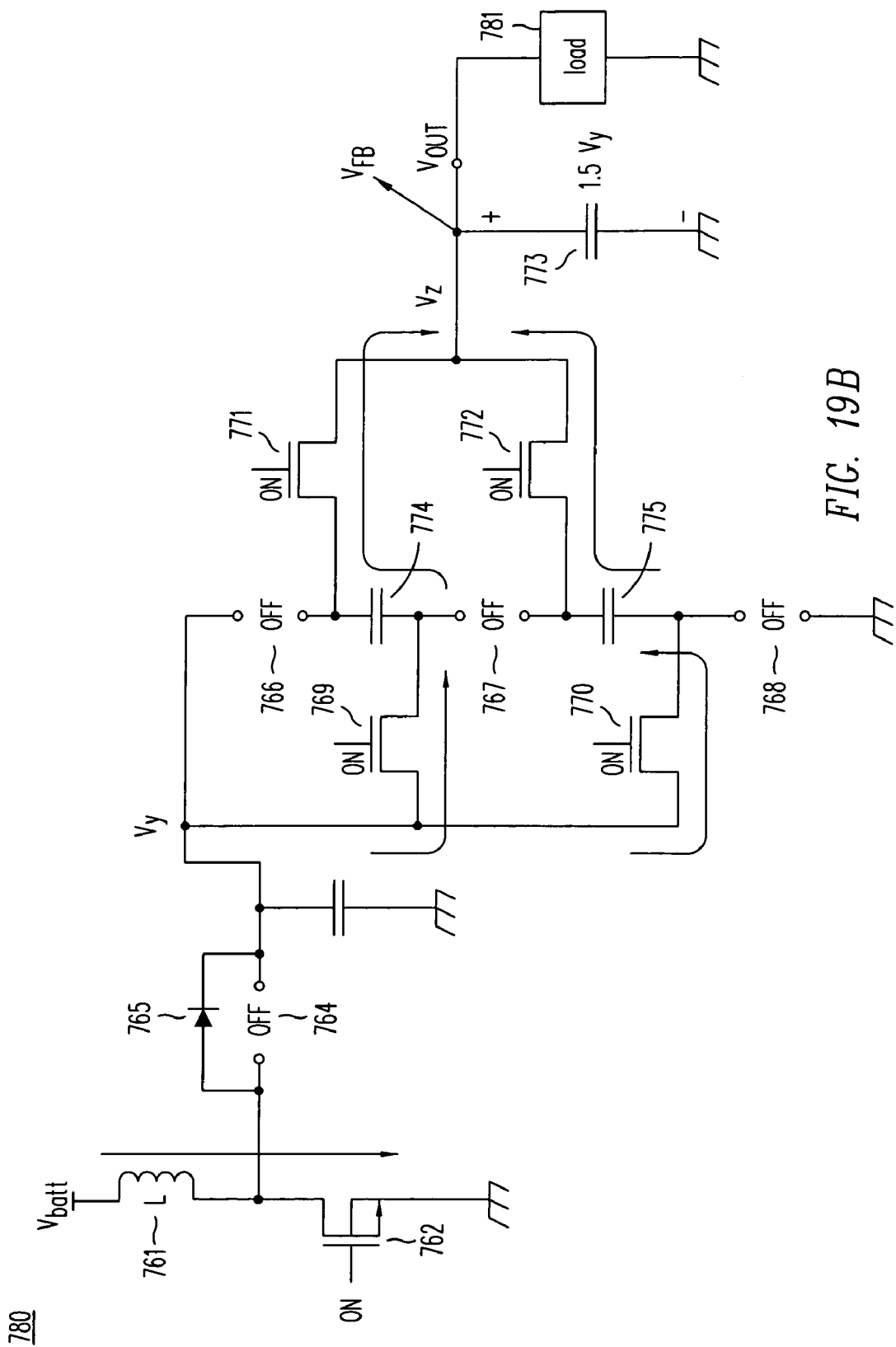
FIG. 19B is an equivalent circuit diagram of the 1.5X LCUU converter during the magnetizing and discharging stage.

Operation of converter 760 involves two alternating phases. In one phase shown by circuit diagram 780 in FIG. 19B, inductor 761 is magnetized by current flowing through MOSFET 762 while synchronous rectifier MOSFET 764 remains off. During this phase, flying capacitors 774 and 775 transfer charge to output capacitor 773 and load 781 through on MOSFETs 769, 770, 771, and 772. All other MOSFETs remain off. Since $V_x$ is biased near ground and $V_y > V_{batt}$, diode 765 remains reverse-biased.

In the alternate phase illustrated by circuit diagram 790 in FIG. 19C, MOSFET 762 is shut off while synchronous rectifier MOSFET 765 is turned on transferring energy from inductor 761 to flying capacitors 774 and 775 through MOSFETs 766, 767 and 768. All other MOSFETs remain off, including MOSFETs 771 and 772, disconnecting the charge pump with post-converter 760B from output capacitor 773. As a result, capacitor 773 supplies current to load 781 during this operating phase.

The output voltage of the charge pump post-converter 760B is $1.5V_y$, where $V_y$, the output of the boost pre-regulator is equal to $V_{batt}/(1-D)$. The resulting voltage conversion ratio of the 1.5X-type LCUU regulator is given by $$\frac{V_{out}}{V_{in}} = \frac{1.5 \cdot V_{batt}}{(1-D)}$$

Figure 18C:
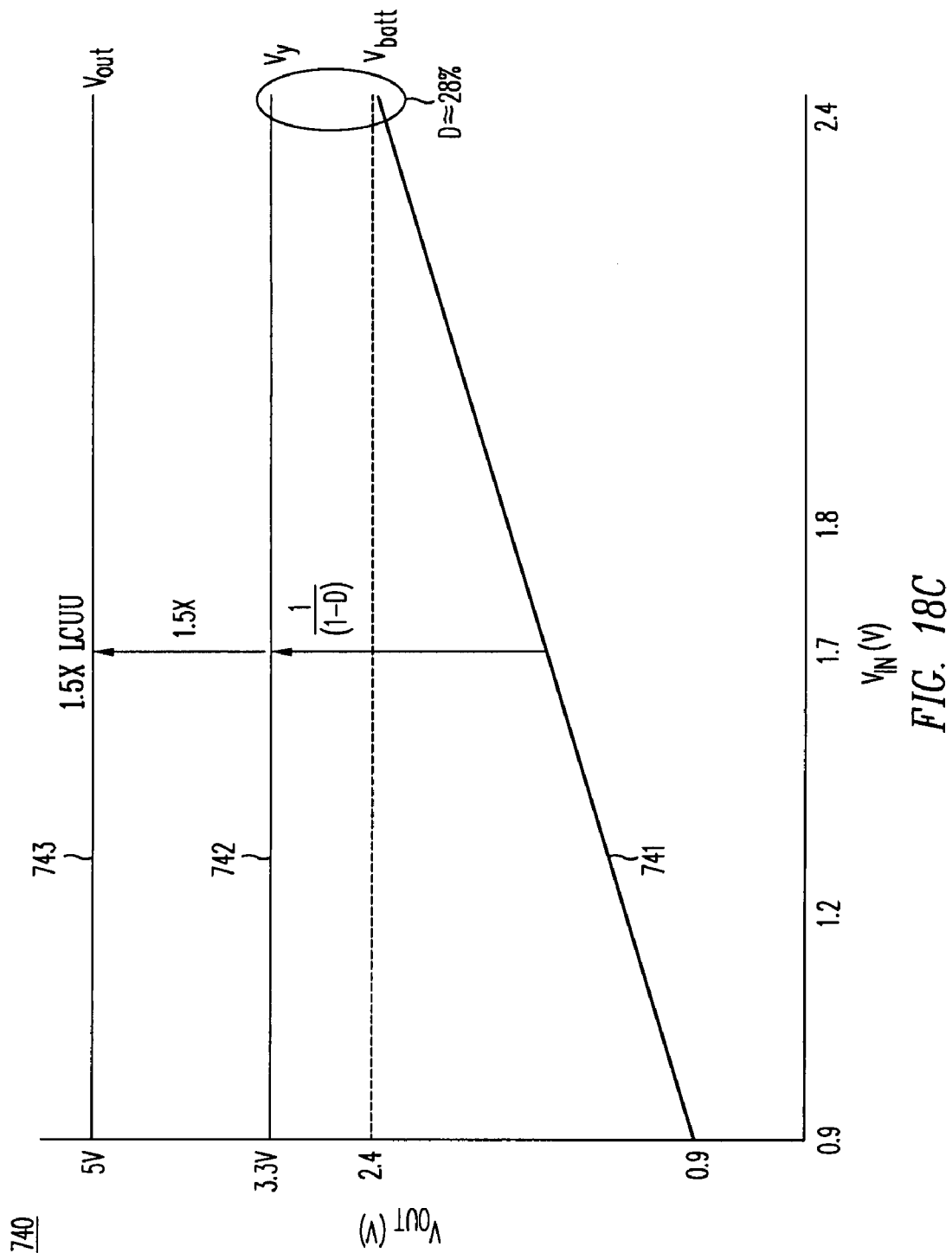
FIG. 18C is a graph showing $V_{out}$ as a function of $V_{in}$ for a 1.5X LCUU converter for the input voltage ranges provided by 1-cell and 2-cell NiMH and 1-cell alkaline batteries.

The output to input transfer characteristics of converter 760, shown in graph 740 in FIG. 18C reveal that the 1.5X LCUU circuit is able to regulate a 5V output over an input voltage range spanning 1s and 2s NiMH batteries and still operate with a duty factor exceeding 28%. As illustrated, $V_{batt}$ (curve 741) is stepped up by a varying amount $1/(1-D)$ to result in a 3.3V intermediate voltage $V_y$, shown by line 742, and then multiplied by 1.5X to produce a well regulated 0.5V output (curve 743).

Figure 20:
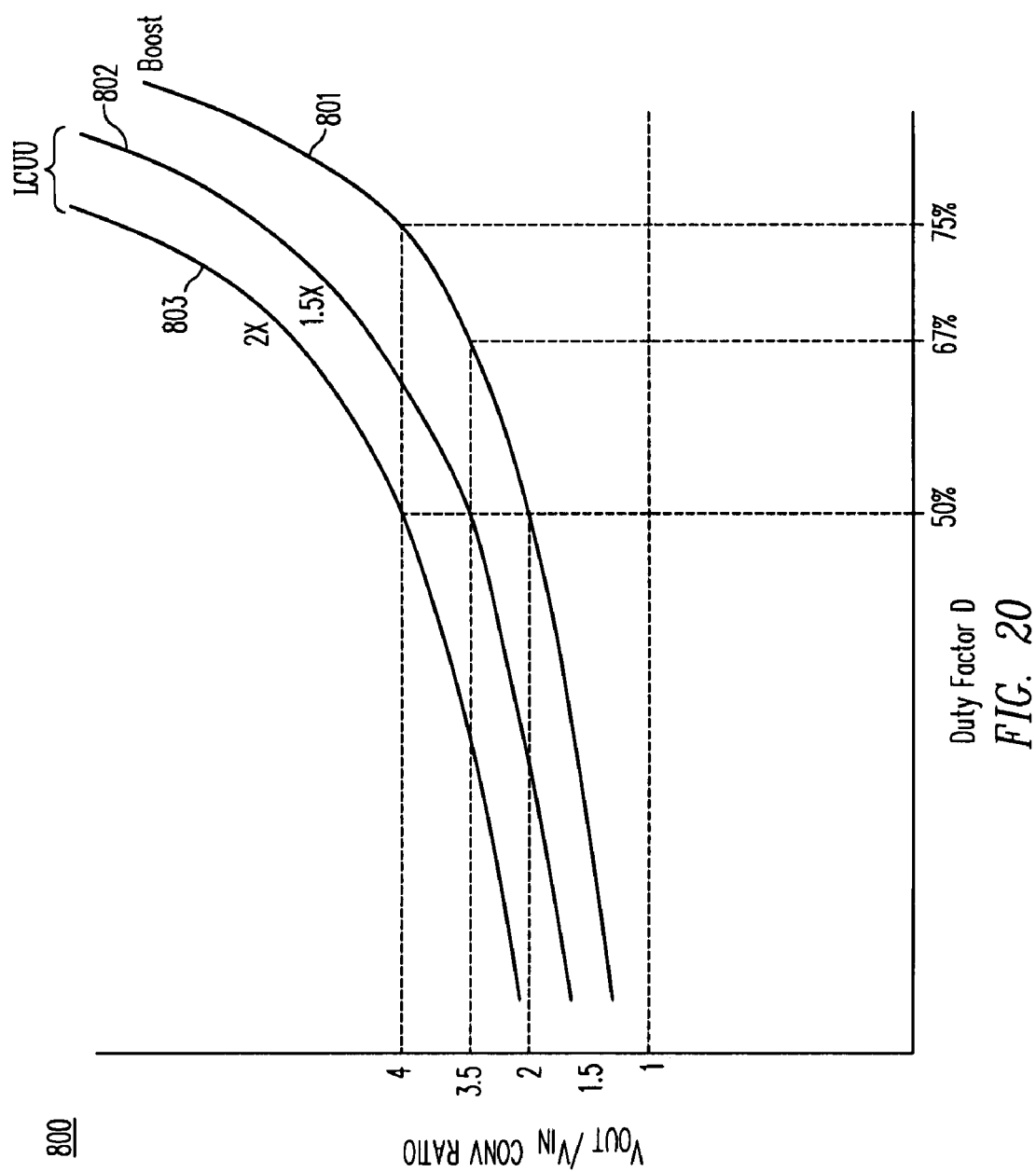
FIG. 20 is a graph of the voltage conversion ratio as a function of the duty factor of the pre-regulator in 2X and 1.5X LCUU converters.

The duty factor dependence of the conversion ratios of the 2X and 1.5X LCUU converters 600 and 760 is illustrated by lines 803 and 802, respectively, in graph 800 of FIG. 20 in contrast to a conventional boost converter's characteristic 801. As shown, a duty factor of 50% results in doubling of the input voltage for a boost converter, while the 2X LCUU regulator results in a 4X step-up ratio. At 75% duty ratios, the boost converter quadruples its input while the 1.5X-type LCUU converter results in a 6X step-up and the 2X-type produces an 8X ratio.

Table 3 contrasts the D=50% preferred conversion ratio for the 2X LCUU, 1.5X LCUU, boost, and the 0.5X LCUD converters and illustrates the duty factor range needed to output several common output voltages from 1s and 2s NiMH batteries.

Those conditions marked with an asterisk (*) may require limiting the converter's operating frequency in order to meet the full range in required duty factors. Those marked with N/A require both step-up and step-down conversion, not possible with an up-up converter. Since the LCUX converters are ratio-metric, i.e. regulating at a pre-determined conversion ratio, a converter converting a 1s NiMH input to a 2.5V output requires the same duty factor as converting a 2s NiMH input to a 5.0V output.

Inverting Switched Inductor-Capacitor (LCUI) Converters

An LCUX switching converter can be used to generate a voltage below ground, i.e. an inverted voltage. As stated previously, an LCUX converter exhibits an output to input voltage conversion governed by the equation $$\frac{V_{out}}{V_{in}} = \frac{n}{1-D}$$

where n has discrete, i.e. quantized values of n equal to, for example, 2, 1.5, 0.5, −0.5 or −1.0, depending on the number of capacitors and the charge pump, and where D is dynamically adjusted using feedback to maximize the converter's overall efficiency. When n is negative, the output voltage of the converter is negative. A converter that generates a negative output voltage from a positive voltage input is referred to as an inverter, and using the above nomenclature is referred to herein as a LCUI converter.

Figure 21A:
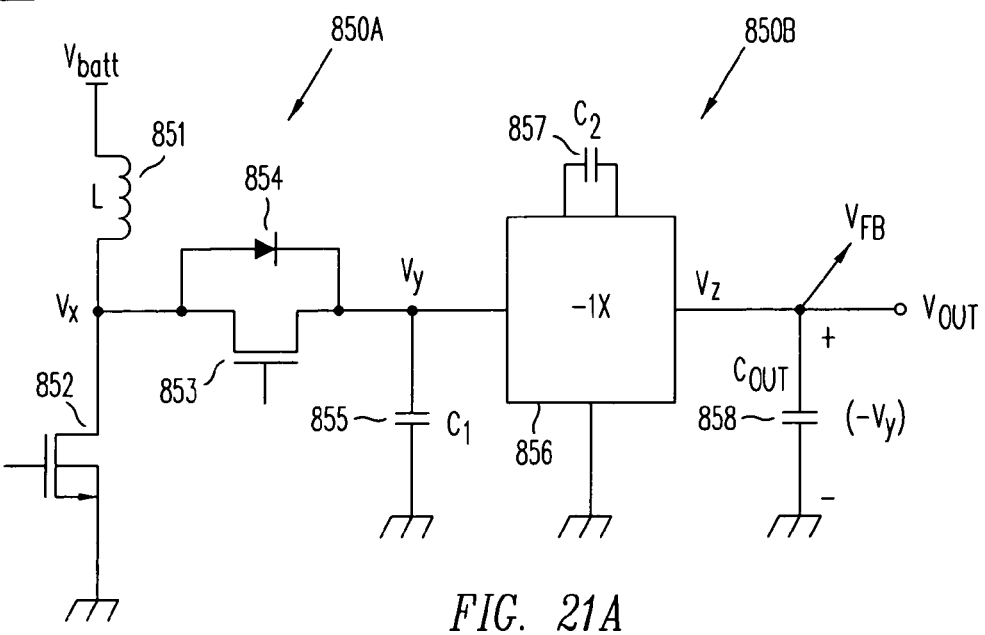
FIG. 21A is a functional block diagram of an inverting −1X LCUI converter.
Figure 21B:
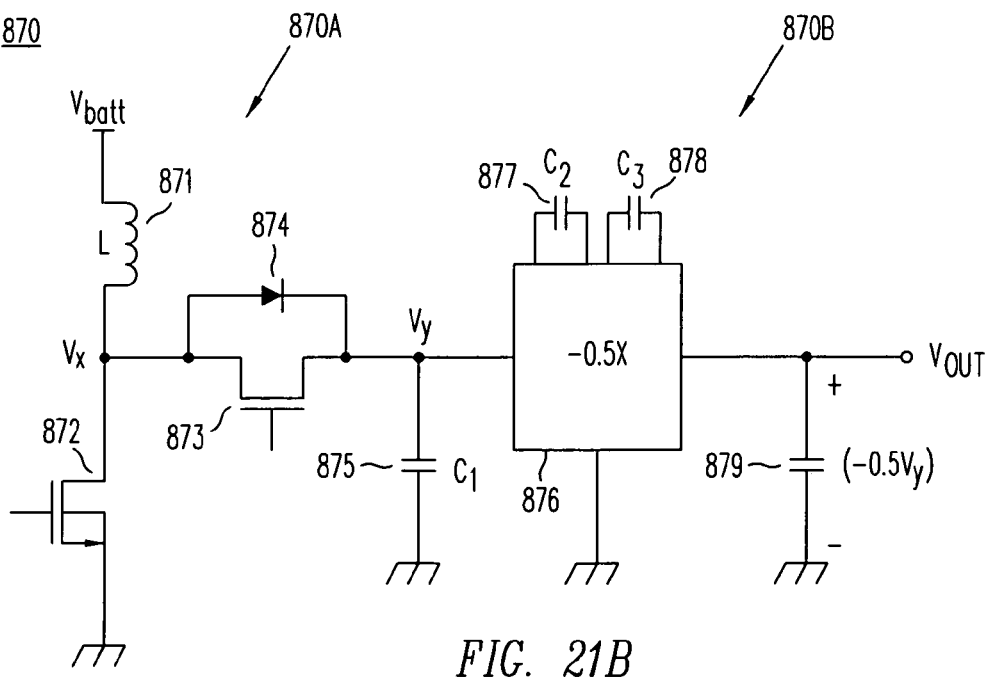
FIG. 21B is a functional block diagram of an inverting −0.5X LCUI converter.

FIGS. 21A and 21B illustrate two of the numerous topologies of LCUI converters according to this invention. For example, LCUI converter 850 shown in FIG. 21A employs a boost pre-regulator 850A, which comprises a MOSFET 852, an inductor 851, and a synchronous rectifier 853 with an intrinsic diode 854, and a post-converter 850B, which comprises a single-capacitor −1X type charge pump 856 with a flying capacitor 857. Converter 850 produces an output given by the relation $V_{out} = -V_{batt}/(1-D)$, where D is dynamically adjusted through feedback to force converter 850 to operate at or near its optimum efficiency. Converter 850 also includes an output filter capacitor 858 and an optional capacitor 855 biased at intermediate voltage $V_y$.

An LCUI converter may also utilize an inverting fractional charge pump in its post-converter stage. Fractional LCDI converter 870, shown in FIG. 21B, employs a boost pre-regulator 870A, which comprises a MOSFET 872, an inductor 871, and a synchronous rectifier MOSFET 873 with an intrinsic diode 874 and post-converter 870B, which comprises a dual-capacitor −0.5X type charge pump 876 with flying capacitors 877 and 878. Converter 870 produces an output given by the relation $V_{out} = -0.5 \, DV_{batt}$, where D is

TABLE 3

| NiMH Case<br>D = 50% | 2 × LCUU<br>$V_{out}/V_{in}$ = 4.0 | 1.5 × LCUU<br>$V_{out}/V_{in}$ = 3.0 | boost<br>$V_{out}/V_{in}$ = 2.0 | 0.5 × LCUD<br>$V_{out}/V_{in}$ = 1.0 |
|---|---|---|---|---|
| 1s → 5.0 V | 52% < D < 64% | 64% < D < 73% | 76% < D < 82% | 88% < D < 91% |
| 1s → 3.0 V | 20% < D < 40% | 40% < D < 55% | 60% < D < 70% | 80% < D < 85% |
| 1s → 2.5 V | 4%* < D < 28% | 28% < D < 46% | 52% < D < 64% | 76% < D < 82% |
| 2s → 5.0 V | 4%* < D < 28% | 28% < D < 46% | 52% < D < 64% | 76% < D < 82% |
| 2s → 3.0 V | NA | NA | 20% < D < 40% | 60% < D < 70% | dynamically adjusted through feedback to force converter 870 to operate at or near its optimum efficiency. Converter 870 also includes an output filter capacitor 879 and an optional capacitor 875 biased at intermediate voltage $V_y$.

Figure 22A:
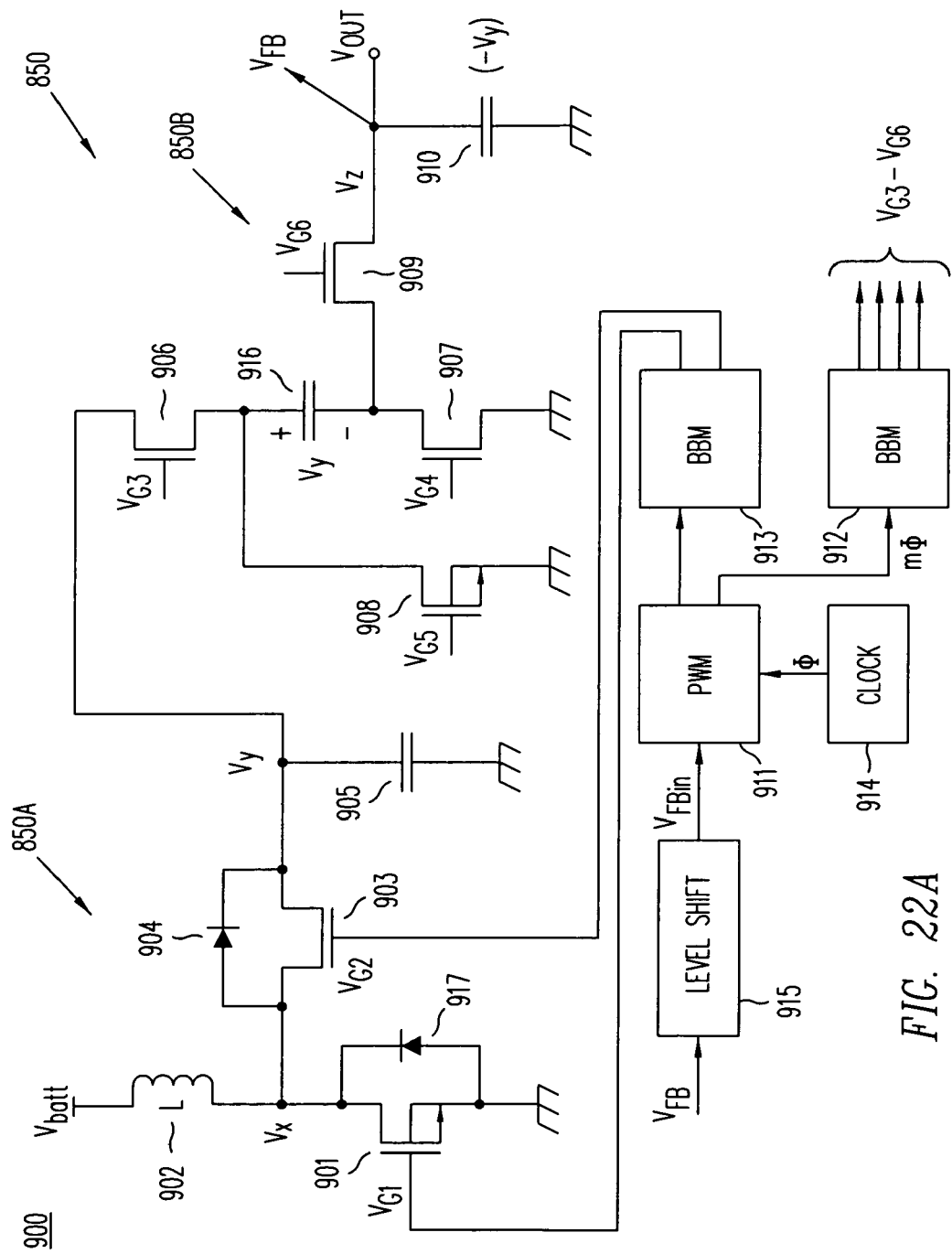
FIG. 22A is a circuit diagram of an embodiment of a −1X LCUI converter.

Examining the implementation of the LCU-type inverters in greater detail, FIG. 22A illustrates a circuit diagram 900 of –1X switched LCUI converter 850. As shown, LCUI converter 850 includes a low-side N-channel power MOSFET 901, a floating synchronous rectifier MOSFET 903 with an intrinsic P-N diode 904, and an inductor 902, which together make up the boost-type pre-regulator 850A converting input voltage $V_{batt}$ to intermediate voltage $V_y$. The voltage $V_y$, across the optional filter capacitor 905, forms the input to –1X type charge pump inverting post-converter 850B, which includes power MOSFETs 906, 907, 908 and 909, together sequentially charging and discharging a flying capacitor 916 from pre-regulator 850A and into output filter capacitor 910.

The output voltage of charge pump post-converter 850B is $-V_y$ where $V_y$, the output of the boost pre-regulator is $V_{batt}/(1-D)$. The resulting voltage conversion ratio of the LCUI converter 850 is given by $$\frac{V_{out}}{V_{in}} = -\frac{V_{batt}}{(1-D)} = \frac{V_{batt}}{(D-1)}$$

The circuit diagram shown in FIG. 22A represents a rigorous implementation of LCUI converter 850, where series-connected MOSFETs 903 and 906 with capacitor 905 charged at intermediate voltage $V_y$ allow pre-regulator 850A and post-converter 850B to operate independently at differing frequencies yet still under the control of a single feedback loop.

High-side or floating configured power MOSFETs 903, 906, and 909 may be either N-channel or P-channel devices, with appropriate changes in the gate drive signal and gate buffer circuitry. Low-side power MOSFETs 901, 907, and 908 are preferably implemented as N-channel devices. Output voltage $V_{out}$ is used as feedback signal $V_{FB}$, inverted by a level-shift circuit 915 to produce a positive voltage proportional to intermediate voltage $V_y$ as the control input to the error amplifier within a PWM controller 911. This control voltage is chosen to force the output of pre-regulator 850A to voltage $V_y$ having a magnitude equal to the inverse of the output voltage.

PWM controller 911, synchronized a to clock and ramp generator circuit 914, switches at a clock frequency φ and drives break-before-make buffer 913 at the same frequency. A BBM buffer 913 drives low-side MOSFET 901 and synchronous rectifier MOSFET 903 out of phase, with gate biases $V_{G1}$ and $V_{G2}$ to prevent shoot-through conduction. The polarity of $V_{G2}$ for synchronous rectifier MOSFET 903 is positive with respect to its source if MOSFET 903 is an N-channel device, and negative with respect to its source if MOSFET 903 is a P-channel. Assuming that MOSFET 901 is an N-channel MOSFET, the gate drive $V_{G1}$ of low-side MOSFET 901 is positive with respect to its source. Synchronous rectifier MOSFET 903 is controlled to conduct all or some portion of the time when MOSFET 901 is off, but never to conduct significant current when the low-side device is on.

Preferably, the clock signal controlling the PWM controller 911 also controls BBM buffer 912, producing gate signals $V_{G3}$, $V_{G4}$, $V_{G5}$ and $V_{G6}$ to control the sequencing of charge pump MOSFETs 906, 907, 908, and 909, respectively. These MOSFETs conduct in an alternating sequence, with MOSFETs 906 and 907 conducting while MOSFETS 908 and 909 are off to charge capacitor 916; and then with MOSFETs 908 and 909 conducting while MOSFETs 906 and 907 are off to discharge capacitor 916 by transferring its charge onto reservoir capacitor 910. BBM buffer 912 prevents shoot-through conduction between MOSFETs 907 and 909, and also between MOSFETs 906 and 908.

MOSFETs 906, 907, 908 and 909 may be switched synchronously to clock and ramp generator circuit 914 at the frequency φ, or switched at some higher multiple of the clock frequency, i.e. m·φ, or alternatively at a frequency independent of φ. In a preferred embodiment, all the power MOSFETs in pre-regulator 850A and post-converter 850B are switched in synchronous fashion, thereby allowing filter capacitor 905 to be made smaller. In contrast, if post-converter 850B oscillates independently of pre-regulator 850A, capacitor 905 is required to temporarily store energy needed to support momentary load and line transients.

The inverting-type charge-pump post-converter 850B requires an inverting level-shift circuit 915 to adjust the below ground signal into a positive value appropriate for the control input terminal of PWM converter 911. Since the output voltage $V_{FB}$ is equal in absolute magnitude but opposite in polarity to the intermediate voltage $V_y$, level-shift circuit 915 should invert the $-V_{FB}$ signal into $+V_{FB}$ for use as an input $V_{FBin}$ to PWM controller 911. As such, the feedback input voltage $V_{FBin}$ to the PWM controller 911 is defined as the voltage that the PWM controller will try and force on its $V_y$ output, i.e. so under closed loop control $V_y \to (-V_{out})$ which is a positive voltage since $V_{out}$ is negative.

Figure 22B:
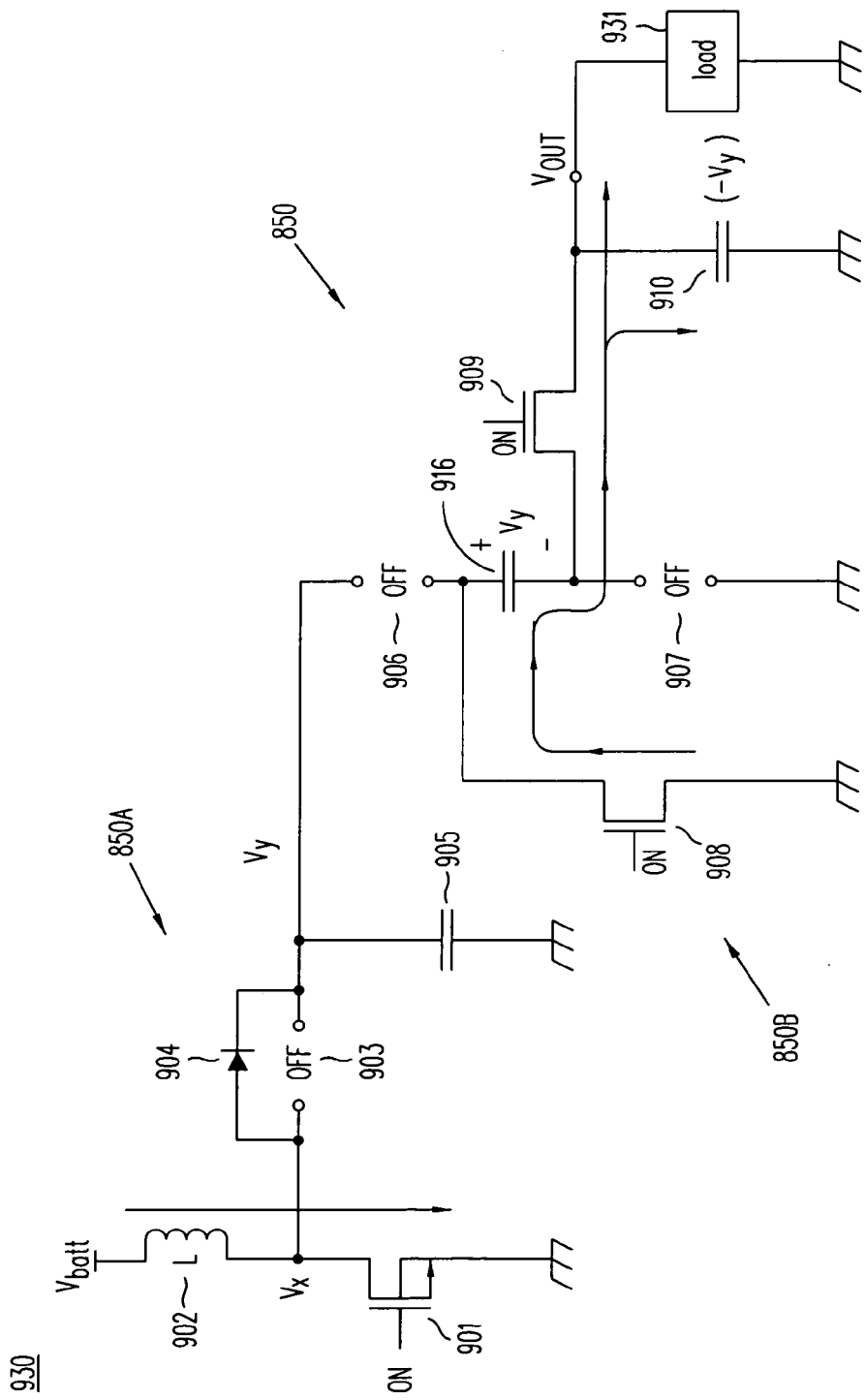
FIG. 22B is an equivalent circuit diagram of the −1X LCUI converter during the magnetizing and discharging stage.
Figure 22C:
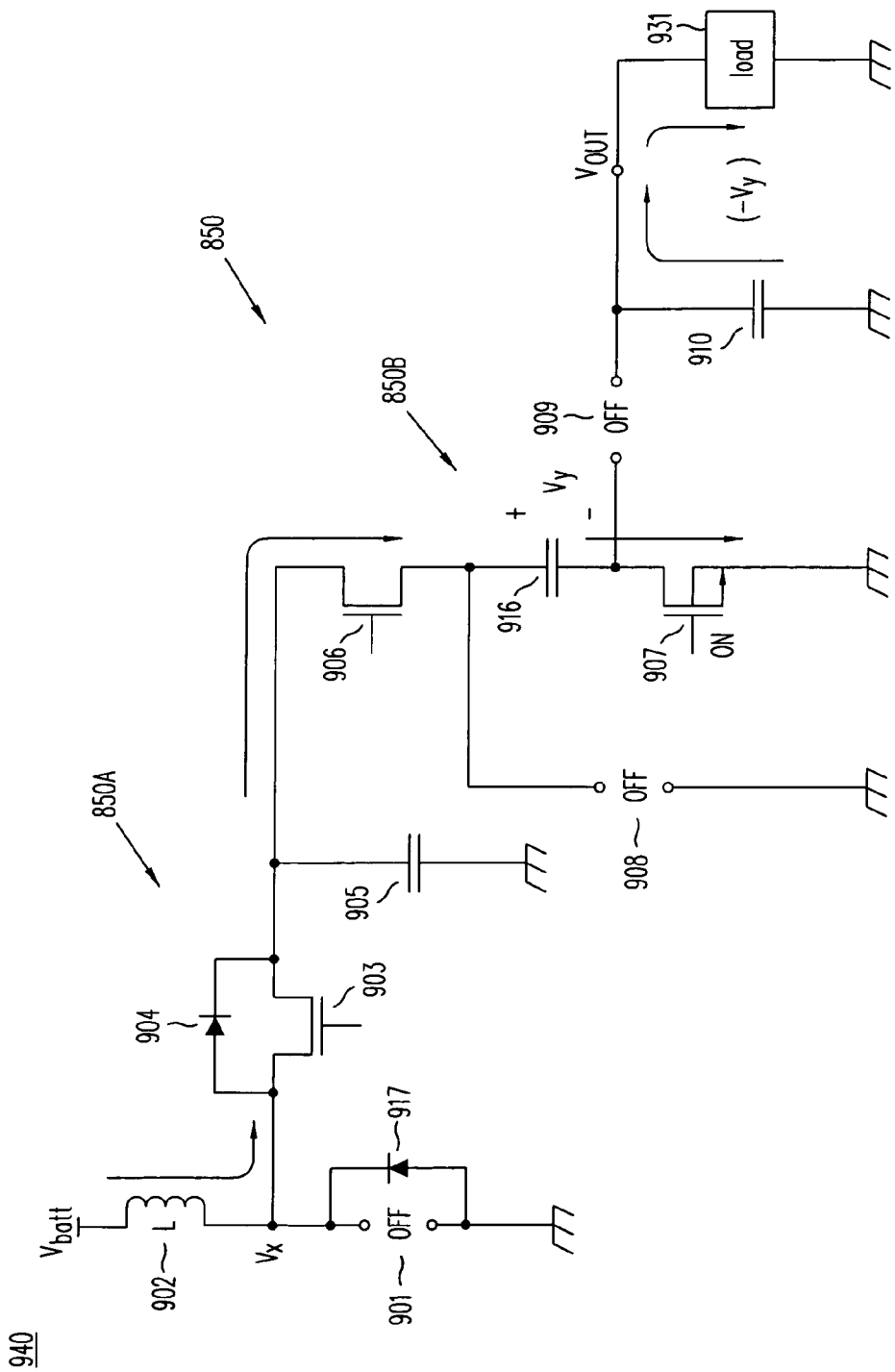
FIG. 22C is an equivalent circuit diagram of the −1X LCUI converter during the charging stage.

Synchronous operation of pre-regulator 850A and post-converter 850B in –1X type LCUI converter 850 is described in FIGS. 22B and 22C. In FIG. 22B circuit diagram 930 shows converter 850 during the magnetizing of inductor 902, and the simultaneous transfer of charge from flying capacitor 916 into reservoir capacitor 910. During this phase, $V_x$ near ground, and current flows from $V_{batt}$ through on-state MOSFET 901, magnetizing inductor 902, while synchronous rectifier MOSFET 903 remains off, disconnecting the pre-regulator 850A from post converter 850B.

Since $V_x$ is near ground and $V_y > V_{batt}$, diode 904 remains reverse-biased and non-conducting. In a preferred embodiment, concurrent to the magnetization of inductor 902, flying capacitor 916 transfers its charge and supplies current to reservoir capacitor 910 and load 931 through MOSFETs 908 and 909, while MOSFETs 906 and 907 remain off. The output $V_{out}$ is forced to a negative, i.e. below ground, potential because the positive terminal of flying capacitor 916 is connected to ground and the negative terminal of flying capacitor is connected to output capacitor 910.

In FIG. 22C circuit diagram 940 represents the same LCUI converter 850 during the recirculation of current through inductor 902 and during the charging of flying capacitor 916. During this time period, inductive recirculation, i.e. de-magnetizing, current flows through forward biased diode 904 shunted by on-state synchronous rectifier MOSFET 903, and through conducting MOSFETs 906 and 907, charging flying capacitor 916. During the recirculation phase, $V_x$ is approximately equal to $V_y$, the voltage present across capacitor 916. Capacitor 916 charges to a voltage substantially equal to $V_y$. Since MOSFET 909 remains off in this phase, reservoir capacitor 910, biased at the voltage $-V_y$, must supply current to load 931 during this interval.

Figure 23A:
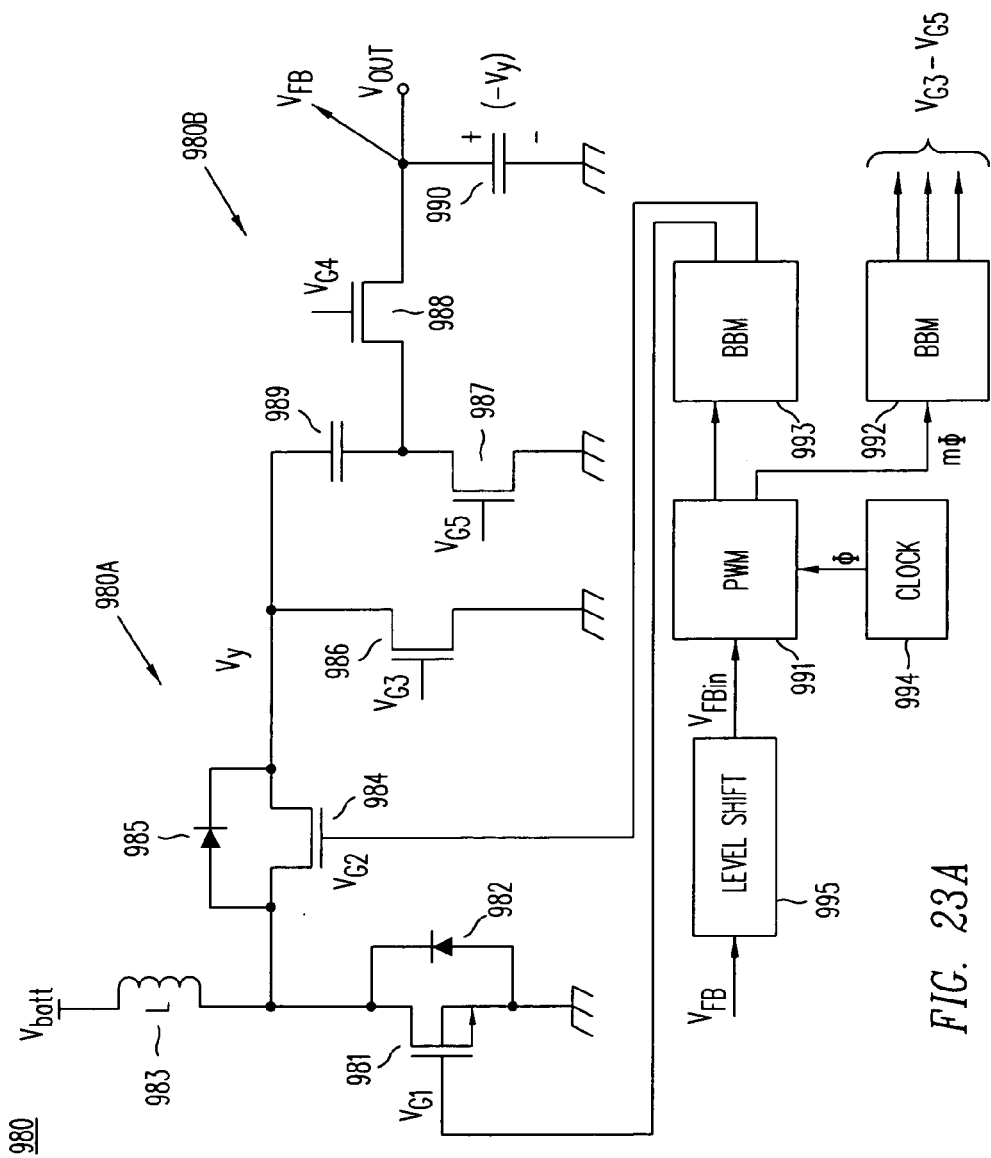
FIG. 23A is a circuit diagram of an alternative embodiment of a −1X LCUI converter.

In the rigorous implementation of the LCUI inverter 850, synchronous rectifier MOSFET 903 is connected in series with the MOSFET 906, the $V_y$- connected input of the charge pump. In the event that inductive pre-regulator 850A and charge pump post-converter 850B are synchronized and switching at the same frequency, MOSFET 906 is redundant and may be eliminated. This simplified implementation of LCUI inverter 850 for synchronous operation is illustrated by LCUI converter 980 of FIG. 23A where MOSFET 984 serves both functions of rectification and controlling the charging of flying capacitor 989.

In other regards LCUI inverter 980 operates in a similar manner to converter 850, with an inductive pre-regulator 980A comprising a low-side N-channel MOSFET 981, an inductor 984, a synchronous rectifier MOSFET 984 with intrinsic diode 985, a PWM controller 991, a BBM buffer 993, a clock and ramp generator 994 and a level-shift circuit 995 for feedback $V_{FBin}$ to PWM controller 991 from $V_{out}$. A post-converter 980B includes a −1X inverting charge-pump comprising MOSFETs 986, 987, and 988, a flying capacitor 989, an output capacitor 990 and a BBM circuit 992. In the synchronized −1X LCUI inverter, BBM buffers 992 and 993 both switch at the clock frequency φ, or, in other words, m=1.

As shown, BBM buffer 992 produces gate signals $V_{G3}$, $V_{G4}$, and $V_{G5}$ to control the sequencing of charge pump MOSFETs 986, 988, and 987, respectively while BBM buffer 993 drives MOSFETs 981 and 984 with gate signals $V_{G1}$ and $V_{G2}$. These MOSFETs conduct in alternating sequential fashion. In one phase, as shown in circuit 1000 of FIG. 23B, MOSFETs 981, 986 and 988 conduct while MOSFETs 984 and 987 remain off, thereby magnetizing inductor 983 and transferring charge from flying capacitor 989 to reservoir capacitor 990.

Since both MOSFETs 981 and 986 are conducting, they drive the potential on the anode and the cathode of P-N diode 985 near ground, with a net bias on across the diode being slightly reverse biased or near zero. By forcing the positive terminal of pre-charged capacitor 989 to ground, the negative terminal of capacitor 989 assumes a potential of $-V_y$ and biases the output $V_{out}$ to the negative potential $-V_y$, a voltage determined by the duty factor D of pre-regulator 980A.

In the opposite phase, as shown in circuit diagram 1010 of FIG. 23C, MOSFETs 984 and 987 are conducting, while MOSFETs 981, 986 and 988 remain off. In this phase, inductor 983 drives $V_x$ above $V_{batt}$, and conducting MOSFET 984 charges the capacitor 989 to a node potential $+V'_y$ using duty factor control. The circuit node potential $V'_y$ is identified by the mathematical notation prime "'" because this node acts as a supply or bias powering the charge pump post-converter 980B and charging flying capacitor 989 to a voltage $V_y$ only in this phase. In the opposite phase, the same circuit node is biased near ground.

Unlike capacitors 855 or 905, permanently biased at a potential $V_y$ in LCUI converter 850, converter 980 has no capacitor biased at any fixed voltage present between pre-regulator 980A and post-converter 980B. Instead, the input to the charge pump post-converter 980B is "virtual" comprising a voltage $V_y$ present only during charging of flying capacitor 989 (hence its $V'_y$ notation). This virtual or operating-phase dependent voltage is a consequence of the dual use of MOSFET 984 as both a synchronous rectifier for the boost pre-regulator 980A and as an input of the charge pump post-converter 980B.

Figure 24A:
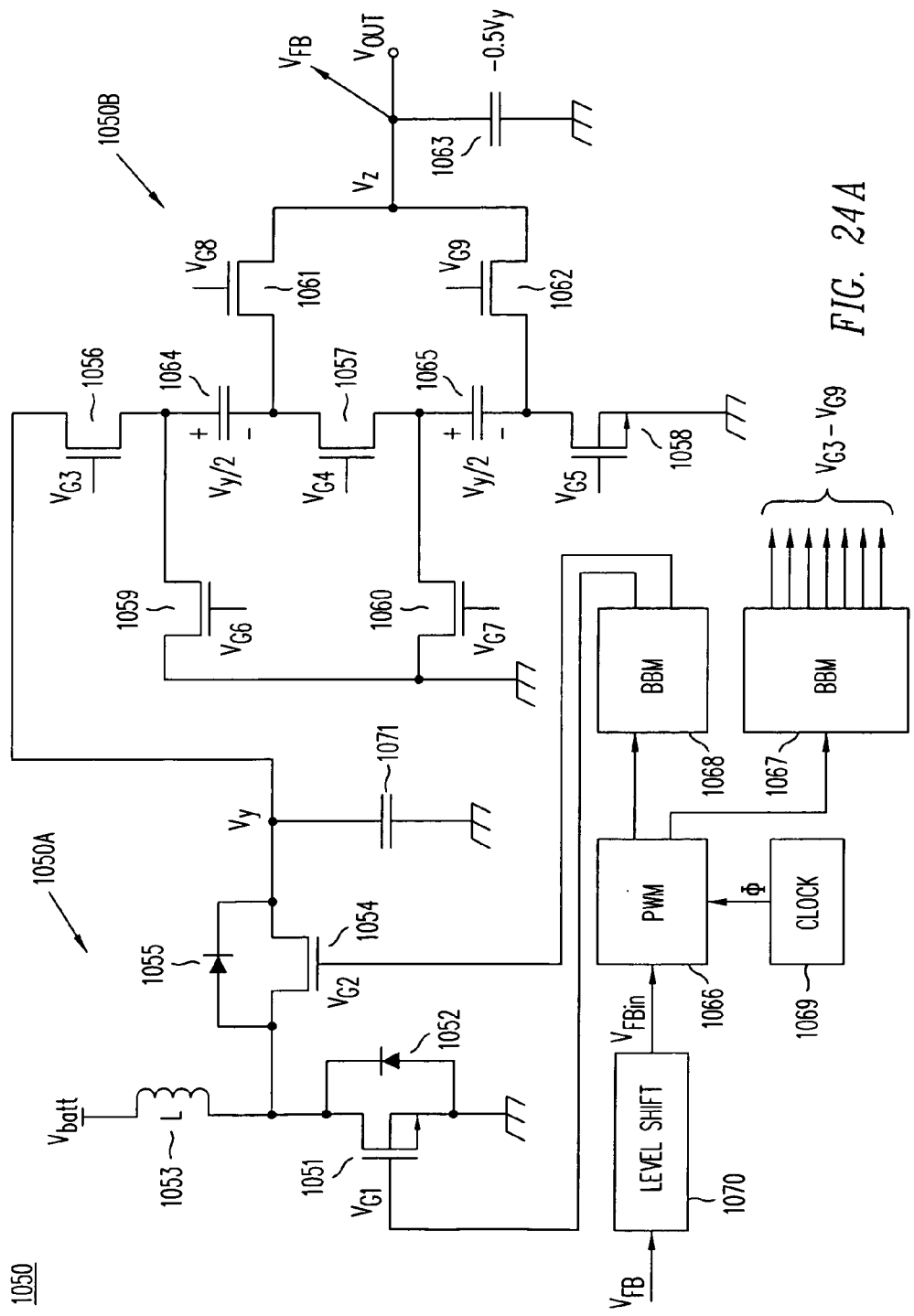
FIG. 24A is a circuit diagram of a −0.5X LCUI converter.

Inverting LCUX converters can also be implemented using fractional charge pumps. Once such version, a −0.5X LCUI converter 870 is represented functionally in the block diagram of FIG. 21B. An implementation is shown by fractional inverting converter 1050, illustrated in FIG. 24A. As shown, the −0.5X LCUI switching converter 1050 includes a low-side N-channel power MOSFET 1051, a floating synchronous rectifier MOSFET 1054 with an intrinsic P-N diode 1055, and an inductor 1053, together forming a boost-type pre-regulator 1050A, converting input voltage $V_{batt}$ to intermediate voltage $V_y$. The voltage $V_y$ across an optional filter capacitor 1071 forms the input to a −0.5X type charge pump inverting post-converter 1050B comprising power MOSFETs 1056 through 1062, together sequentially charging and discharging flying capacitors 1064 and 1065 from pre-regulator 1050A and into an output filter capacitor 1063.

The output voltage of the inverting fractional charge pump post-converter 1050B is $-0.5V_y$, where $V_y$, the output of the boost pre-regulator is $V_{batt}/(1-D)$. The resulting voltage conversion ratio of the LCUI converter 1050 is given by $$\frac{V_{out}}{V_{in}} = -\frac{0.5V_{batt}}{(1-D)} = \frac{0.5V_{batt}}{(D-1)}$$

Converter 1055 represents one implementation of a fractional LCUI converter where series-connected MOSFETs 1054 and 1056 with capacitor 1071, charged at intermediate voltage $V_y$, allow pre-regulator 1050A and post-converter 1050B to operate at different frequencies, yet still under the control of a single feedback loop.

Floating power MOSFETs 1054, 1056, 1057, 1058, 1061 and 1062 may be either N-channel or P-channel devices, with appropriate changes in the gate drive signal and gate buffer circuitry. Low-side power MOSFETs 1051, 1056, 1057, and 1058 are preferably implemented as N-channel devices. Output voltage $V_{out}$ is used as feedback signal $V_{FB}$, inverted by level-shift circuit 1070 to produce a positive voltage proportional to intermediate voltage $V_y$ as the control input to the error amplifier within PWM controller 1066. This control voltage is chosen to force the output of pre-regulator 1050A across optional or parasitic capacitor 1071 to voltage $V_y$ having a magnitude equal to twice the inverse of the output voltage.

A PWM controller 1066, synchronized to a clock and ramp generator circuit 1069, switches at a clock frequency φ and drives a break-before-make buffer 1068 at same frequency. A BBM buffer 1068 drives low-side MOSFET 1051 and synchronous rectifier MOSFET 1055 out of phase with gate biases $V_{G1}$ and $V_{G2}$ to prevent shoot-through conduction. The polarity of $V_{G2}$ for synchronous rectifier MOSFET 1055 is positive with respect to its source of if it is an N-channel device, and negative if said MOSFET is a P-channel. Being N-channel, the gate drive $V_{G1}$ of low-side MOSFET 1051 is positive with respect to its source. Synchronous rectifier MOSFET 1054 is controlled to conduct all or some portion of the time when MOSFET 1051 is off, but never to conduct significant current when MOSFET 1051 is on.

Preferably, the clock signal φ controlling PWM controller 1066 also controls BBM buffer 1067, producing gate signals $V_{G3}$ through $V_{G9}$ to control the sequencing of charge pump MOSFETs 1056 through 1062, respectively. These MOSFETs conduct in an alternating fashion, with MOSFETs 1056, 1057 and 1058 conducting while MOSFETs 1059 through 1062 are off as capacitors 1064 and 1065 are being charged, and with MOSFETs 1059 through 1062 conducting while MOSFETs 1056, 1057, and 1058 are off as capacitors 1064 and 1065 are transferring their charge onto reservoir capacitor 1063. BBM buffer 1067 prevents shoot-through conduction between MOSFET 1056 with MOSFETs 1059 and 1060, and between MOSFETs 1058 and 1062.

The MOSFETs in charge pump post-converter 1058B may be switched synchronously with the MOSFETs in pre-regulator 1058A at the frequency φ provided by clock and ramp generator circuit 1069 or some higher multiple of the clock frequency φ, i.e. m·φ, or alternatively at a frequency independent of the clock frequency φ. In a preferred embodiment, all the power MOSFETs in pre-regulator 1050A and charge pump post-converter 1050B are switched in synchronous fashion, thereby allowing filter capacitor 1071 to be made smaller. In contrast, if the charge pump post-converter 1050B oscillates independently of the switched inductor pre-regulator 1050A, capacitor 1071 is required to temporarily store energy needed to support momentary load and line transients.

Feedback using an inverting-type charge-pump post-converter 1050B requires an inverting level-shifter 1070 to adjust the below ground signal into a positive value appropriate for the control input terminal of PWM converter 1066. Since the output voltage $V_{FB}$ is equal to one-half the magnitude of the voltage $V_y$ but is opposite in polarity, level-shift circuit 1070 should invert the $-V_{FB}$ signal into $+V_{FB}$ for use as an input $V_{FBin}$ to PWM controller 1066. Thus, the feedback input voltage $V_{FBin}$ to PWM controller 1066 is defined as the voltage that will cause PWM controller 1066 to force $V_y \rightarrow -2V_{out}$, which is a positive voltage since $V_{out}$ is negative.

Figure 24B:
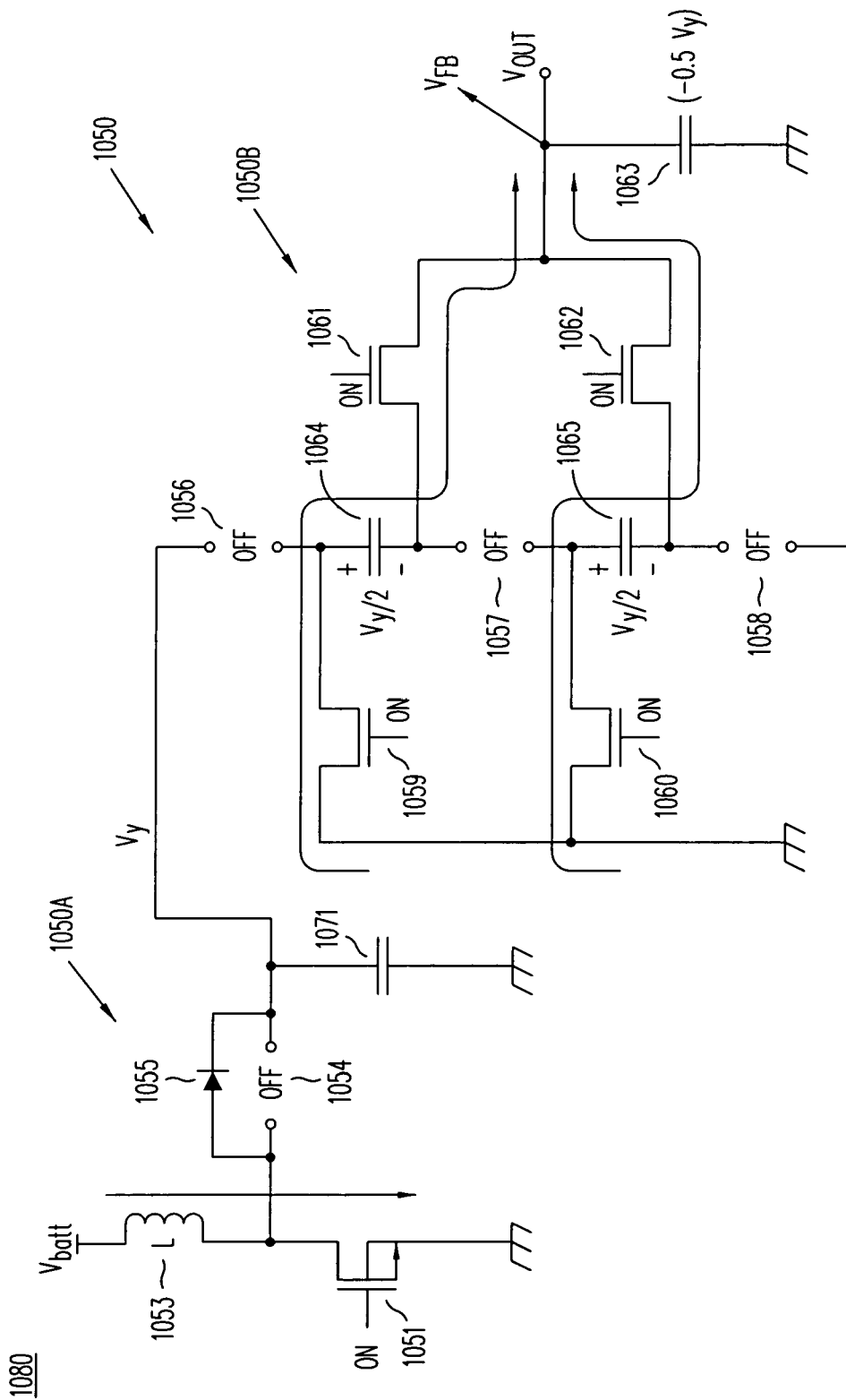
FIG. 24B is an equivalent circuit diagram of the −0.5X LCUI converter during the magnetizing and discharging stage.
Figure 24C:
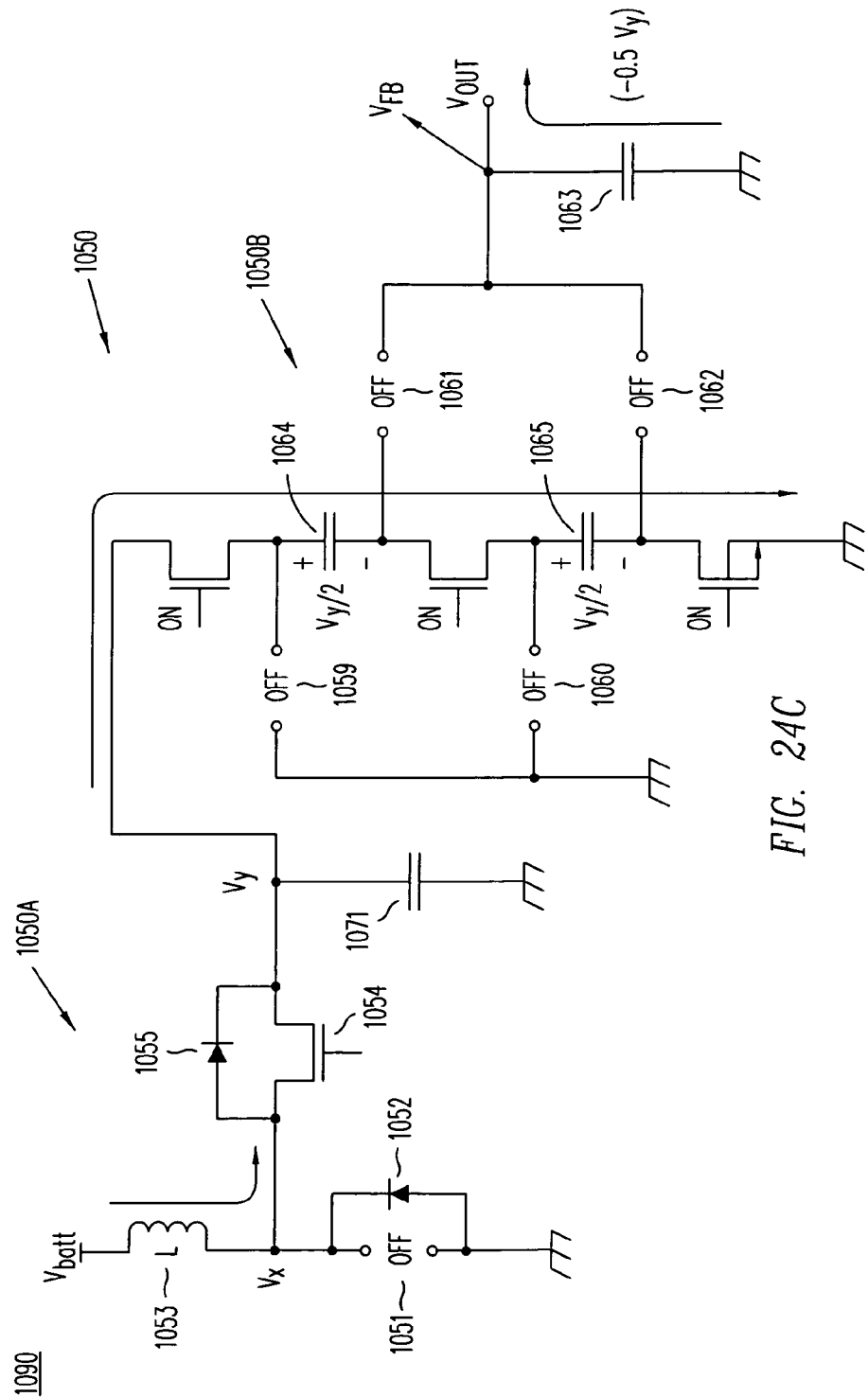
FIG. 24C is an equivalent circuit diagram of the −0.5X LCUI converter during the charging stage.

Synchronous operation of pre-regulator 1050A and post-converter 1050B in −0.5X type LCUI converter 1050 is illustrated in FIGS. 24B and 24C. In FIG. 24B, circuit diagram 1080 represents LCUI converter 1050 during the magnetizing of inductor 1053, and the simultaneous transfer of charge from flying capacitors 1064 and 1065 into reservoir capacitor 1063. During this phase, $V_x$ is near ground, and current flows from $V_{batt}$ through on-state MOSFET 1051, magnetizing inductor 1053, while synchronous rectifier MOSFET 1054 remains off, disconnecting the inductive pre-regulator 1050A from the charge-pump post converter 1050B.

Since $V_x$ is near ground and $V_y > V_{batt}$, diode 1055 remains reverse-biased and non-conducting. In a preferred embodiment, concurrent with the magnetization of inductor 1053, flying capacitors 1064 and 1065 transfer charge and supply current to reservoir capacitor 1063 and its load through conducting MOSFETs 1059, 1060, 1061, and 1062, while MOSFETs 1056, 1057, and 1058 remain off. The output $V_{out}$ is forced to a negative, i.e. below ground, potential, because the positive terminals of flying capacitors 1064 and 1065 are connected to ground and their negative terminals are connected to output capacitor 1063.

In FIG. 24C circuit diagram 1090 represents LCUI converter circuit 1050 during the recirculation of current through inductor 1053 and during the charging of flying capacitors 1064 and 1065. During this time period, inductive recirculation, i.e. de-magnetizing, current flows through forward-biased diode 1055 shunted by on-state synchronous rectifier MOSFET 1054, and through conducting MOSFETs 1056, 1057 and 1058, charging flying capacitors 1064 and 1065. Since diode 1055 is forward-biased, $V_x$ is approximately equal to $V_y$, the voltage present across capacitor 1071. Capacitors 1064 and 1065 each charge to a voltage substantially equal to $V_y/2$. Since MOSFETs 1061 and 1062 remain off in this phase, reservoir capacitor 1062, biased at the voltage $-V_y/2$, must supply current to the load during this interval.

Figure 25A:
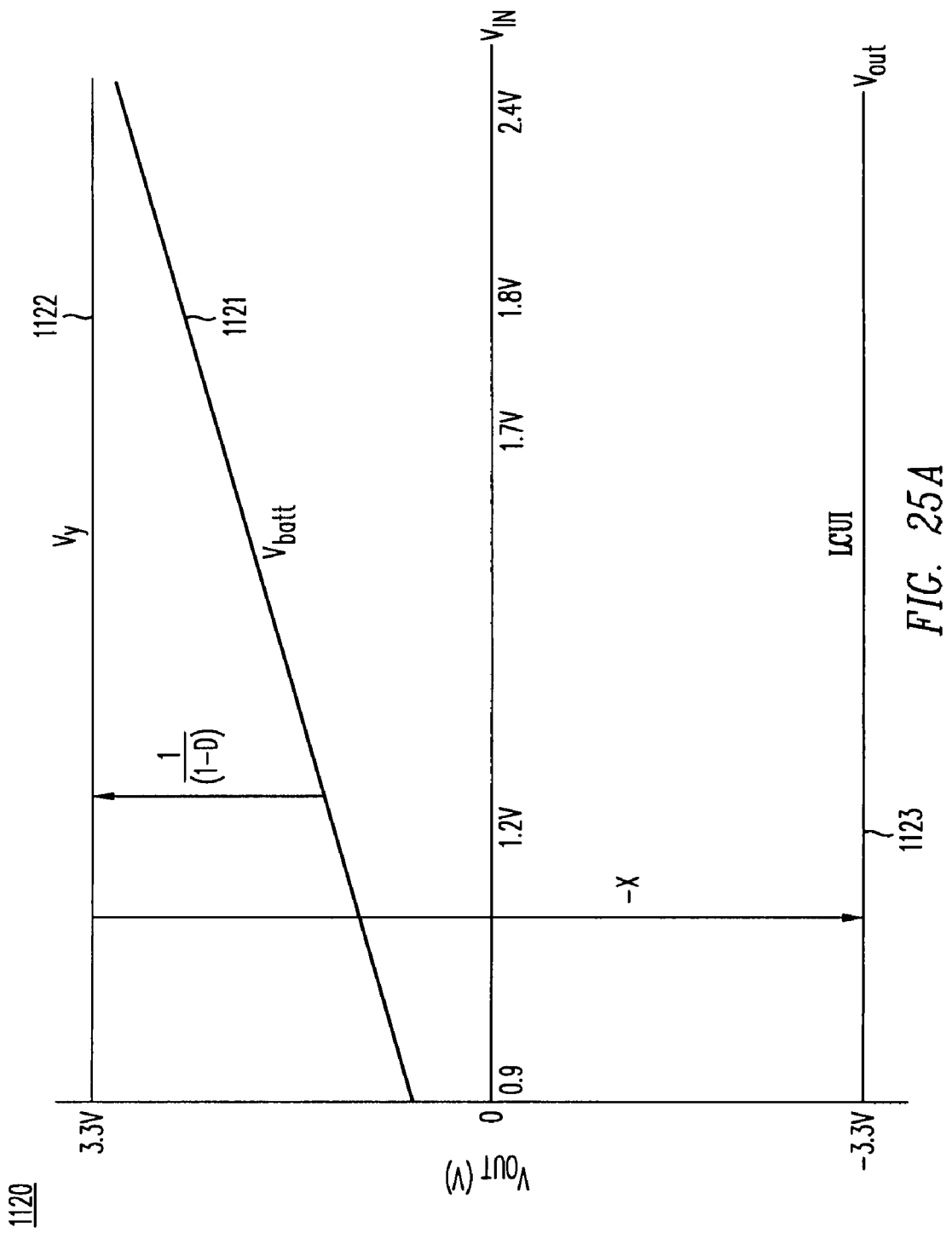
FIG. 25A is a graph showing $V_y$ and $V_{out}$ as a function of $V_{in}$ for a −1X LCUI converter for the input voltage ranges provided by 1-cell and 2-cell NiMH and 1-cell alkaline batteries.

Graph 1120 of FIG. 25A illustrates the input-to-output transfer characteristics of a −1X LCUI 3.3V converter where input voltage $V_{batt}$, shown by curve 1121, ranging from 1s to 2s NiMH battery voltages, is stepped up by a factor 1/(1−D) to a constant and intermediate voltage $V_y$ (curve 1122) and then inverted by −1X to produce a well regulated −3.3V output (curve 1123).

Figure 25B:
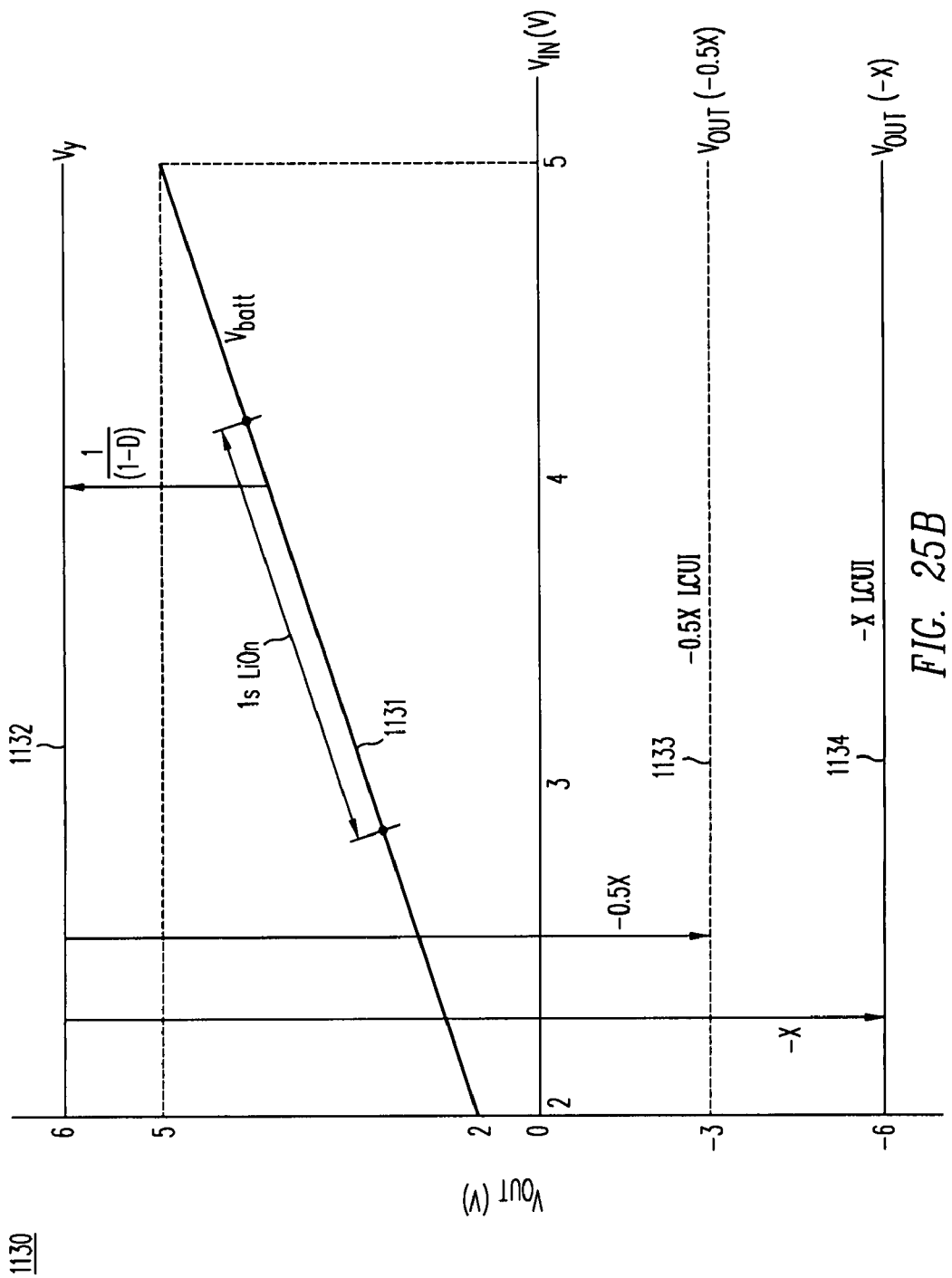
FIG. 25B is a graph showing $V_y$ and $V_{out}$ as a function of $V_{in}$ for a −0.5X and a −1X LCUI converter for the input voltage range provided by a 1-cell LiIon battery.

For the transfer characteristics over a higher voltage range from 2V to 5V, including 1s LiIon batteries, graph 1130 in FIG. 25B illustrates battery or other input $V_{batt}$ (curve 1131) is up-converted by a factor 1/(1−D) to a 6V regulated voltage (curve 1132) and then inverted using a −1X charge pump to produce a −6V regulated output (curve 1134) or using a −0.5X charge pump to produce a −3V regulated output (curve 1133).

Figure 25C:
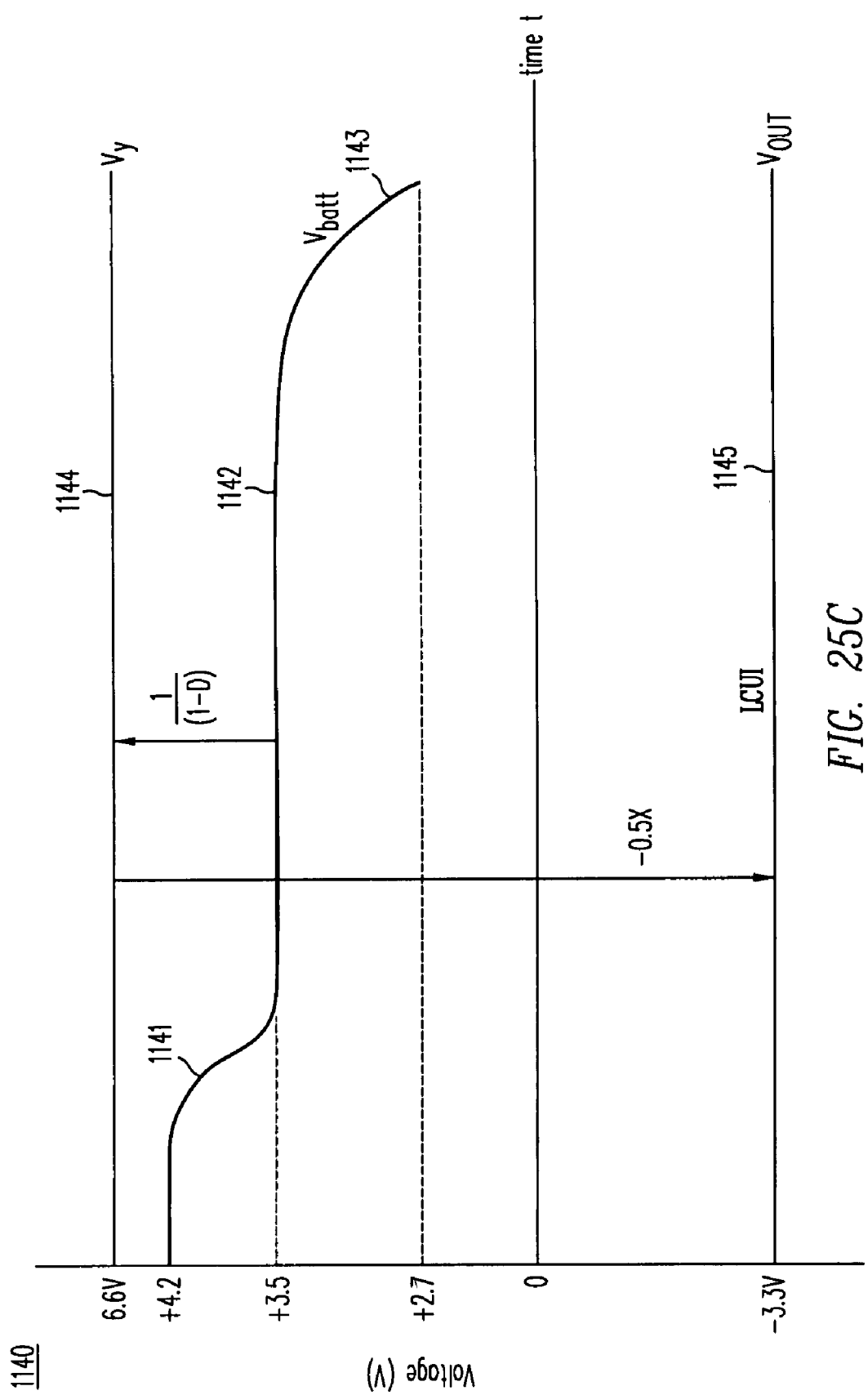
FIG. 25C is a graph showing the operation of a −0.5X LCUU converter with a 1-cell LiIon battery as a function of time.

In graph 1140 of FIG. 25C, a 1s LiIon battery discharges from 4.2V to 3.5V in interval 1141, then sustains 3.5V in interval 1142 until it finally discharges rapidly down to 2.7V during interval 1143. The battery voltage is boosted by a varying factor 1/(1−D) to produce a regulated 6.6 V intermediate voltage $V_y$, shown by curve 1144, then inverted by a −0.5X charge pump to produce a regulated time invariant −3.3V output (curve 1145).

Figure 25D:
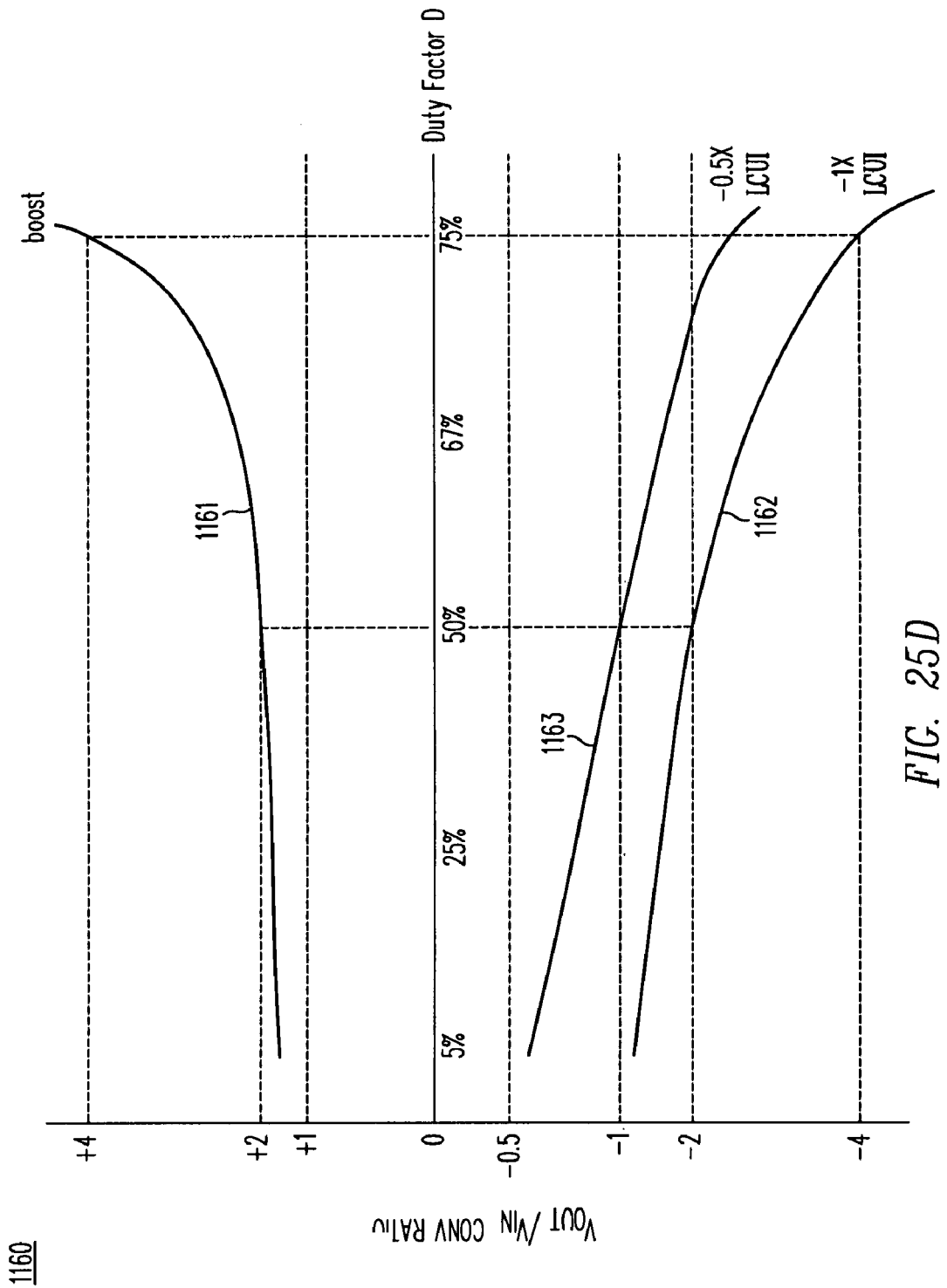
FIG. 25D is a graph of the voltage conversion ratio as a function of the duty factor of the pre-regulator in −1X and −0.5X LCUI converters.

The relationship between the duty factor D and the voltage conversion ratio $V_{out}/V_{in}$ of various LCUI converters is illustrated in graph 1160 of FIG. 25D. Included are a −1X LCUI converter (curve 1162) and a −0.5X LCUI converter (curve 1163). These transfer characteristics are contrasted with the positive polarity of $V_y/V_{in}$ (curve 1161). Specifically, the transfer characteristic of the −1X-type LCUI converter is a mirror image of the $V_y/V_{in}$ as a function of the duty factor D. Specifically, when D=50%, the −1X LCUI converter produces an output voltage $V_{out}=-2V_{in}$. A low duty factors, the transfer characteristic approaches unity.

The fractional LCDI converter is described by curve 1163, where n=−0.5. At a 50% duty factor the −0.5X LCDI conversion ratio is given by −0.5/(1−D)=−0.5/(0.5) so that $V_{out}=-V_{in}$. Compared to the −1X type LCUI converter where $V_{out}=-2V_{in}$ at a 50% duty factor, the −0.5X-type LCUI regulator supplies a smaller negative output voltage at the same duty factor.

At high frequencies where operation near 50% duty factor is preferable to avoid narrow pulses, the −0.5X-type LCUI regulator is preferable over the −1X inverter type when delivering smaller negative output voltages.

Table 4 contrasts the D=50% preferred conversion ratio for the −1X LCUI and −0.5X LCUI converters and illustrates the duty factor range needed to output several negative output voltages from a LiIon battery.

TABLE 4

| Condition<br>D = 50% | −0.5 × LCUI<br>$V_{out}/V_{in}$ = −1.0 | −1 × LCUI<br>$V_{out}/V_{in}$ = −2.0 | Boost (Positive)<br>$V_{out}/V_{in}$ = 2.0 |
| --- | --- | --- | --- |
| LiIon → −12.0 V | 83% < D < 88% | 65% < D < 75% | 65% < D < 75% |
| LiIon → −5.0 V | 58% < D < 70% | 16% < D < 40% | 16% < D < 40% |
| LiIon → −3.6 V | 41% < D < 58% | NA | NA |
| LiIon → −3.0 V | 30% < D < 50% | NA | NA |

Those conditions marked with N/A require both step-up and step-down inversion.

Summary of LCUX Switching Regulator Topologies

FIGS. 26A-26J summarize the various LCUX converter topologies during both the capacitor charging phase and during the subsequent transfer phase where the charge pump's flying capacitor transfers its charge to the output capacitor.

Figure 26B:
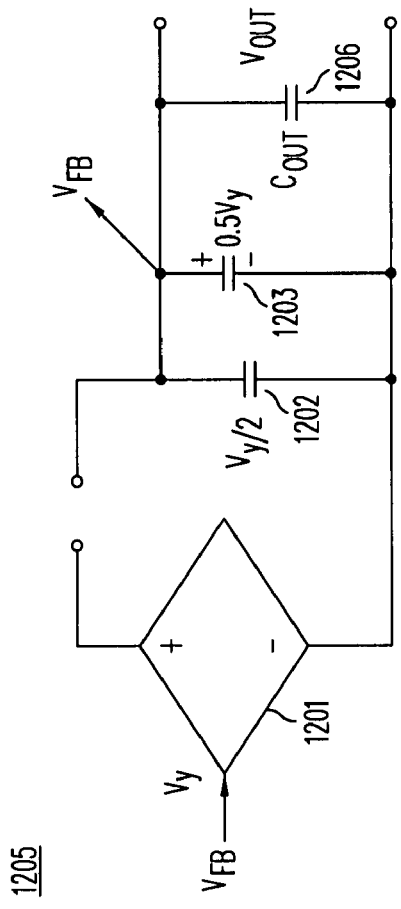
FIG. 26B is a functional representation of a 0.5X LCUD converter during the discharging stage.
Figure 26D:
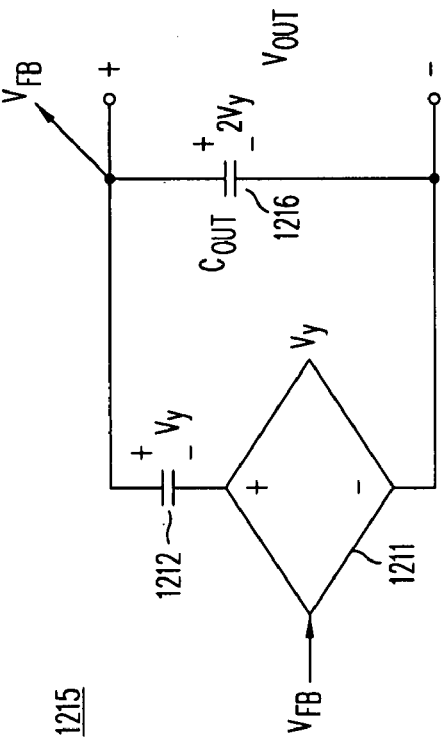
FIG. 26D is a functional representation of a 2X LCUU converter during the discharging stage.
Figure 26A:
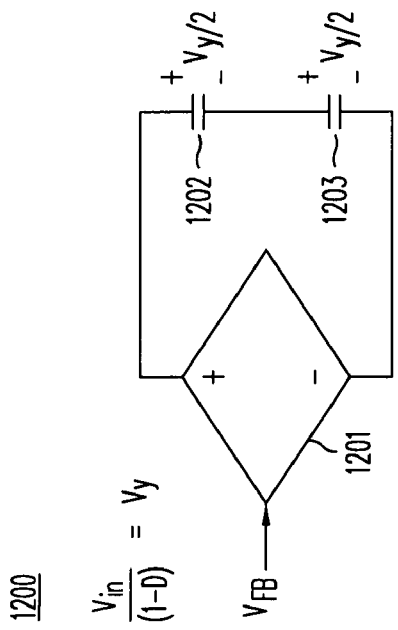
FIG. 26A is a functional representation of a 0.5X LCUD converter during the charging stage.

In FIG. 26A circuit diagram 1200 shows a fractional 0.5X-type LCUD converter comprising a controlled voltage source 1201 representing an inductive pre-regulator having a voltage $V_y=V_{in}/(1-D)$ where the pre-regulator charges two series-connected flying capacitors 1202 and 1203 to a voltage $V_y/2$ or $0.5V_{in}/(1-D)$. Circuit diagram 1205 of FIG. 26B represents the equivalent circuit of the same LCUD converter during charge transfer where flying capacitors 1202 and 1203 charge reservoir capacitor 1206 to a voltage $V_y/2$ or $0.5V_{batt}/$ (1−D). Because the flying capacitors are referenced to ground during charge transfer, the pre-regulator is disconnected from the charge pump. As a result, controlled voltage source 1201 does not deliver energy to the load or to the charge-pump post converter during the second phase of operation. Alternating between these two phases, a well regulated output with $V_{out}/V_{in}$ conversion ratios above and below unity is realized, functionally representative of operation of the LCUD converter 250 shown in FIG. 10A.

Figure 26C:
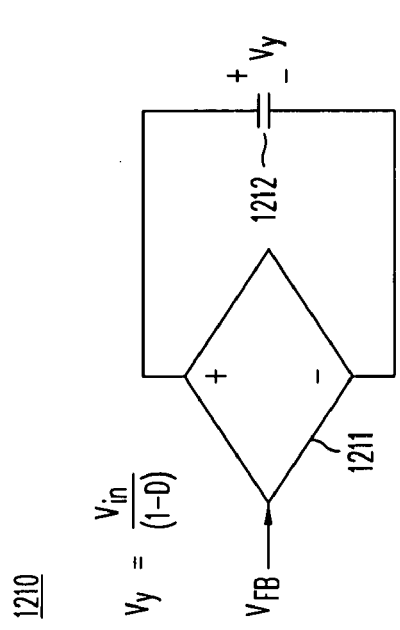
FIG. 26C is a functional representation of a 2X LCUU converter during the charging stage.

In FIG. 26C circuit diagram 1210 shows a 2X-type LCUU regulator comprising a controlled voltage source 1211 representing an inductive pre-regulator having a voltage $V_y=V_{in}/(1-D)$ where the pre-regulator charges a single flying capacitor 1212 to a voltage $V_y$ or $V_{in}/(1-D)$. Circuit diagram 1215 of FIG. 26D represents the equivalent circuit of the same LCUU converter during charge transfer where flying capacitor 1212 sits atop, i.e. has its negative terminal connected to the positive terminal of the boost pre-regulator, so that the voltage on the flying capacitor adds to the boost voltage, doubling the boost voltage. The series combination of voltage source 1211 and flying capacitor therefore charges reservoir capacitor 1216 to a voltage $2V_y$ or $2V_{batt}/(1-D)$. Controlled voltage source 1211 participates in delivering energy to the load or the charge pump post converter during the second phase of operation. Alternating between these two charging and transfer phases, a well regulated output with $V_{out}/V_{in}$ capable of high conversion ratios is realized, functionally representative of operation of the 2X-type LCUU converter 650 shown in FIG. 17A.

In FIG. 26E circuit diagram 1220 shows a fractional 1.5X-type LCUU regulator comprising a controlled voltage source 1221 representing an inductive pre-regulator having a voltage $V_y=V_{in}/(1-D)$ where the pre-regulator charges two series-connected flying capacitors 1222 and 1223 to a voltage $V_y/2$ or $0.5V_{in}/(1-D)$. Circuit diagram 1225 of FIG. 26F represents the equivalent circuit of the same 1.5X-type LCUU converter during charge transfer where flying capacitors 1222 and 1223 are connected in parallel and momentarily stacked atop voltage source 1221, thereby charging reservoir capacitor 1226 to a voltage $1.5V_y$ or $1.5V_{batt}/(1-D)$. Controlled voltage source 1201 participates in delivering energy to the load or the charge pump post converter during the second phase of operation. Alternating between these two phases, a well regulated output with high conversion ratios is realized, functionally representative of operation of the 1.5X LCUU converter 760 shown in FIG. 19A.

In FIG. 26G circuit diagram 1230 shows a −1X-type LCUI inverting regulator comprising a controlled voltage source 1231 representing an inductive pre-regulator having a voltage $V_y=V_{in}/(1-D)$ where the pre-regulator charges series-connected flying capacitor 1232 to a voltage $V_y$ or $V_{in}/(1-D)$. Circuit diagram 1235 of FIG. 26H represents the equivalent circuit of the same LCUI inverting converter during charge transfer where flying capacitor 1232 is connected to the negative terminal of voltage source 1231, i.e. to ground, and therefore charges reservoir capacitor 1236 to a voltage $-V_y$ or $-V_{batt}/(1-D)$. Controlled voltage source 1231 does not deliver energy to the load or the charge pump post converter during the second phase of operation since flying capacitor 1232 is ground referenced. Alternating between these two phases, a well regulated inverting output with $V_{out}/V_{in}$ conversion is realized, functionally representative of operation of the LCUD converter 850 shown in FIG. 22A.

In FIG. 26I circuit diagram 1240 shows a fractional −0.5X-type LCUI inverting regulator comprising a controlled voltage source 1241 representing an inductive pre-regulator having a voltage $V_y=V_{in}/(1-D)$ where the pre-regulator charges two series-connected flying capacitors 1242 and 1243 to a voltage $V_y/2$ or $0.5V_{in}/(1-D)$. Circuit diagram 1245 of FIG. 26J represents the equivalent circuit of the same −0.5X-type LCUI inverting converter during charge transfer where flying capacitors 1242 and 1243 are connected in parallel with their positive terminals tied to ground thereby charging reservoir capacitor 1246 to a voltage $-0.5V_y$ or $-0.5V_{batt}/(1-D)$. Controlled voltage source 1241 does not participate in delivering energy to the load or the charge pump post converter during the second phase of operation since the flying capacitors are ground referenced. Alternating between these two phases, a well regulated output with $V_{out}/V_{in}$ conversion ratios below ground is realized, functionally representative of operation of the −0.5X-type LCUI 1050 shown in FIG. 24A.

Feedback Implementation

In the LCUX converters described herein, operating near peak efficiency requires the output of the pre-regulator to be biased at a voltage $V_y$ near $V_{out}/n$ where "n" is the nX multiplier of the charge pump post-converter. While this condition could be met in an open-loop circuit, superior line and load regulation requires the converter to react to changes in the operating conditions dynamically and rapidly, i.e. in real time. Feedback of the converter's output voltage using closed loop control is commonly used in voltage regulators to achieve accurate regulating performance.

Specifically, in the LCUX family of regulators shown, the switched-inductor pre-regulator provides the regulation feature while the charge pump post-converter scales this output for up-down conversion, pulse widths nearer a 50% duty factor, or inversion. Because the voltage range of the output is scaled up, down, or inverted into a different voltage range than the $V_y$ output of the pre-regulator, any feedback signal $V_{FB}$ coming from the converter's $V_{out}$ must be adjusted, i.e. level shifted, before it can be fed into the input terminal of the PWM controller. Alternatively, the output voltage of the pre-regulator $V_y$ can be used as the feedback signal to force the voltage at the output terminal of the pre-regulator to a particular value needed to produce the required output voltage $V_{out}$ at the maximum converter efficiency.

As shown previously in FIG. 9, regardless of the feedback method, the feedback should drive $V_y$ to a voltage such that error voltage $\Delta V=V_{out}-V_z$ is small so that the condition $$V_{out} \approx V_z = nV_y = n \cdot V_{in}/(1-D)$$

is maintained. Several methods exist to dynamically adjust the duty factor D of the pre-converter's PWM controller, including deriving feedback from $V_{out}$, $V_y$ or some combination thereof. The examples shown here are exemplary but not intended to be limiting as to the various methods to achieve closed loop control of LCUX regulators.

Figure 27A:
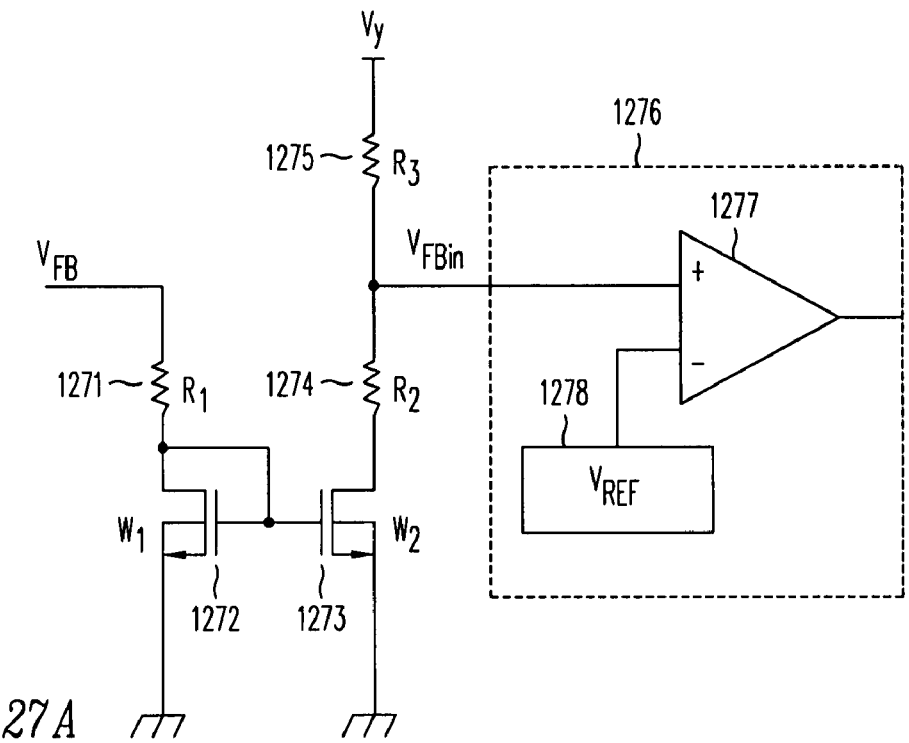
FIG. 27A is a circuit diagram of a feedback level-shift circuit including a current mirror.

As shown in feedback circuit 1270 in FIG. 27A, the PWM controller 1276 includes an error amplifier 1277 implemented as a differential-input operational amplifier, with its inverting input connected to $V_{FBin}$ and its non-inverting input tied to a reference voltage 1278. Whenever $V_{FBin}$ is less than $V_{ref}$, the converter reacts by increasing pulse-width and switch on-time, increasing average inductor current, and driving $V_{out}$ to a higher voltage. Conversely, whenever the $V_{FBin}$ input is greater than $V_{ref}$, the converter reacts by decreasing pulse-width and shortening switch on-time, reducing average inductor current, and driving $V_{out}$ to a lower voltage.

While the actual value of $V_{ref}$ is often determined by a band-gap voltage reference circuit operating at 1.2V, the reference voltage may in some implementations be scaled to the desired output voltage of the pre-regulator, i.e. $V_y$. In practice, either the input $V_{FBin}$ can be divided down to the value of $V_{ref}$, or conversely $V_{ref}$ can be multiplied up to match the $V_y=V_{FBin}$ value. Both cases are considered in the following discussion.

A level-shift circuit 1270 for non inverting LCUX converters is illustrated in FIG. 27A where the feedback voltage $V_{FB}$ is first converted to a current by resistor 1271 and series connected N-channel MOSFET 1272 having a voltage drop of approximately $V_{tn}$ so that the current in MOSFET 1272 with a gate of width $W_1$ is roughly given by $$I_1 = \frac{V_{FB} - V_{tn}}{R_1}$$

The current is then mirrored by MOSFET 1273, having the same gate-to-source bias $V_{GSn}$ as MOSFET 1272, resulting in a current $I_2$ of magnitude $$I_2 = I_1 \frac{W_2}{W_1} = \frac{V_{FB} - V_{tn}}{R_1} \cdot \frac{W_2}{W_1}$$

where $I_2$ is a current dependent on the respective gate widths $W_1$ and $W_2$ of MOSFETs 1272 and 1273, and substantially independent of the value of resistors 1274 and 1275.

The output of the level-shift circuit 1270 $V_{FBin}$, is then determined by the value of resistance $R_3$ of resistor 1275, so that $$V_{FBin} = V_y - I_2 \cdot R_3 = V_y - R_3 \left( \frac{V_{FB} - V_{tn}}{R_1} \cdot \frac{W_2}{W_1} \right)$$

The level shift output $V_{FBin}$ is input to error amplifier 1277 and compared to reference voltage $V_{ref}$ within PWM controller 1276 to drive the output $V_y$ of the boost pre-regulator to a voltage $V_{out}/n$. In a 0.5X LCDU regulator, for example, the optimum efficiency occurs when $V_{out}=0.5V_y$. Therefore, the feedback network drives the pre-regulator output voltage to a value $V_y \rightarrow V_{out}/0.5$ or $2V_{out}$.

Figure 27B:
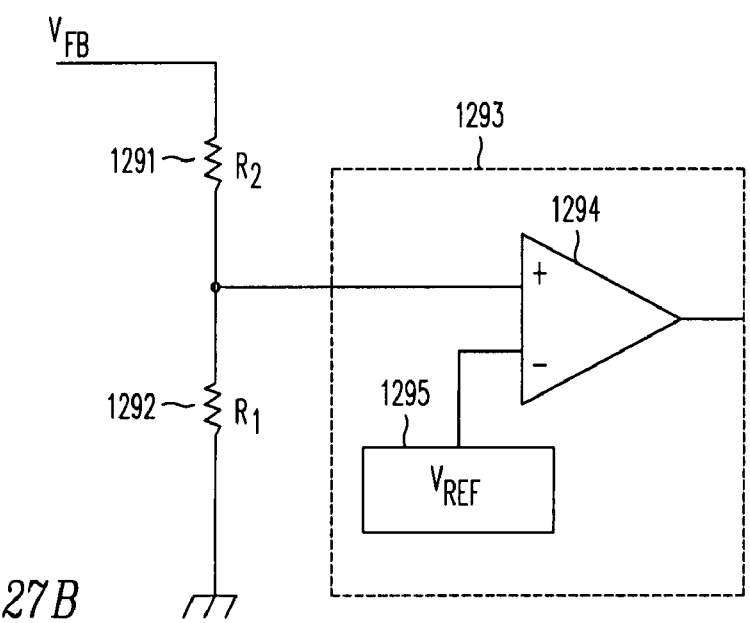
FIG. 27B is a circuit diagram of a feedback level-shift circuit including a resistive voltage divider.

Another level-shift circuit 1290 suitable for non-inverting LCUX converters is illustrated in FIG. 27B. Level-shift circuit 1290 comprises a voltage divider comprising two resistors 1291 and 1292 of values $R_2$ and $R_1$, respectively. Accordingly, $$V_{FBin} = V_{FB} \left( \frac{R_1}{R_1 + R_2} \right) = +nV_y \left( \frac{R_1}{R_1 + R_2} \right)$$

So long that $V_{out} > V_y$, i.e. the converter is an LCUU converter, then the feedback network can input to PWM controller 1293 a voltage $V_{FBin}=V_y=V_{out}/n$. That condition occurs when $R_1/(R_1+R_2)$ is equal to $1/n$. For example, since $n=2$ in a 2X LCUU regulator, the ratio $R_1/(R_1+R_2)$ should be set to ½ by making the two resistors equal, i.e. $R_1=R_2$. If the desired output voltage occurs when the feedback voltage is equal to the band-gap reference voltage $V_{ref}$, the resistor ratio must be adjusted so that $$\frac{V_{ref}}{V_{out}} = \left( \frac{n \cdot R_1}{R_1 + R_2} \right) \approx \frac{1.2V}{V_{out}}$$

In contrast, in an LCUD converter $V_y > V_{out}$, so a voltage divider cannot be used except to produce a value of feedback equal to the band-gap reference $V_{ref}$.

Figure 27C:
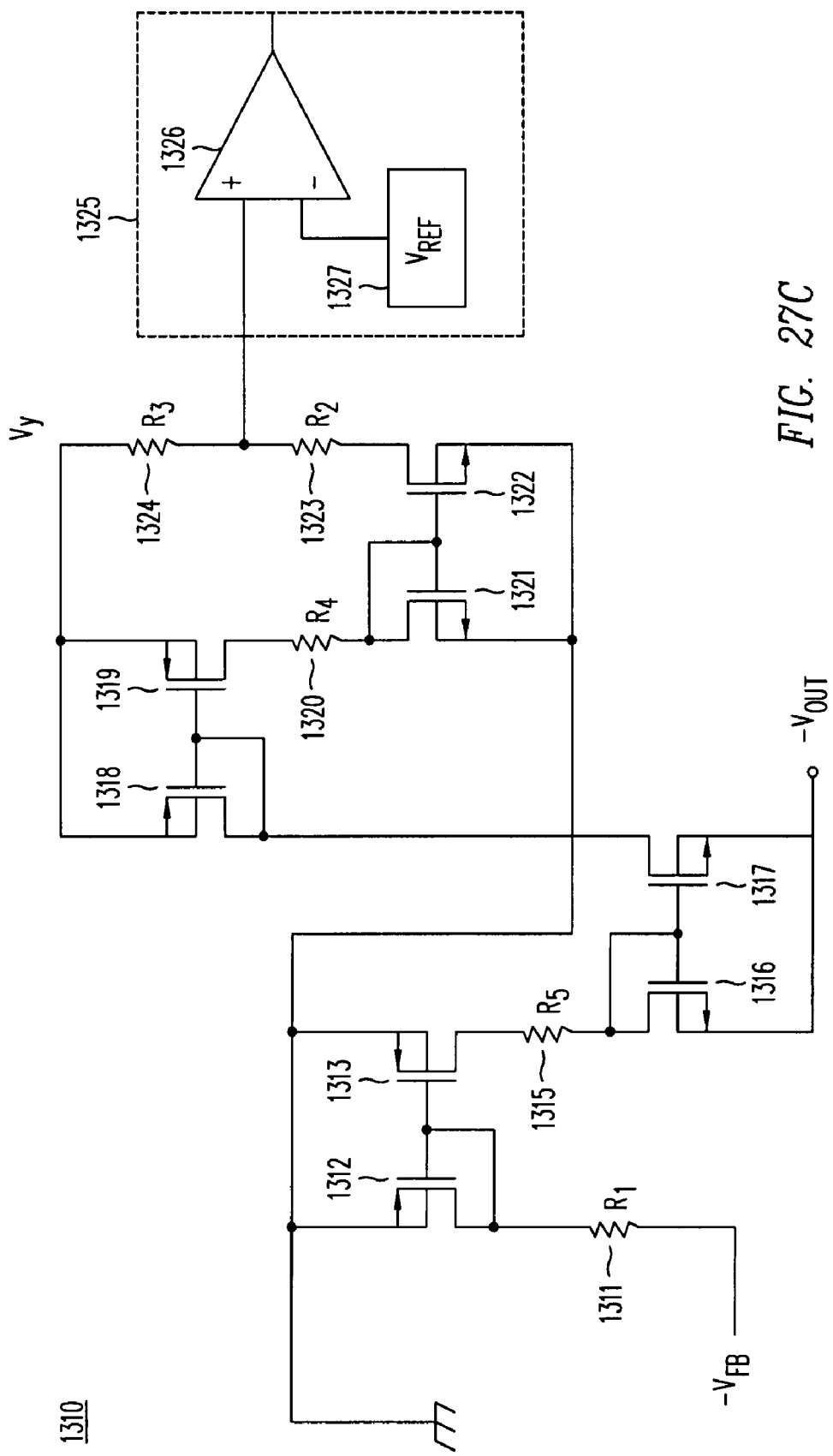
FIG. 27C is a circuit diagram of a feedback level-shift circuit including an inverting current mirror.

In another embodiment of this invention, level-shift circuit 1310 of FIG. 27C is suitable for use with an inverting LCUI converter. Level-shift circuit 1310 produces a positive feedback signal $+V_{FBin}$ to an error amplifier 1326 within PWM controller 1325 from a negative feedback signal $-V_{FB}$. The circuit operates by referring its input to the negative supply rail $-V_{out}$, then level shifting the signal to the positive rail $V_y$, then back down to produce $V_{FBin}$.

As shown, resistor $R_1$ sets the current in P-channel MOSFET 1312 based on negative input voltage $-V_{FB}$. MOSFET 1312 forms a current mirror with ground-referenced MOSFET 1313, the current further which supplies current to a $-V_{out}$ referenced current mirror comprising N-channel MOSFETs 1316 and 1317. The current in N-channel MOSFET 1317 is further mirrored to $+V_y$ referenced P-channel MOSFETs 1318 and 1319, and again to ground referenced current mirror comprising N-channel MOSFETs 1321 and 1322. The current in MOSFET 1322 creates a voltage across resistor 1324 to create the $V_{FBin}$ output of the level-shift circuit connected to PWM controller 1325.

Figure 27D:
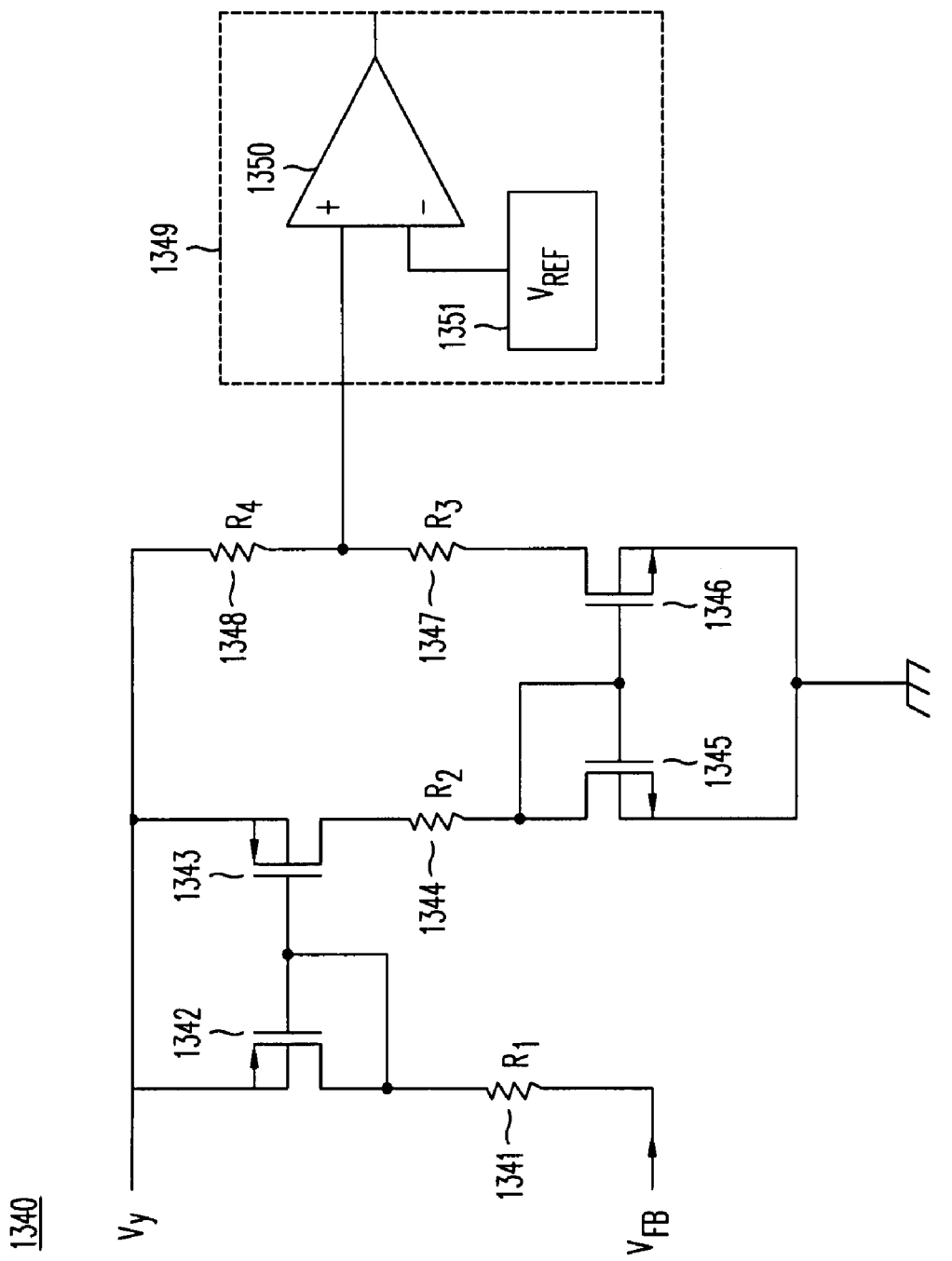
FIG. 27D is a circuit diagram of an alternative embodiment of a feedback level-shift circuit including an inverting current mirror.

In level-shift circuit 1340 of FIG. 27D, a positive feedback signal $+V_{FB}$ sets a current in P-channel MOSFET 1342 via resistor 1341, which is mirrored by MOSFET 1343 referenced to voltage $V_y$. This current mirror supplies current to ground referenced N-channel mirror MOSFETs 1345 and 1346 and dropped across resistor 1348 to finally form the level-shifted output $V_{FBin}$, the input to PWM controller 1349. Circuit 1340 functions only when $V_{out} < V_y$.

Powering Boost Pre-regulator Circuitry

Referring again to FIG. 8, multiplexer 215 selects the highest available voltage to power PWM control circuit 211, BBM gate buffer 212, and possibly charge pump 207. A higher voltage is desirable for minimizing on-resistance of power MOSFETs 201 and 204 and the MOSFETs inside charge pump 207.

Figure 28A:
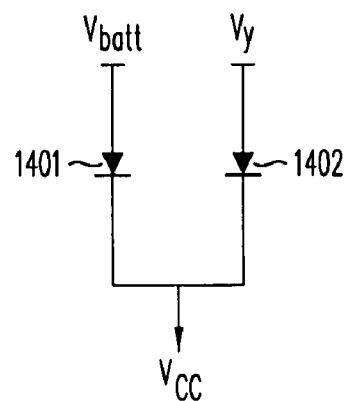
FIG. 28A is a circuit diagram of a voltage selector circuit including a diode "OR."

The simplest power multiplexer is illustrated in FIG. 28A, where P-N diodes 1401 and 1402 form a power diode "OR" function, connecting the higher voltage of $V_{batt}$ and $V_y$ to provide the input voltage $V_{cc}$ to the control circuits. Only the diode connected to the higher voltage between $V_{batt}$ and $V_y$ will become forward-biased. The other diode will remain reverse-biased and will block current.

Figure 28B:
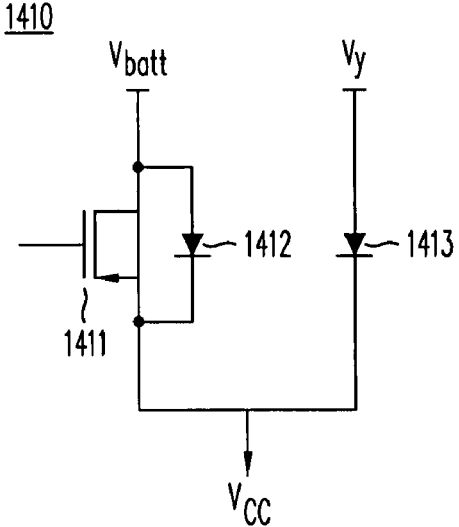
FIG. 28B is a circuit diagram of a voltage selector circuit including a diode and a MOSFET.

Circuit 1410 in FIG. 28B is a modification of the power diode OR function, with diodes 1412 and 1413, where MOSFET 1412 may be turned on to shunt diode 1411, especially during startup before the boost pre-regulator is switching. MOSFET 1411 may be an P-channel or N-channel MOSFET.

Figure 28C:
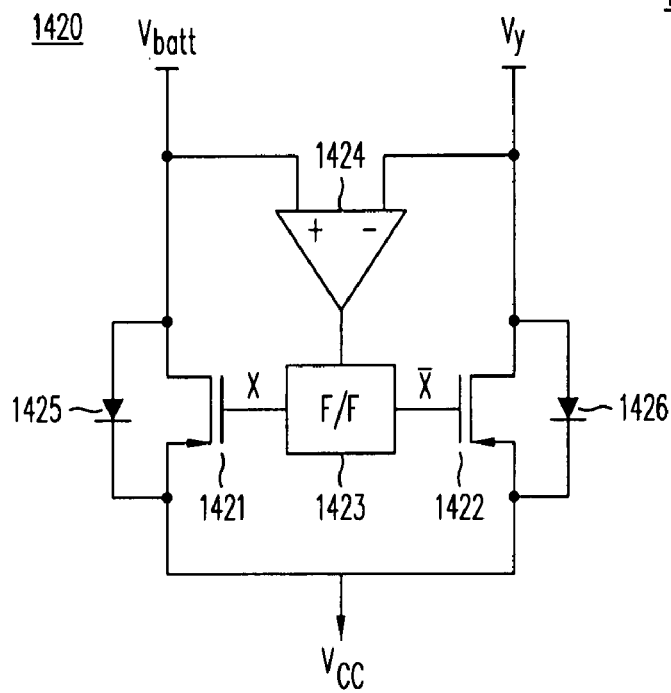
FIG. 28C is a circuit diagram of a voltage selector circuit including a MOSFET "OR."
Figure 28D:
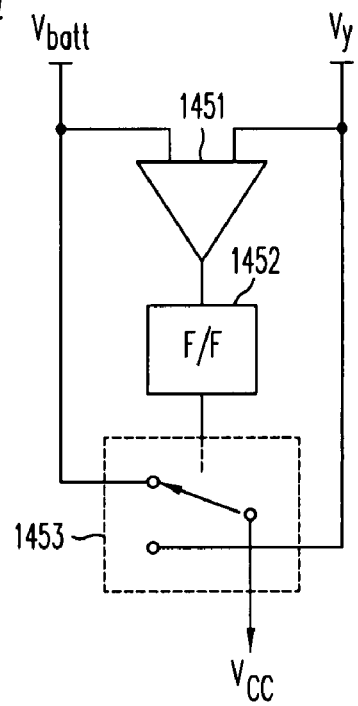
FIG. 28D is a circuit diagram of a voltage selector circuit including an SPDT selector.

In FIG. 28C, circuit 1420 uses two MOSFETs 1421 and 1422 to shunt diodes 1421 and 1426 respectively. A comparator 1424 is connected to the input voltages $B_{batt}$ and $V_y$, and instructs a flip flop circuit 1433 to turn on either MOSFET 1421 or 1422, depending on which input voltage is higher. FIG. 28D shows a similar circuit 1450 where a comparator 1451 powers a flip flop 1452 and an analog switch 1453.

While specific embodiments have been described herein, it will be understood that these embodiments are illustratively only, and not limiting. Many alternative embodiments in accordance with the broad principles of this invention will be apparent persons of skill in the art.

I claim:

1. A DC/DC voltage converter comprising:
    a step-up pre-regulator comprising a switched inductive circuit; and a post-converter comprising a charge pump, the post-converter being structured to provide a DC output voltage, wherein an output terminal of the pre-regulator is coupled to an input terminal of the post-converter, an input terminal of the DC/DC voltage converter comprising an input terminal of the pre-regulator, an output terminal of the DC/DC voltage converter comprising an output terminal of the post-converter.

2. The DC/DC voltage converter of claim 1 further comprising a feedback path, a first terminal of the feedback path being coupled to the pre-regulator.

3. The DC/DC voltage converter of claim 2 wherein a second terminal of the feedback path is coupled to the output terminal of the post-converter.

4. The DC/DC voltage converter of claim 1 wherein the charge pump is adapted to multiply a voltage at an input terminal of the charge pump by a factor of 0.5.

5. The DC/DC voltage converter of claim 1 wherein the pre-regulator comprises an inductor connected in a series path with a low-side switch and a floating switch connected to a point in the series path between the inductor and the low-side switch.

6. The DC/DC voltage converter of claim 5 wherein the floating switch comprises a floating MOSFET and the low-side switch comprises a low-side MOSFET.

7. The DC/DC voltage converter of claim 6 wherein the pre-regulator comprises a break-before-make unit coupled to a gate of the floating MOSFET and a gate of the low-side MOSFET.

8. The DC/DC voltage converter of claim 7 wherein the pre-regulator comprises a pulse width modulation unit coupled to the break-before-make unit.

9. The DC/DC voltage converter of claim 1 wherein the charge pump is adapted to multiply a voltage at an input terminal of the charge pump by a factor of 1.5.

10. The DC/DC voltage converter of claim 1 wherein the charge pump is structured to multiply a voltage at an input terminal of the charge pump by an integral value.

11. The DC/DC voltage converter of claim 10 wherein the charge pump is adapted to multiply a voltage at the input terminal of the charge pump by a factor of 2.

12. The DC/DC voltage converter of claim 1 wherein the post-converter comprises a voltage polarity inverter.

13. The DC/DC voltage converter of claim 12 wherein the charge pump is adapted to a voltage at the input terminal of the charge pump by a factor of −0.5.

14. The DC/DC voltage converter of claim 12 wherein the charge pump is adapted to multiply a voltage at an input of the charge pump by a negative integral value.

15. The DC/DC voltage converter of claim 14 wherein the charge pump is adapted to a voltage at the input terminal of the charge pump by a factor of −1.

16. A method of converting a first DC voltage to a second DC voltage comprising:
providing at least one inductor and at least one capacitor;
during a first time interval coupling a first terminal of the at least one inductor to the first DC voltage;
during a second time interval allowing the first terminal of the at least one inductor to float, thereby producing an intermediate voltage at the first terminal of the at least one inductor;
during a third time interval coupling a first terminal of the at least one capacitor to the intermediate voltage and coupling a second terminal of the at least one capacitor to a third voltage; and
during a fourth time interval coupling the second terminal of the at least one capacitor to a fourth voltage and coupling the first terminal of the at least one capacitor to an output terminal, thereby providing the second DC voltage at the output terminal.

17. A method of converting a first DC voltage to a second DC voltage comprising:
providing at least one inductor and at least one capacitor;
during a first time interval coupling a first terminal of the at least one inductor to the first DC voltage;
during a second time interval allowing the first terminal of the at least one inductor to float, thereby producing an intermediate voltage at the first terminal of the at least one inductor;
during a third time interval coupling a first terminal of the at least one capacitor to the intermediate voltage and coupling a second terminal of the at least one capacitor to a third voltage; and
during a fourth time interval coupling the first terminal of the at least one capacitor to ground and coupling the second terminal of the at least one capacitor to an output terminal, thereby providing the second DC voltage at the output terminal.

18. A method of converting a first DC voltage to a second DC voltage comprising:
providing at least one inductor and at least one capacitor;
during a first time interval coupling a first terminal of the at least one inductor to the first DC voltage;
during a second time interval allowing the first terminal of the at least one inductor to float, thereby producing an intermediate voltage at the first terminal of the at least one inductor;
during a third time interval coupling a first terminal of the at least one capacitor to the intermediate voltage and coupling a second terminal of the at least one capacitor to a third voltage; and
during a fourth time interval coupling the second terminal of the at least one capacitor to the intermediate voltage and coupling the first terminal of the at least one capacitor to an output terminal, thereby providing the second DC voltage at the output terminal.

19. The method of claim 18 wherein the first time interval defines a duty cycle and the method further comprises using the second DC voltage to determine the duty cycle.

20. The method of claim 18 wherein the first time interval defines a duty cycle and the method further comprises using the intermediate voltage to determine the duty cycle.

* * * * *